(12) United States Patent
Inagaki

(10) Patent No.: US 6,995,887 B2
(45) Date of Patent: Feb. 7, 2006

(54) LASER SCANNING APPARATUS

(75) Inventor: Yoshihiro Inagaki, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 10/951,893

(22) Filed: Sep. 29, 2004

(65) Prior Publication Data

US 2005/0254110 A1    Nov. 17, 2005

(30) Foreign Application Priority Data

May 17, 2004    (JP)    ............................. 2004-146194

(51) Int. Cl.
G02B 26/08    (2006.01)
(52) U.S. Cl. .................................... 359/214
(58) Field of Classification Search ................ 359/205, 359/208, 212, 214, 216–218; 347/134
See application file for complete search history.

(56) References Cited

U.S. PATENT DOCUMENTS 5,007,692 A * 4/1991 Matsuura .................... 359/217

6,785,029 B2 * 8/2004 Takada et al. .............. 359/205

FOREIGN PATENT DOCUMENTS

| JP | 2001-066527 A | 3/2001 |
|---|---|---|
| JP | 2002-182143 A | 6/2002 |

* cited by examiner

Primary Examiner—Euncha P. Cherry
(74) Attorney, Agent, or Firm—Buchanan Ingersoll PC

(57) ABSTRACT

A plane mirror is disposed in an optical path after a polygon mirror which deflects laser light. Incident light to and reflected light on the polygon mirror has no angle in an auxiliary scanning direction and the polarization direction of laser light is inclined relative to a plane (deflection plane) including the incident light to and the reflected light on the polygon mirror. An inclination angle and inclination direction of the light deflection direction of the laser light, an inclination angle of the plane mirror are configured so as to satisfy predetermined conditions. With such a configuration, a change in reflectance on the polygon mirror accompanying a change in deflection angle can be cancelled or alleviated by a change in reflectance on the plane mirror accompanying the change in deflection angle, and a difference in light quantity distribution on a photosensitive member on the left and right sides thereof is alleviated in comparison with a difference in reflectance to be caused by the polygon mirror.

12 Claims, 34 Drawing Sheets

—△— POLYGON MIRROR
—□— PLANE MIRROR

LASER SCANNING APPARATUS

This application claims the priority of Japanese Patent Application No. 2004-146194, filed on May 17, 2004 in Japan, the contents of which is incorporated by reference herein.

BACKGROUND OF THE INVENTION

1. Field of the Invention

This invention relates to a laser scanning apparatus which scans a photosensitive member with laser light, emitted from a light source, deflected by a polygon mirror and reflected by at least one plane mirror.

2. Description of the Prior Art

In the field of laser scanning apparatuses, various contrivances have been conventionally tried in order to make light quantity distribution uniform on a photosensitive member in an image width direction. For example, in a laser scanning apparatus disclosed in JP-A 2001-66527, incident light to a polygon mirror is directed at an angle in an auxiliary scanning direction, while being directed so as to bisect an angular range of deflection in a main scanning direction. With such a construction, since a reflecting angle on the polygon mirror is equal on the left and right sides along the image width direction, it can be avoided to cause a difference in light quantity distribution on the left and right sides along the image width direction on the photosensitive member.

With this construction, however, since incident light impinges on the polygon mirror at an angle in the auxiliary scanning direction, an incidence height relative to the photosensitive member differs slightly in the auxiliary direction according to a light reflecting surface of the polygon mirror if a slightly different error in distance between the rotation axis of the polygon mirror and a light reflecting surface thereof arises between light reflecting surfaces, resulting in pitch non-uniformity on an image. Moreover, with slight tilting of a light reflecting surface of the polygon mirror, an incidence height relative to the photosensitive member is slightly different according to a light reflecting surface of the polygon mirror in the main scanning direction, resulting in a jitter on the image.

Therefore, in the laser scanning apparatus disclosed in JP-A 2002-182143, incident light impinging on a polygon mirror takes a path outside deflecting angles (deflection range). With this construction, incident light impinging on the polygon mirror is directed so as not to have an angle relative to the auxiliary direction, thereby enabling pitch non-uniformity or a jitter on an image to be avoided. Besides, in the laser scanning apparatus, a redirecting mirror (plane mirror) disposed in the optical path after the polygon mirror is applied with coating which makes reflectance values of S polarized light and P polarized light to be almost equal to each other, as an effort for realization of uniformity of a light quantity distribution on a photosensitive member in the image width direction.

In the construction disclosed in JP-A 2002-182143, however, a difference between reflectance values on the polygon mirror (for example, a difference between reflectance values on the polygon mirror corresponding to both ends of an image) is transferred almost in the same way as a difference in light quantity distribution on the left and right sides on the light sensitive member even if reflectance values of S polarized light and P polarized light are made uniform on a plane mirror since no consideration is given to an influence of the polygon mirror. For example, in a scanning optical system having a deflection angle as wide as in excess of 100 degrees, the number of layers of the coating, if coating with which no difference between reflectance values occur on the polygon mirror was applied on the polygon mirror, would be inevitably increased in order to cancel a difference in reflectance because of a wide range of incidence angles of light impinging on the polygon mirror, resulting in cost increase.

SUMMARY OF THE INVENTION

The invention has been made in order to solve the above problems and it is an object of the invention to provide a high precision laser scanning apparatus capable of suppressing a phenomenon that a difference between reflectance values on a polygon mirror is exhibited as a difference between values in light quantity distribution in an image width direction on the left and right sides on a light sensitive member with an inexpensive construction to thereby improve an image quality.

In order to achieve the above object, a laser scanning apparatus includes: a light source for emitting laser light; a polygon mirror for deflecting the laser light; and at least one plane mirror for reflecting the laser light deflected by the polygon mirror in the direction to a photosensitive member, wherein incident light to and reflected light on the polygon mirror are in a deflection plane perpendicular to the rotation axis of the polygon mirror, an angle formed between the deflection plane and the normal line to a most upstream side plane mirror in the optical path after the polygon mirror is in the range from 20 degrees to 70 degrees, an angle formed between the polarization direction of the laser light and the deflection plane is in the range from 15 degrees to 50 degrees, and a proportion of S polarized light contained in light incident on the most upstream side plane mirror after being reflected on the polygon mirror at one, formed at an end there of closest to the light source, of the two deflection angles corresponding to both ends of an image is smaller than a proportion of S polarized light contained in light incident on the most upstream side plane mirror after being reflected on the polygon mirror at the other, formed at an end there of farthest from the light source, of the two deflection angles.

According to the construction, the laser light emitted from the light source is deflected by the polygon mirror and is then directed to the photosensitive member through the at least one plane mirror. In this situation, since an angle formed between the normal line to the plane mirror located on the most upstream side in the optical path and the deflection plane perpendicular to the rotation axis of the polygon mirror is in the range from 20 degrees to 70 degrees, there can be provided a difference to some extent between reflectance values on the plane mirror of incident light impinging on the plane mirror at the deflection angles corresponding to respective both ends of the image. Thereby, reflectance on the plane mirror can be changed in company with a change in deflection angle.

An angle formed between the polarization direction of the laser light and the deflection plane is set in the range from 15 degrees to 50 degrees. In this situation, an inclination direction (rotation direction) of the polarization direction of the laser light relative to the deflection plane can be thought to be of one of two directions, positive and negative, and which of the deflection angles is taken is determined by the following condition. That is, the polarization direction of the laser light is inclined relative to the deflection plane at an angle in the range, so that a proportion of S polarized light in light reflected on the polygon mirror at one deflection angle on the side closer to the light source of the two deflection angles on the polygon mirror corresponding to both ends of an image and incident on the plane mirror is smaller than a proportion of S polarized light in light reflected on the polygon mirror at the other deflection angle on the side farther to the light source and incident on the plane mirror.

A change in reflectance on the polygon mirror accompanying a change in deflection angle can be cancelled or alleviated by a change in reflectance on the plane mirror accompanying the change in deflection angle with such an inclination of the polarization direction of the laser light relative to a deflection direction thereof. Therefore, non-uniformity in light quantity on the photosensitive member in the image width direction caused by a difference between reflectance values on the polygon mirror of light corresponding to both ends of the image can be suppressed by a simple optical design as described above, thereby enabling a high precision laser scanning apparatus at low cost to be realized.

In this situation, with an angle formed between the polarization direction of the laser light and the deflection plane thereof in the range from 20 degrees to 40 degrees, a change in reflectance on the polygon mirror accompanying a change in deflection angle can be almost cancelled by a change in reflectance on the plane mirror accompanying the change in deflection angle; therefore, such a setting is preferable.

A laser scanning apparatus of the invention includes: a light source for emitting laser light; a polygon mirror for deflecting the laser light; and at least one plane mirror for reflecting the laser light deflected by the polygon mirror in the direction to a photosensitive member, wherein incident light to and reflected light on the polygon mirror are in a deflection plane perpendicular to the rotation axis of the polygon mirror, an angle formed between the deflection plane and the normal line to a most upstream side plane mirror in the optical path after the polygon mirror is in the range from 20 degrees to 70 degrees, an angle formed between the polarization direction of the laser light and the deflection plane is in the range from 60 degrees to 85 degrees, and a proportion of S polarized light contained in light incident on the most upstream side plane mirror after being reflected on the polygon mirror at one, formed at an end there of closest to the light source, of the two deflection angles corresponding to both ends of an image is larger than a proportion of S polarized light contained in light incident on the most upstream side plane mirror after being reflected on the polygon mirror at the other, formed at an end there of farthest from the light source, of the two deflection angles.

According to the construction, the laser light emitted from the light source is deflected by the polygon mirror and is then directed to the photosensitive member through the at least one plane mirror. In this situation, since an angle formed between the normal line to the plane mirror located on the most upstream side in the optical path and the deflection plane perpendicular to the rotation axis of the polygon mirror is in the range from 20 degrees to 70 degrees, there can be provided a difference to some extent between reflectance values on the plane mirror of incident light impinging on the plane mirror at the deflection angles corresponding to respective both ends of the image. Thereby, reflectance on the plane mirror can be changed in company with a change in deflection angle.

An angle formed between the polarization direction of the laser light and the deflection plane is set in the range from 60 degrees to 85 degrees. In this situation, an inclination direction (rotation direction) of the polarization direction of the laser light relative to the deflection plane can be thought to be of one of two directions, positive and negative, and which of the deflection angles is taken is determined by the following condition. That is, the polarization direction of the laser light is inclined relative to the deflection plane at an angle in the range, so that a proportion of S polarized light in light reflected on the polygon mirror at one deflection angle on the side closer to the light source of the two deflection angles on the polygon mirror corresponding to both ends of an image and incident on the plane mirror is larger than a proportion of S polarized light in light reflected on the polygon mirror at the other deflection angle on the side farther to the light source and incident on the plane mirror.

A change in reflectance on the polygon mirror accompanying a change in deflection angle can be cancelled or alleviated by a change in reflectance on the plane mirror accompanying the change in deflection angle with such an inclination of the polarization direction of the laser light relative to a deflection direction thereof. Therefore, non-uniformity in light quantity on the photosensitive member in the image width direction caused by a difference between reflectance values on the polygon mirror of light corresponding to both ends of the image can be suppressed by a simple optical design as described above, thereby enabling a high precision laser scanning apparatus at low cost to be realized.

In this situation, with an angle formed between the polarization direction of the laser light and the deflection plane thereof in the range from 70 degrees to 80 degrees, a change in reflectance on the polygon mirror accompanying a change in deflection angle can be almost cancelled by a change in reflectance on the plane mirror accompanying the change in deflection angle; therefore, such a setting is preferable.

In the laser scanning apparatus of the invention, the range of deflection angles on the polygon mirror corresponding to an image width is preferably 100 degrees or more.

In a scanning optical system with a deflection angle as wide as 100 degrees or more, since a difference between reflectance values on a polygon mirror of light corresponding to both ends of an image is large, leading to more of conspicuousness of non-uniformity in light quantity distribution in the image width direction. Therefore, by applying the invention to such a wide angle scanning optical system, uniformity in light quantity distribution in the image width direction can be achieved, in which case an effect of the invention becomes especially great.

Moreover, no necessity arises for application of multi-layer coating with which a difference in reflectance on a polygon mirror is rendered nothing, on the polygon mirror. In addition, a laser scanning apparatus can be realized at low cost. Besides, since an optical path from a polygon mirror to a photosensitive member can be shorter, the apparatus can be down sized.

In the laser scanning apparatus of the invention, an angle formed between the normal line to the plane mirror and a deflection plane is preferably in the range from 30 degrees to 65 degrees. In this case, since reflectance values on the plane mirror of light corresponding to both ends of an image can have a great difference therebetween, a change in reflectance on a polygon mirror accompanying a change in deflection angle can be surely cancelled (or alleviated) by a change in a plane mirror accompanying the change in deflection angle.

Moreover, in the laser scanning apparatus of the invention, a light source is preferably an array type semiconductor laser having plural emission points. In this case, one image can be formed with plural laser light beams, thereby enabling a high speed image-formation to be achieved.

DESCRIPTION OF THE DRAWINGS

The foregoing and other objects and features will become more apparent from the following description of preferred embodiments with reference to the accompanying drawings, in which.

DESCRIPTION OF THE PREFERRED EMBODIMENTS

First Embodiment

Description will be given of one embodiment of the invention below based on accompanying drawings.

Figure 1:
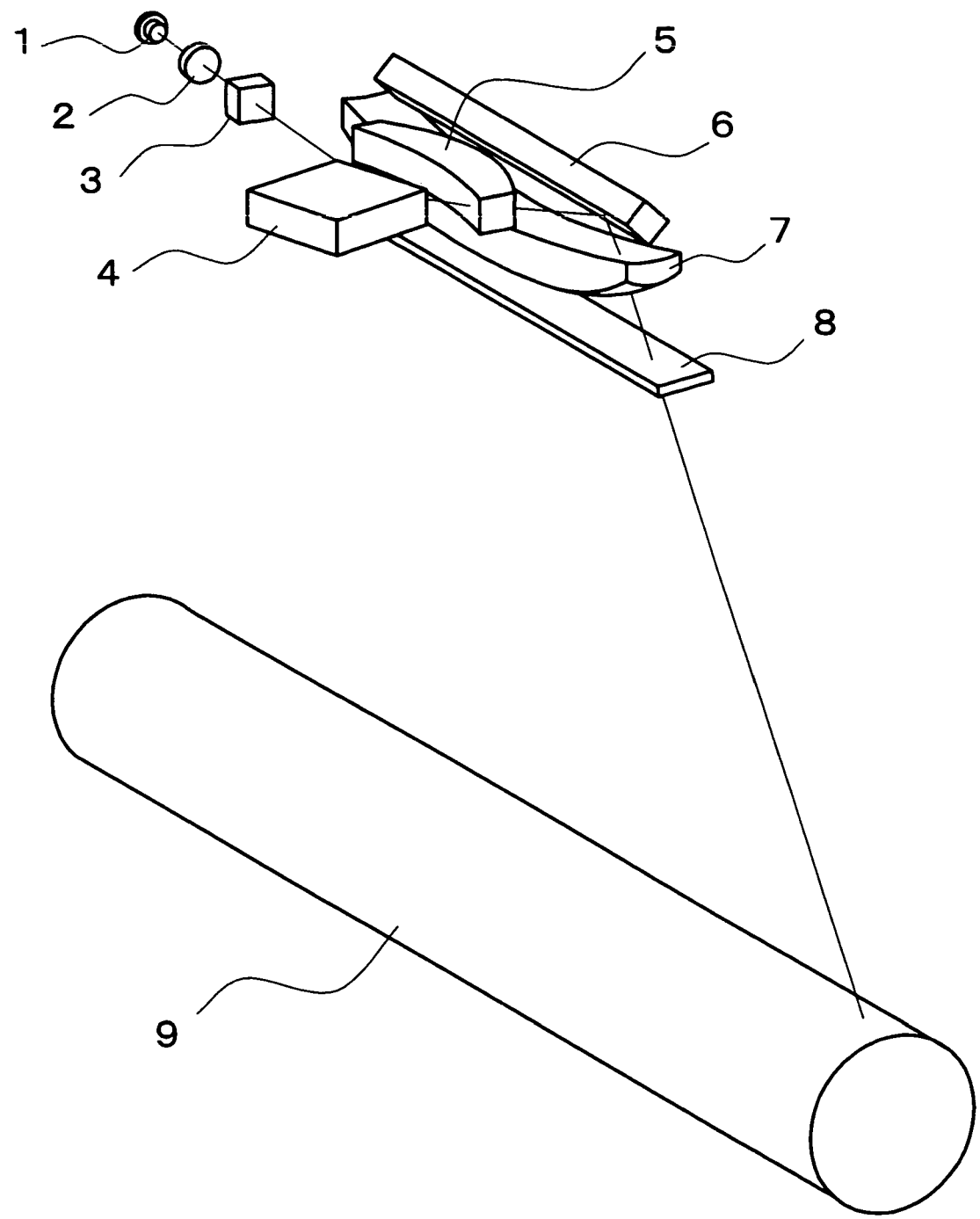
FIG. 1 is a perspective view showing a schematic construction of a laser scanning apparatus according to a first embodiment of the invention.

FIG. 1 is a perspective view showing a schematic construction of a laser scanning apparatus according to this embodiment. The laser scanning apparatus includes a laser diode 1, a collimator lens 2, a cylindrical lens 3, a polygon mirror 4, a scanning optical system first lens 5, a plane lens 6, a scanning optical system second lens 7 and a window 8, provided along an optical path from the laser diode 1 to a photosensitive member 9.

The laser diode 1 is a light source for emitting laser light which is almost linearly polarized light. The laser diode 1 is constituted of an array type semiconductor laser with plural (for example, two) light emission points. The collimator lens 2 collimates incident light to then emit parallel light. The cylindrical lens 3 not only emits incident light unchanged as parallel light in the main scanning direction, but also converges incident light in the auxiliary direction and collects on a light reflecting surface of the polygon mirror 4. Note that the main scanning direction indicates a direction corresponding to the image width direction and the auxiliary scanning direction indicates a direction perpendicular to the main scanning direction.

The polygon mirror 4 is to deflect incident light, that is, laser light emitted from the laser diode 1, and is constituted of a rotating polyhedral mirror having plural light reflecting surfaces (in this embodiment, a square in a top plan view). That is, laser light from the laser diode 1 is reflected on a light reflecting surface of the polygon mirror 4 and, also, a reflection direction of reflected light changes in the main scanning direction by rotation of the polygon mirror 4 itself, so that the incident light is deflected.

In this embodiment, incident light and reflected light on the polygon mirror 4 is in a deflection plane perpendicular to the rotation axis of the polygon mirror 4. That is, incident light to the polygon mirror 4 impinges thereon without inclination in the auxiliary scanning direction. Hence, pitch non-uniformity in an image can be avoided even if a distance between the rotation axis of the polygon mirror 4 and a light reflecting surface slightly changes according to a light reflecting surface. Besides, it can be avoided to produce a jitter in an image due to a slight tilting of a light reflecting surface of the polygon mirror 4.

The scanning optical system first lens 5 refracts incident light, that is, laser light deflected by the polygon mirror 4, to guide it to the plane mirror 6. The plane mirror 6 functions as a redirecting mirror on which incident light is reflected in the direction to the photosensitive member 9. In this embodiment, the plane mirror 6 alone is provided in an optical path after the polygon mirror 4, while plural plane mirrors 6 may be provided in the optical path without a disadvantage. The scanning optical system second lens 7 refracts incident light reflected by the plane mirror 6 to guide the refracted light to the photosensitive member 9 through the window 8.

That is, in the laser scanning apparatus with the above construction, laser light emitted by the laser diode 1 is collimated by the collimator lens 2 and, thereafter, the parallel light is collected only in the auxiliary direction on a light reflecting surface of the polygon mirror 4 by the cylindrical lens 3. Then, incident light is reflected on the light reflecting surface and, also, a reflection direction of the reflected light changes in the main scanning direction by rotation of the polygon mirror 4. Laser light deflected by the polygon mirror 4 is refracted by the scanning optical system first lens 5, is reflected by the plane mirror 6, is again refracted by the scanning optical system second lens 7 and, thereafter, is transmitted through the window 8 and is then collected on the photosensitive member 9.

Then, description will be given of an optical design in the laser scanning apparatus of this embodiment below as Example 1.

Table 1 shows an optical system of this example numerically with coordinate data of optical surfaces. The coordinate data expresses arrangement of optical surfaces (with a surface vertex as a reference) each with the origin and vectors of a local orthogonal coordinate system (x, y, z) in a global orthogonal coordinate system (X, Y, Z), and an evaluation surface (surface No. 13) corresponds to a surface of the photosensitive member 9. Note that Z-axis is an axis in the auxiliary scanning direction, Y-axis is an axis in the main direction and X-axis is an axis perpendicular to Y-Z plane.

Surface Nos. 1 to 12 in Table 1 indicate: a surface of the collimator lens 2 on the light incidence side; a surface thereof on the light emission side; a surface of the cylindrical lens 3 on the light incidence side; a surface thereof on the light emission side; a light reflecting surface of the polygon mirror 4; a surface of the scanning optical system first lens 5 on the light incidence side; a surface thereof on the light emission side; a light reflecting surface of the plane mirror 6; a surface of the scanning optical system second lens 7 on the light incidence side; a surface thereof on the light emission side; a surface of the window 8 on the light incidence side; and a surface thereof on the light emission side.

Coordinates of the polygon mirror 4 is coordinates of a light reflecting surface when the center of an image is formed. Optical elements of this example are made of resin or glass. To be more specific, the collimator lens 2 is made of glass with a refractive index of 1.825. The cylindrical lens 3 and the window 8 are made of glass with a refractive index of 1.511. Both of the scanning optical system first lens 5 and the scanning optical system second lens 7 are made of resin with a refractive index of 1.537. Refractive indexes are measured at a wavelength of 780 nm.

TABLE 1

| Surface No. | Name | Local coordinate original point | | | Local coordinate x-axis vector | | | Local coordinate y-axis vector | | |
|---|---|---|---|---|---|---|---|---|---|---|
| | | X | Y | Z | X | Y | Z | X | Y | Z |
| 1 | Collimator lens | 5.81 | 66.43 | 0.00 | −0.0872 | −0.9962 | 0.0000 | 0.9962 | −0.0872 | 0.0000 |
| 2 | | 5.59 | 63.94 | 0.00 | −0.0872 | −0.9962 | 0.0000 | 0.9962 | −0.0872 | 0.0000 |
| 3 | Cylindrical lens | 4.29 | 49.08 | 0.00 | −0.0872 | −0.9962 | 0.0000 | 0.9962 | −0.0872 | 0.0000 |
| 4 | | 3.86 | 44.10 | 0.00 | −0.0872 | −0.9962 | 0.0000 | 0.9962 | −0.0872 | 0.0000 |
| 5 | Polygon mirror | −2.48 | 1.86 | 0.00 | −0.7373 | −0.6756 | 0.0000 | 0.6756 | −0.7373 | 0.0000 |
| 6 | Scanning | 10.00 | 0.00 | 0.00 | 1.0000 | 0.0000 | 0.0000 | 0.0000 | 1.0000 | 0.0000 |
| 7 | optical system first lens | 19.00 | 0.00 | 0.00 | 1.0000 | 0.0000 | 0.0000 | 0.0000 | 1.0000 | 0.0000 |
| 8 | Plane mirror | 25.00 | 0.00 | 0.00 | 0.7071 | 0.0000 | 0.7071 | 0.0000 | 1.0000 | 0.0000 |
| 9 | Scanning | 25.00 | 0.00 | −9.00 | 0.0000 | 0.0000 | −1.0000 | 0.0000 | 1.0000 | 0.0000 |
| 10 | optical system second lens | 25.00 | 0.00 | −17.00 | 0.0000 | 0.0000 | −1.0000 | 0.0000 | 1.0000 | 0.0000 |
| | | 25.00 | 0.00 | −20.00 | 0.0872 | 0.0000 | −0.9962 | 0.0000 | 1.0000 | 0.0000 |
| 12 | Window | 25.16 | 0.00 | −21.79 | 0.0872 | 0.0000 | −0.9962 | 0.0000 | 1.0000 | 0.0000 |
| 13 | Evaluation surface | 25.00 | 0.00 | −112.18 | 0.0000 | 0.0000 | −1.0000 | 0.0000 | 1.0000 | 0.0000 |

Tables 2 to 7 show shapes of optical surfaces, wherein $\text{E}-n = \times 10^{-n}$.

TABLE 2

Surface 2: Axially symmetrical aspherical surface

| Curvature |
|---|
| −7.57677E−02 |

Aspherical coefficient

| Order | Coefficient |
|---|---|
| 4 | 3.99960E−05 |
| 6 | 1.78765E−07 |
| 8 | 6.06270E−10 |
| 10 | 2.79173E−12 |

TABLE 3

Surface 3: Cylindrical surface

| Curvature |
|---|
| 4.19078E−02 |

TABLE 4

Surface 6: Spherical surface

| Curvature |
|---|
| −1.23077E−02 |

TABLE 5

Surface 7: Free curved surface

| i\j | 0 | 2 | 4 |
|---|---|---|---|
| 0 | 0.00000E+00 | 7.67962E−03 | 3.25376E−04 |
| 1 | −3.21928E−02 | 1.67916E−04 | 8.42693E−06 |
| 2 | −1.60194E−02 | −1.53020E−05 | −8.87609E−07 |

TABLE 5-continued

Surface 7: Free curved surface

| i\j | 0 | 2 | 4 |
|---|---|---|---|
| 3 | 4.13555E−06 | −2.41849E−07 | 1.06188E−08 |
| 4 | 5.24992E−06 | −2.16780E−08 | 9.03372E−09 |
| 5 | 4.56276E−09 | 1.57067E−09 | −5.31484E−11 |
| 6 | 1.73655E−09 | 2.89998E−10 | −1.66268E−11 |
| 7 | −1.80185E−10 | −2.58331E−12 | 0.00000E+00 |
| 8 | −2.45964E−11 | −4.83582E−13 | 0.00000E+00 |
| 9 | 1.93814E−13 | 3.34160E−16 | 0.00000E+00 |
| 10 | 2.23973E−14 | 1.73537E−16 | 0.00000E+00 |

TABLE 6

Surface 9: Free curved surface

| i\j | 0 | 2 | 4 |
|---|---|---|---|
| 0 | 0.00000E+00 | −2.30495E−02 | −7.78932E−06 |
| 1 | 1.47733E−02 | −3.16082E−05 | 3.58903E−07 |
| 2 | −4.22719E−03 | −1.61635E−05 | −3.17669E−08 |
| 3 | −3.49986E−06 | 1.40915E−07 | −6.89179E−10 |
| 4 | 1.75533E−06 | 2.06786E−08 | 3.38413E−11 |
| 5 | 4.49142E−09 | −7.26210E−11 | 3.46330E−13 |
| 6 | −6.73564E−10 | −6.41705E−12 | −8.87069E−15 |
| 7 | −6.64172E−12 | −1.84217E−14 | 0.00000E+00 |
| 8 | −5.95473E−14 | −2.05775E−15 | 0.00000E+00 |
| 9 | 1.72747E−15 | 1.23799E−17 | 0.00000E+00 |
| 10 | 5.37626E−17 | 1.03506E−18 | 0.00000E+00 |

TABLE 7

Surface 10: Free curved surface

| i\j | 0 | 2 | 4 |
|---|---|---|---|
| 0 | 0.00000E+00 | −5.15439E−02 | −4.59240E−05 |
| 1 | 3.18623E−02 | 2.35312E−05 | −2.70207E−08 |
| 2 | −1.67396E−03 | 9.71566E−06 | 2.28841E−08 |
| 3 | −1.30617E−05 | −3.80706E−08 | 1.95824E−10 |
| 4 | −2.48027E−06 | −1.60869E−08 | −3.40133E−11 |
| 5 | 1.39980E−08 | 9.64534E−11 | −7.00968E−14 |
| 6 | 1.16615E−09 | 1.23688E−11 | 9.99450E−15 |
| 7 | −6.80125E−12 | −6.28586E−14 | 0.00000E+00 |
| 8 | −4.22827E−13 | −5.14441E−15 | 0.00000E+00 |
| 9 | 9.31220E−16 | 1.16676E−17 | 0.00000E+00 |
| 10 | 5.46539E−17 | 7.39960E−19 | 0.00000E+00 |

Shapes of free curved surfaces are expressed by the following mathematical expression 1, wherein $a_{ij}$ is a free curved surface coefficient.

(Mathematical expression 1)

$$x = \sum_{i=0}^{10} \sum_{j=0}^{6} a_{ij} y^i z^j$$

Shapes of axially symmetrical aspherical surfaces are expressed by the following mathematical expression 2, wherein $a_i$ is an aspherical surface coefficient.

(Mathematical expression 2)

$$x = \frac{c(y^2 + z^2)}{1 + \sqrt{1 - c^2(y^2 + z^2)}} + \sum_{i=0}^{10} a_i \left(\sqrt{y^2 + z^2}\right)^i$$

A shape of a cylindrical surface is expressed by the following mathematical expression 3.

(Mathematical expression 3)

$$x = \frac{cz^2}{1 + \sqrt{1 - c^2 z^2}}$$

Figure 2:
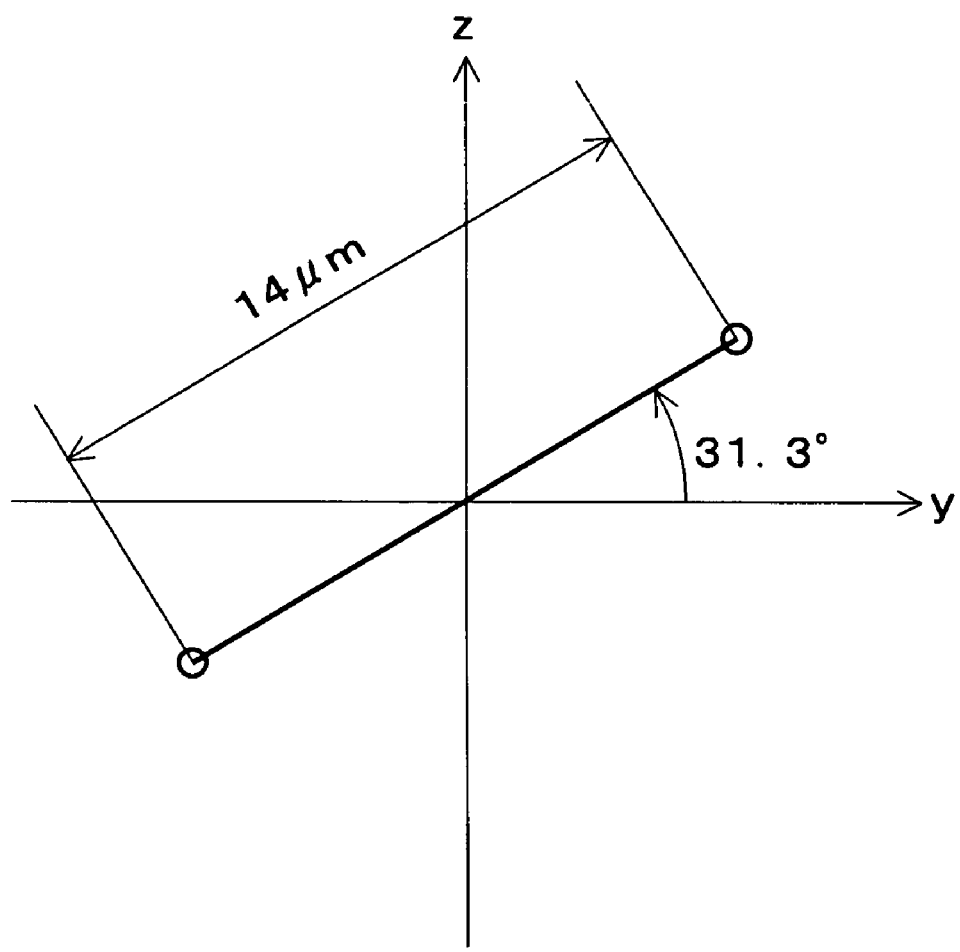
FIG. 2 is a descriptive view showing a state of light emission points of a laser diode observed from the side of a collimator lens in the laser scanning apparatus.

FIG. 2 is a descriptive view showing a state of light emission points of the laser diode 1 observed from the side of the collimator lens 2. Note that in the figure, the z-axis is an axis indicating the auxiliary scanning direction and has the same direction as the Z-axis in the global orthogonal coordinate system. The y-axis is an axis perpendicular to a propagation direction vector of laser light and the z-axis, and is different from Y-axis in the global orthogonal coordinate system.

In this example, a spacing between the two light emission points on the laser diode 1 is 14 μm and the polarization direction of laser light coincides with the direction along which the two light emission points are aligned. The laser diode 1 is inclined relative to the horizontal plane (deflection plane) about the optical axis of the collimator lens 2 by 31.3 degrees. With such a construction, since laser light is emitted from the two points deviated with respect to both main scanning and auxiliary scanning, collected points of incident light including two laser beams impinging on the photosensitive member 9 through the optical system are deviated from each other in the main scanning direction and the auxiliary scanning direction. In this example, the two laser beams are collected to positions deviated from each other by 85 μm in the main scanning direction and by 42 μm in the auxiliary scanning direction.

In this example, an image density is 600 dpi and a difference between collected positions of two laser light beams is designed so as to coincide just with the spacing of adjacent lines. With such a design adopted, one image can be formed with plural laser light beams, thereby enabling high speed image-formation to be achieved.

Figure 3:
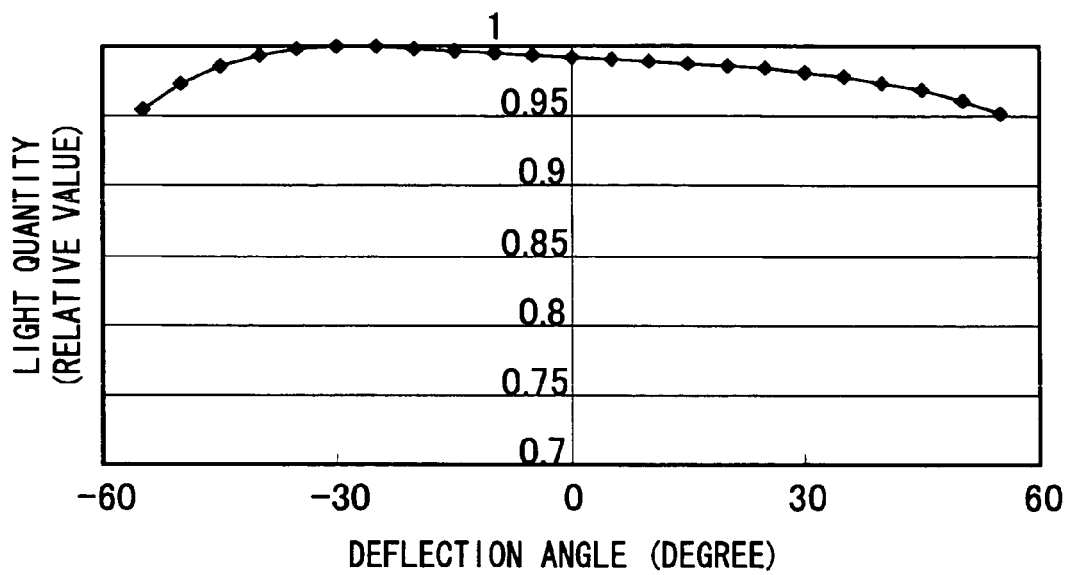
FIG. 3 is a descriptive graph showing light quantity distribution on a photosensitive member in Example 1.

FIG. 3 is a descriptive graph showing light quantity distribution on the photosensitive member 9 in this example. In FIG. 3, an illumination light quantity onto the photosensitive member 9 changing in company with a change in deflection angle of light reflected by the polygon mirror 4 is indicated under normalization with the maximum value as 1.

Note that a deflection angle means an angle by which reflected light on the polygon mirror 4 is deflected in the main scanning direction, wherein the optical axis connecting an optical reflecting surface of the polygon mirror 4 and the scanning optical system first lens 5 or the plane lens 6 is used as a reference at a direction of 0 degree and a deflection angle is defined as an angle formed between the optical axis and a reflected light beam. When reflected light on the polygon mirror 4 is reflected to the laser diode 1 side relative to the optical axis, a deflection angle is positive (plus). On the other hand, when reflected light on the polygon mirror 4 is reflected to the other side relative to the optical axis from the laser diode 1 side, a deflection angle is negative (minus). Incidentally, in this example, a deflection angle is in the range from the maximum of 55 degrees on the plus side to the maximum of 55 degrees on the minus side, and thereby, the total range of deflection angle covering the image width direction is expanded over 110 degrees.

Figure 4:
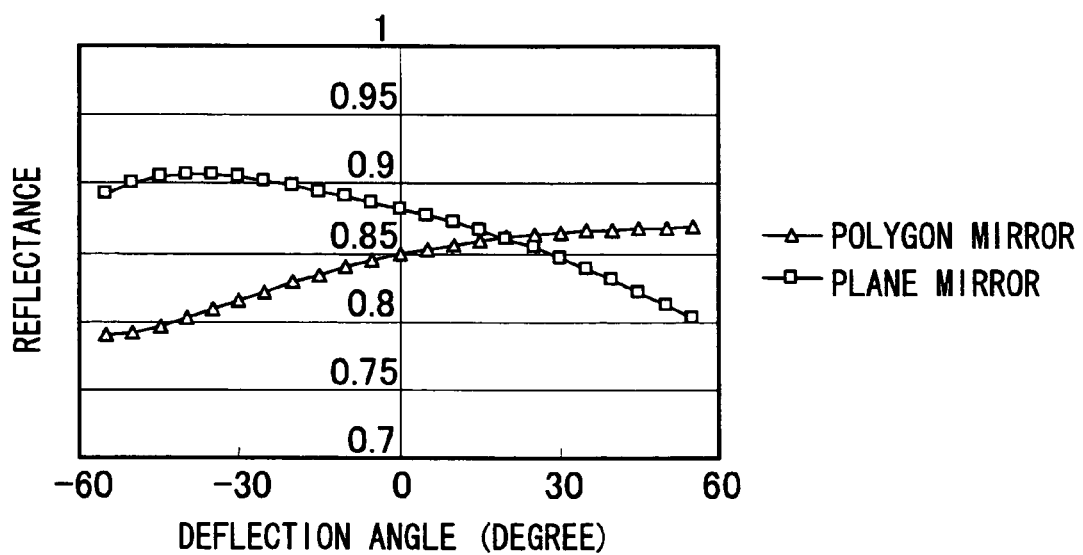
FIG. 4 is a descriptive graph showing changes in reflectance accompanying a change in deflection angle in a polygon mirror and a plane mirror in Example 1.
Figure 5:
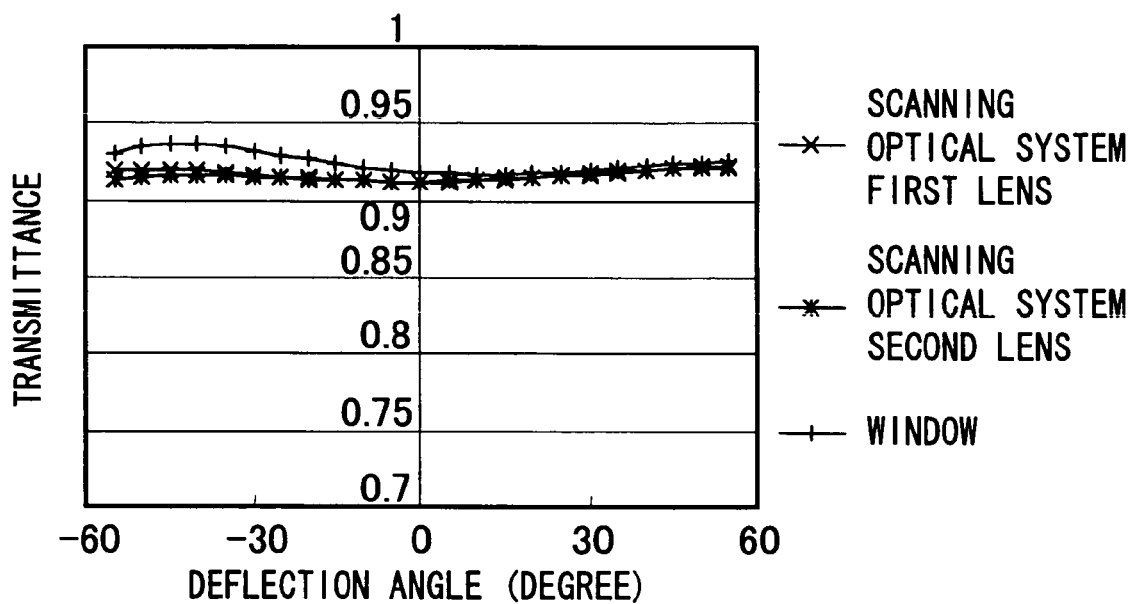
FIG. 5 is a descriptive graph showing changes in transmittance accompanying a change in deflection angle in a scanning optical system first lens, a scanning optical system second lens and a window of the scanning optical system in Example 1.

FIG. 4 is a descriptive graph showing changes in reflectance accompanying a change in deflection angle in the polygon mirror 4 and plane mirror 6 in this example. FIG. 5 is a descriptive graph showing changes in transmittance accompanying a change in deflection angle in the scanning optical system first lens 5, the scanning optical system second lens 7 and the window 8 in this example. It is understood that in elements after the polygon mirror 4, especially the polygon mirror 4 and the plane mirror 6, a change in reflectance accompanying a change in deflection angle is large, though a reflectance and transmission are different according to a deflection angle.

In this example, an optical system is designed so that a change in reflectance on the polygon mirror 4 accompanying a change in deflection angle is, as shown in FIG. 4, cancelled by a change in reflectance on the plane mirror 6 accompanying a change in deflection angle. In order to realize such an optical system, it is necessary to properly set a rotation angle about the optical axis of the laser diode 1 (an angle γ formed between the polarization direction of laser light and the deflection plane), a direction of rotation thereof, and an angle η formed between the normal line to the plane mirror 6 and the deflection plane with reference to comparative examples and other examples which will be described later. By designing an optical system in such a way, though details of the setting will be described later, light quantity distribution on the photosensitive member 9 accompanying a change in deflection angle can be made almost uniform in the image width direction as shown in FIG. 3. The greatest feature of the invention lies in design of an optical system in this way.

Figure 6:
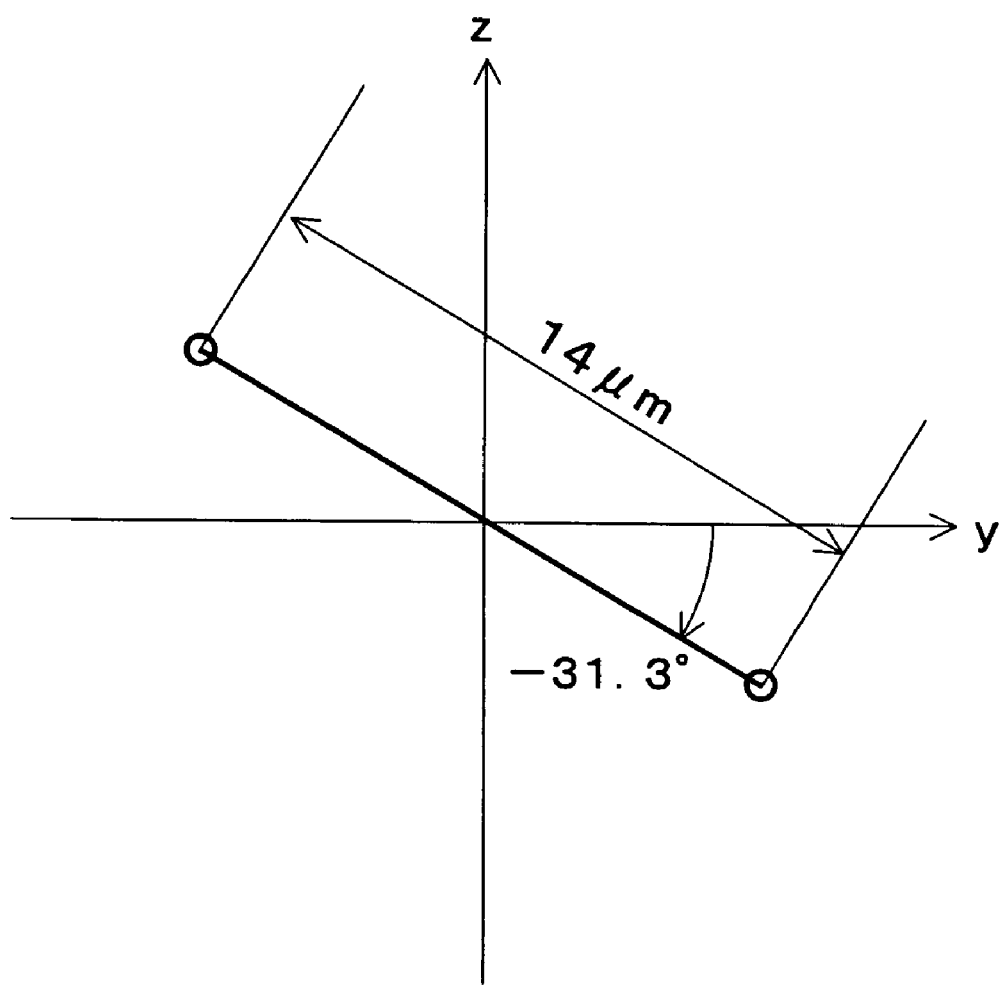
FIG. 6 is a descriptive view showing a state of light emission points of a laser diode observed from the side of a collimator lens in Comparative Example 1.

FIG. 6 is a descriptive view showing a state of light emission points of the laser diode 1 observed from the side of a collimator lens 2 in a case where an inclination of the laser diode 1 is in a direction which is the reverse of that in Example 1, that is, in a case where the laser diode 1 is inclined about the optical axis of the collimator lens 2 by 31.3 degrees in a direction which is the reverse of that in Example 1 from the horizontal plane (deflection plane). Note that an optical system in which the laser diode 1 is arranged in this way is adopted as Comparative Example 1.

Figure 7:
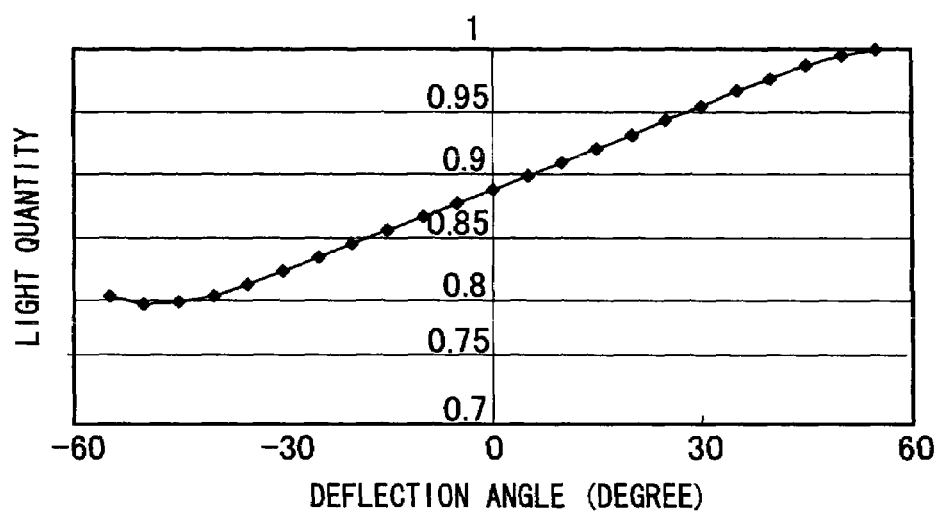
FIG. 7 is a descriptive graph showing light quantity distribution on a photosensitive member in Comparative Example 1.
Figure 8:
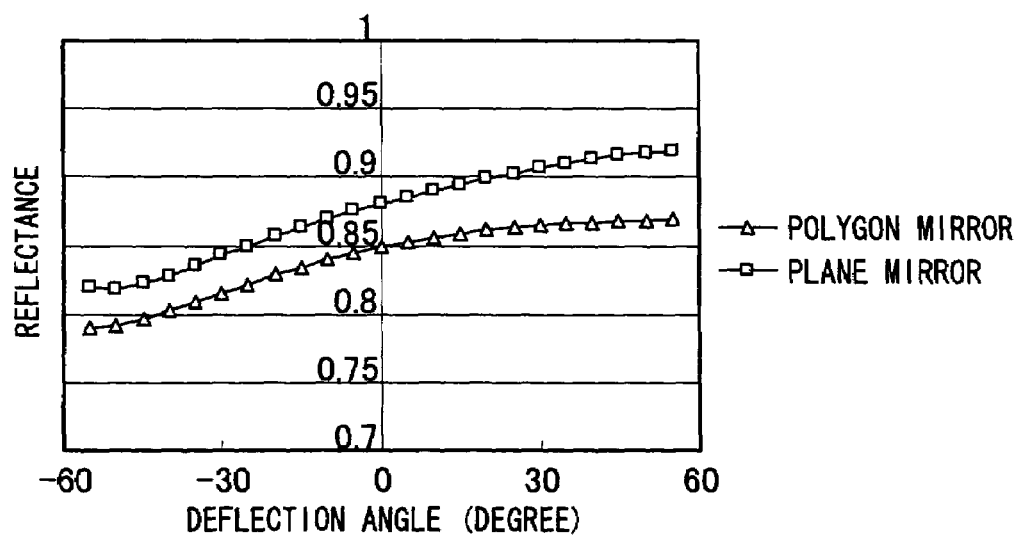
FIG. 8 is a descriptive graph showing changes in reflectance accompanying a change in deflection angle in a polygon mirror and a plane mirror in Comparative Example 1.
Figure 9:
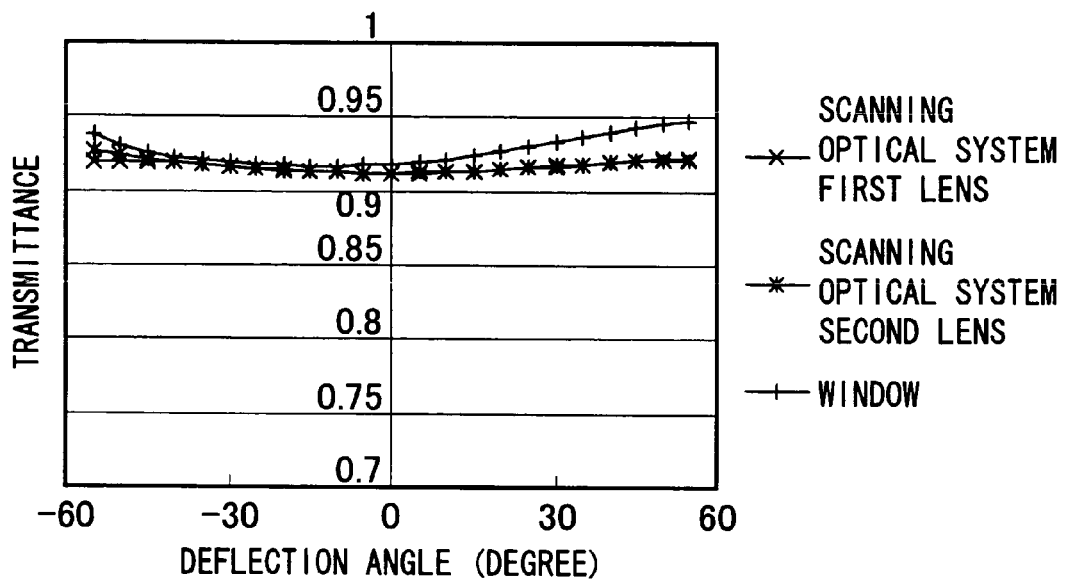
FIG. 9 is a descriptive graph showing changes in transmittance accompanying a change in deflection angle in a scanning optical system first lens, a scanning optical system second lens and a window of a scanning optical system in Comparative Example 1.

FIG. 7 is a descriptive graph showing light quantity distribution on the photosensitive member 9 in Comparative Example 1. In FIG. 7, as well, an illumination light quantity onto the photosensitive member 9 changing in company with a change in deflection angle of light reflected on the polygon mirror 4 is shown under normalization with the maximum value as 1. FIG. 8 is a descriptive graph showing changes in reflectance accompanying a change in deflection angle on the polygon mirror 4 and the plane mirror 6 in Comparative Example 1. FIG. 9 is a descriptive graph showing changes in transmittance accompanying a change in deflection angle in the scanning optical system first lens 5, the scanning optical system second lens 7 and the window 8 in Comparative Example 1.

In Comparative Example 1 as well, since two laser light beams are collected at positions deviated form each other by 85 μm in the main scanning direction and deviated from each other by 42 μm in the auxiliary scanning direction, image-formation with plural light beams can be performed. It is understood, however, that light quantity distribution on the photosensitive member 9, as shown in FIG. 7, has a greater difference in the distribution occurs as compared with Example 1 at both ends of deflection angle (±55 degrees). This is because when a rotation direction of the laser diode 1 about the optical axis thereof is reversed as shown in FIG. 6, a way of a change in reflectance on the plane mirror 6 accompanying a change in deflection angle becomes the reverse of the case of FIG. 4 (see FIG. 8); therefore a change in reflectance on the polygon mirror 4 cannot be cancelled by a change in reflectance on the plane mirror 6.

In this example, description will be given below of details of design of an optical system in which a change in reflectance on the polygon mirror 4 accompanying a change in deflection angle is cancelled by a change in reflectance on the plane mirror 6 accompanying the change in deflection angle.

Figure 10:
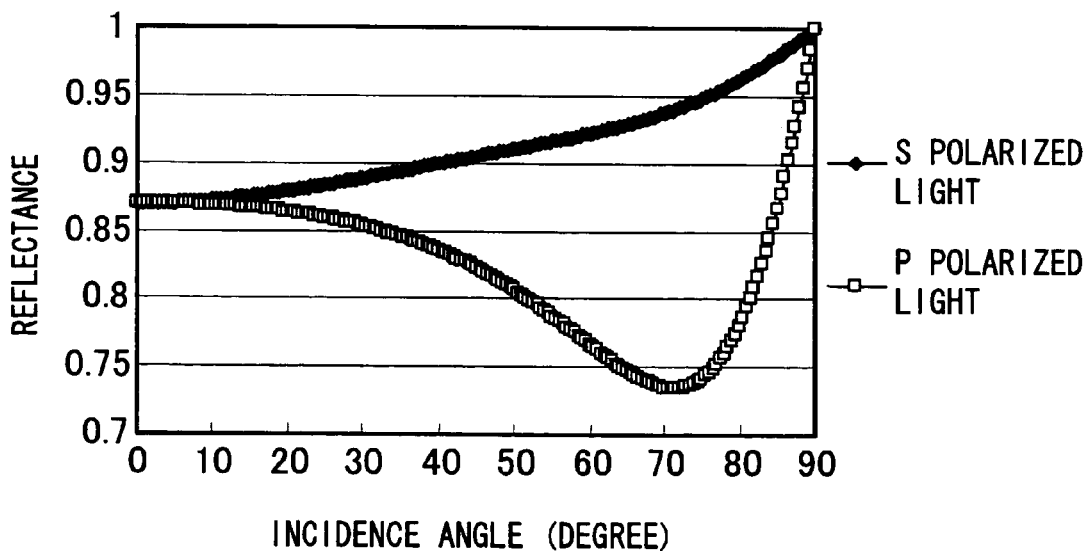
FIG. 10 is a descriptive graph showing changes in reflectance of S polarized light and P polarized light accompanying a change in incidence angle to a polygon mirror or a plane mirror.

FIG. 10 is a descriptive graph showing changes in reflectance of S polarized light and P polarized light accompanying a change in incidence angle on the polygon mirror 4 or the plane mirror 6. In each of Example 1 and Comparative Example 1, each of the polygon mirror 4 and the plane mirror 6 has a structure of a protective single layer coated on aluminum. A refractive index of the protective coat is 1.46 and a film thickness thereof is 0.267 μm. This film thickness corresponds to a ½ wavelength in optical thickness with 780 nm as a reference wavelength. It is understood that in this situation, reflectance of the S polarized light increases, while reflectance of the P polarized light decreases with increase in incidence angle in the range from 0 degree to 70 degrees.

Herein, an incidence angle on the polygon mirror 4 is obtained from an incidence opening angle and a deflection angle. The incidence opening angle indicates an angle formed between the optical axis of the scanning optical system first lens 5, that is, the optical axis bisecting the range over which a deflection angle changes, and incident light to the polygon mirror 4. An incidence angle on the polygon mirror 4, to be specific, has only to be obtained as the absolute value of a result obtained only by calculating a difference between an incidence opening angle and a deflection angle to divide the difference by two. In this example, since the incidence opening angle is 85 degrees and the deflection angle is ±55 degrees, the incidence angle to the polygon mirror 4 ranges from 15 degrees as the minimum to 70 degrees as the maximum according to the following calculating formulae.

(85−55)/2=15

(85+55)/2=70

On the other hand, an incidence angle on the plane mirror 6 takes the minimum of 45 degrees at a deflection angle in the vicinity of 0 degree and increases with increase in the absolute value of a deflection angle.

Figure 11:
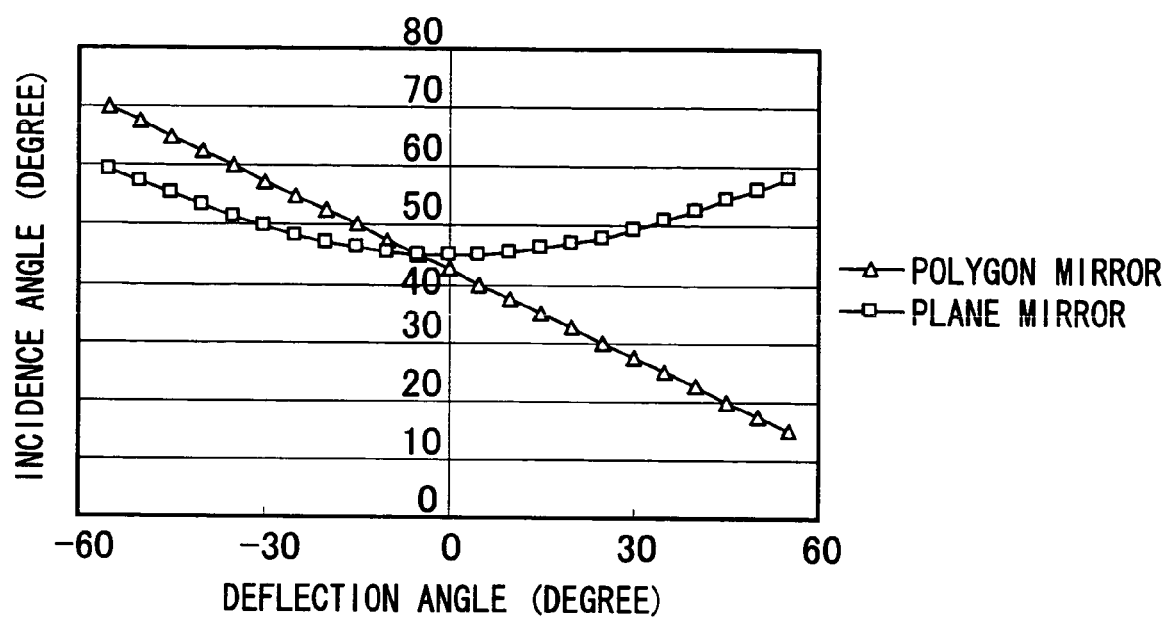
FIG. 11 is a descriptive graph showing a relationship between a deflection angle and an incidence angle on the polygon mirror and the plane mirror in Example 1.

FIG. 11 is a descriptive graph showing a relationship between a deflection angle and incidence angle on the polygon mirror 4 and the plane mirror 6 in Example 1. The range of an incidence angle on the polygon mirror 4 (70−15=55 degrees) is a half of the total range of the deflection (55−(−55)=110 degrees). In a case where, as in Example 1, an optical path of incident light to the polygon mirror 4 is provided outside the range in which a deflection angle changes, the incidence angle is in the range not including 0 degree; therefore, reflectance values on the polygon mirror 4 have a large difference between both ends of reflectance on the plus side and the minus side in a scanning optical system with an deflection angle in excess of 100 degrees as is in this example.

Since the polarization direction of laser light is aligned with the direction along which two light emission points are located, a light quantity of a P polarized light component of incident light on the polygon mirror 4 is calculated 0.73 with $\cos^2 31.3°$ wherein a light quantity of the incident light is assumed 1, and a light quantity of an S polarized light component is calculated 0.27 with $\sin^2 31.3$. Reflectance on the polygon mirror 4 shown in FIGS. 4 and 8 can be calculated from the light quantities and data of FIG. 10.

On the other hand, in the plane mirror 6, a ratio between the S polarized light component and the P polarized light component changes in company with a change in deflection angle. Herein, it is assumed that a polarization state is not changed by reflection on the polygon mirror 4 and is kept unchanged as a linearly polarized light with the exception that a change occurs to a mirror image state from a preceding state. Note that this assumption is not established with a larger incidence angle, details of which will be described later.

On the assumption, when a light beam impinges on the plane mirror 6, light is in the state of linear polarization and an angle γ formed between a vector indicating the polarization direction and the X-Y plane, which is a deflection plane (a plane in which scanning with light is performed by the polygon mirror 4), is kept unchanged as 31.3 degrees. Since reflected light on the polygon mirror 4, however, changes into the mirror image state, a sign is the reverse of that before reflection.

A ratio in light quantity between the S polarized light and the P polarized light can be calculated using the normal line vector of an incidence surface and a light propagation direction vector if the polarization direction is known. To be more specific, an inner product is obtained from a vector of a result of an outer product of the normal line vector of an incidence surface and a light propagation direction vector with a length of the resulted vector of 1, and a vector indicating the polarization direction, and then a square of the inner product is further calculated, whereby a light quantity of the S polarized light when a total light quantity is 1 can be obtained. A light quantity of the P polarized light component is obtained only by subtracting the light quantity of the S polarized light component from 1.

Figure 12:
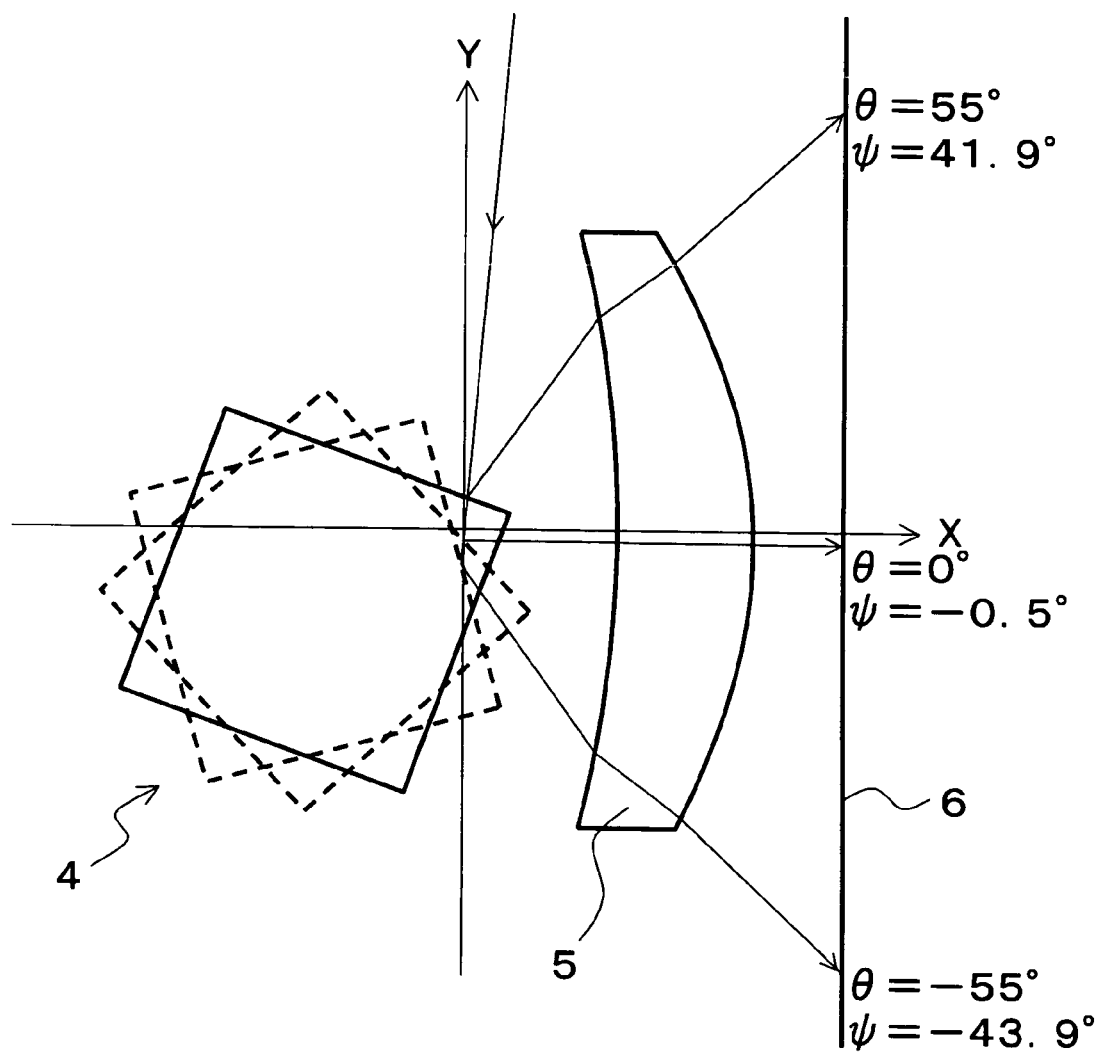
FIG. 12 is a descriptive view showing angles of light beams in the X-Y plane in Example 1.
Figure 13:
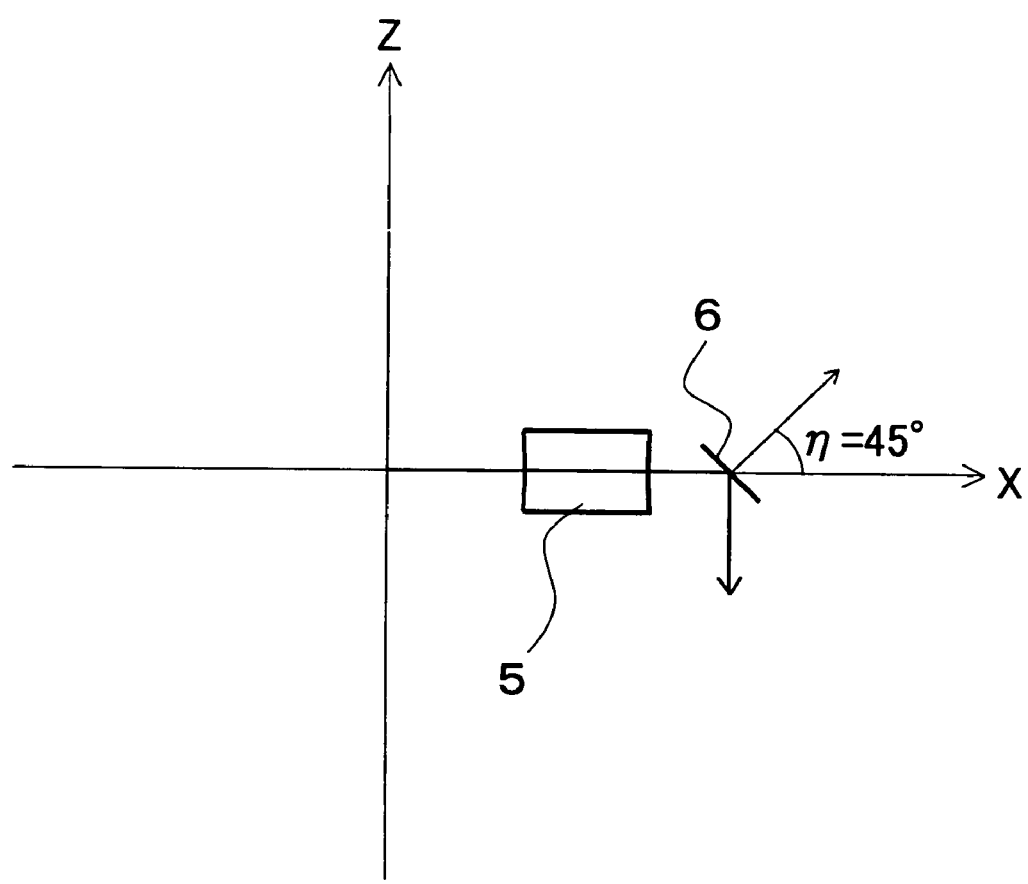
FIG. 13 is a descriptive view showing a light beam and an angle of a plane in the X-Z plane in Example 1.

FIG. 12 is a descriptive view showing angles of light beams in the X-Y plane on the scanning optical system first lens 5 and the plane mirror 6, and FIG. 13 is a descriptive view showing a light beam and an angle of a plane in the X-Z plane on the scanning optical system first lens 5 and the plane mirror 6. Note that X-axis, Y-axis and Z-axis in the figure are the same as X-axis, Y-axis and Z-axis, respectively, of coordinate system showing coordinates of surfaces in Table 1.

If a deflection angle is $\theta$ and an angle of light impinging on the plane mirror 6 forming relative to X axis is $\Psi$ by definition, the angle $\Psi$ takes values shown in FIG. 12 at respective deflection angles corresponding to both ends and the center of an image. An angle $\eta$ formed between the normal line to the plane mirror 6 and the X-Y plane is 45 degrees.

Figure 14:
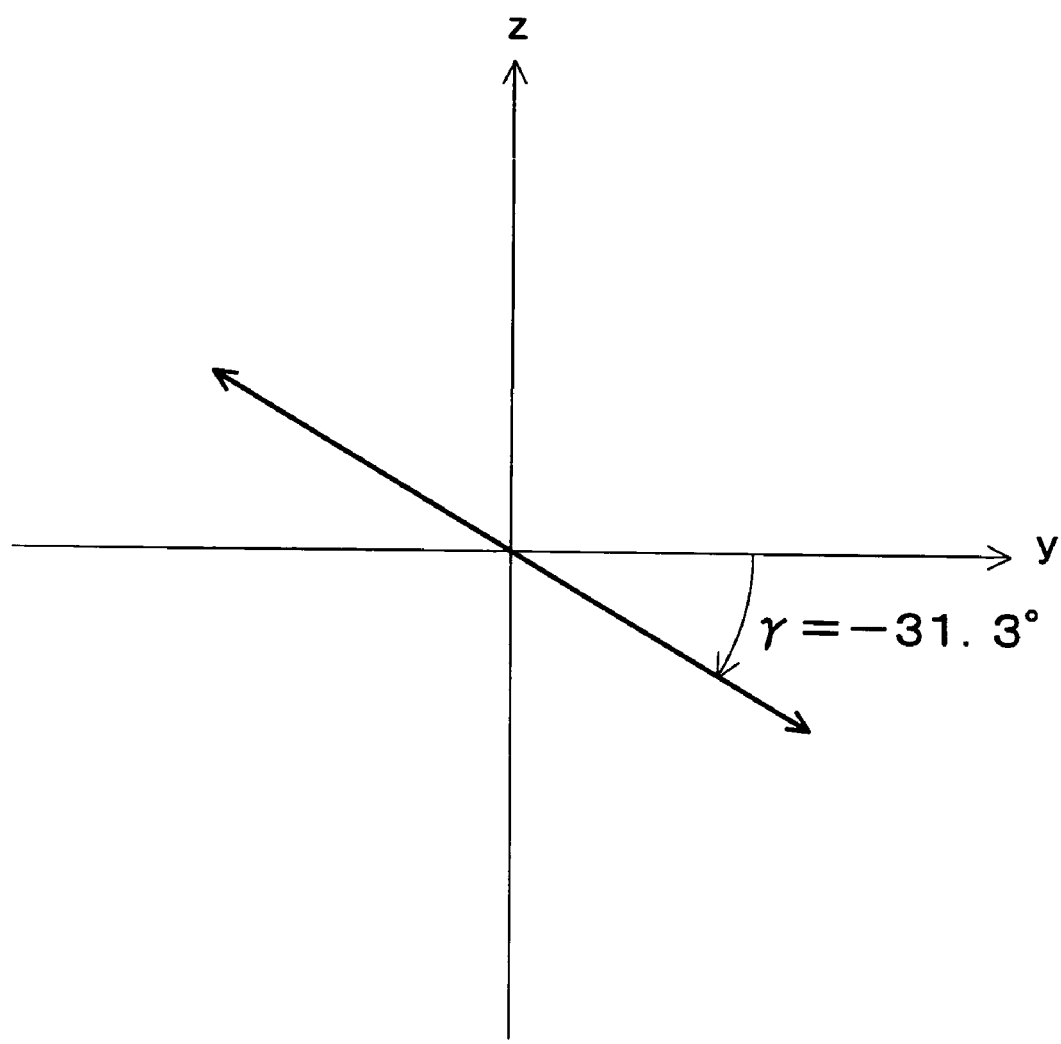
FIG. 14 is a descriptive view showing the polarization direction of light impinging on the plane mirror in Example 1.

FIG. 14 is a descriptive view showing the polarization direction of light impinging on the plane mirror 6. The coordinate system in the figure is a coordinate system with a light beam as a reference and the direction normal to the sheet on which the figure is drawn (a direction perpendicular to y-z plane) coincides with the propagation direction vector of light. The z-axis of FIG. 14 is an axis indicating the auxiliary scanning direction and has the same direction as the Z-axis shown in FIGS. 12 and 13. On the other hand, the y-axis of FIG. 14 is an axis indicating the main scanning direction, whereas the y-axis is different from the Y-axis shown in FIGS. 12 and 13 and a vector perpendicular to the propagation direction vector of light and the z-axis.

Since reflected light on the polygon mirror 4, as described above, is in the mirror image state, the polarization direction of incident light on the polygon mirror 4 before reflection aligned with the direction of a line connecting the two light emission points shown in FIG. 2, while an angle $\gamma$ formed between the polarization direction of reflected laser light on the polygon mirror 4 and the deflection plane (X-Y plane) is $-31.3°$ with a sign in reverse. A light quantity of the S polarized light component described above is calculated with parameters $\Psi$, $\eta$ and $\gamma$ shown in FIGS. 12, 13 and 14 as follows.

$$(\cos \gamma \tan \eta + \sin \Psi \sin \gamma)^2/(\tan^2\eta + \sin^2\gamma)$$

On the other hand, a light quantity of the P polarized light component is calculated similarly as follows.

$$(\sin \Psi \tan \eta - \cos \Psi \sin \gamma)^2/(\tan^2\eta + \sin^2\gamma)$$

Figure 15:
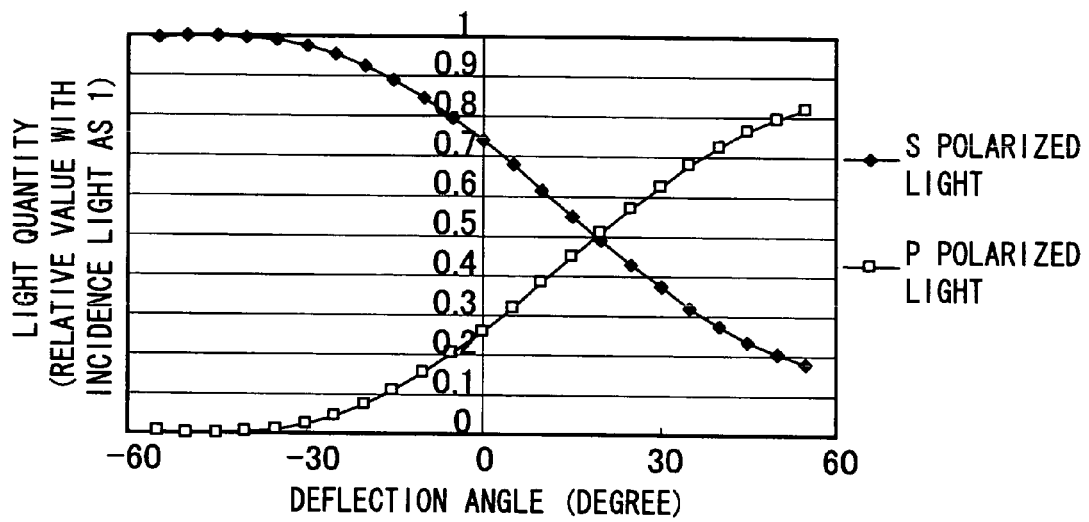
FIG. 15 is a descriptive graph showing results of light quantity calculation for an S polarized light component and a P polarized light component of an incident light to the plane mirror in Example 1.
Figure 16:
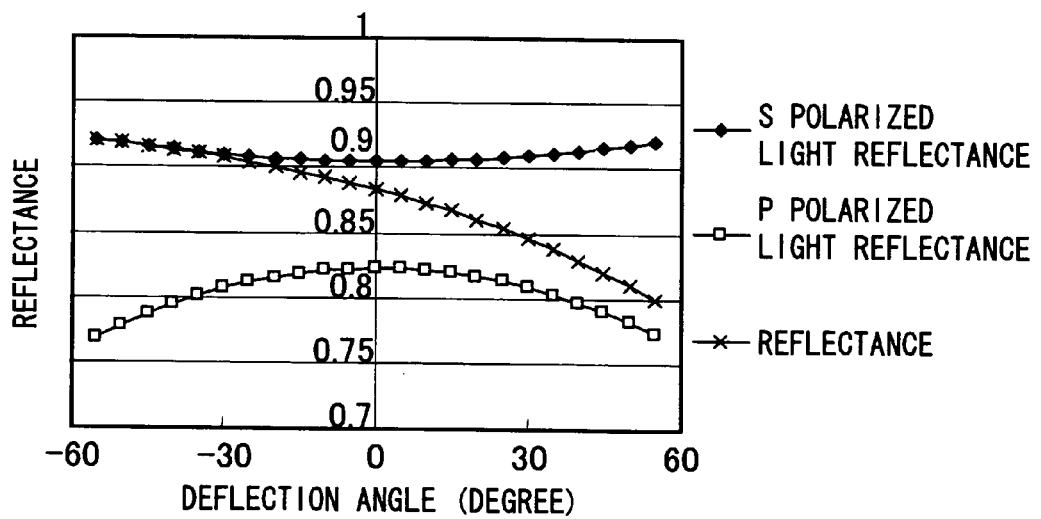
FIG. 16 is a descriptive graph showing results of rough estimation of reflectance on the plane mirror in Example 1.

FIG. 15 shows results of calculation of light quantities of the S polarized light component and the P polarized light component of incident light to the plane mirror 6 obtained with the both formulae. FIG. 16 is a descriptive graph showing results of rough estimation of reflectance on the plane mirror 6, obtained from data shown in FIGS. 10, 11 and 15.

The results are obtained on the assumption that the polarization state does not change after reflection (reflected light is almost linearly polarized light) on the polygon mirror 4 as described above. Actually, however, the S polarized light and the P polarized light are subjected to phase shifting upon reflection on the polygon mirror 4, and reflected light is transformed into elliptically polarized light. A shift in phase changes according to an incidence angle on the polygon mirror 4 and, with increase in incidence angle, a shift in phase becomes larger.

Figure 17:
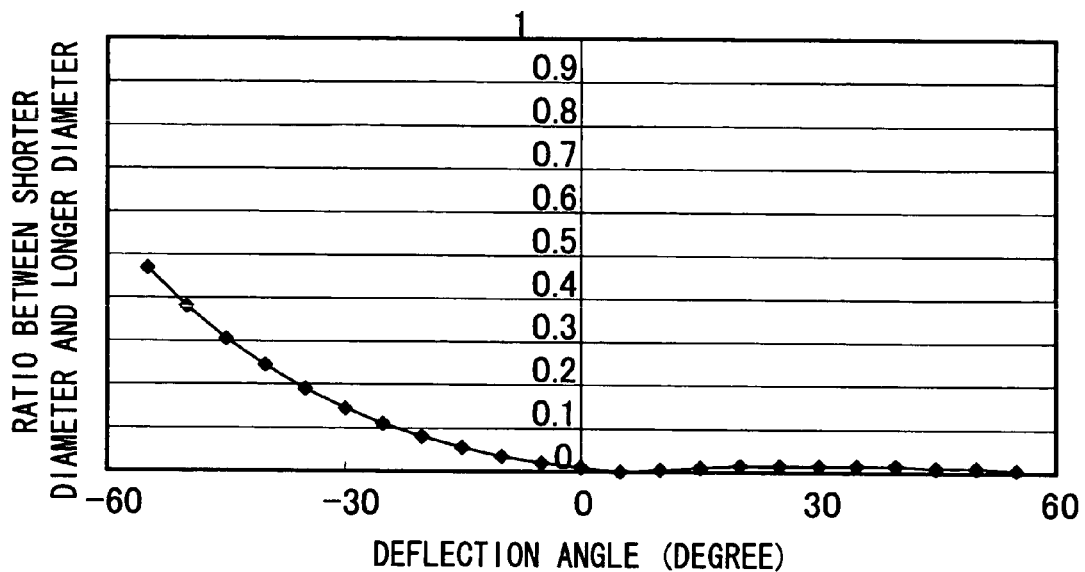
FIG. 17 is a descriptive graph showing results of calculation of a ratio between a shorter diameter and a longer diameter of elliptically polarized light after reflection on the polygon mirror in Example 1.
Figure 18:
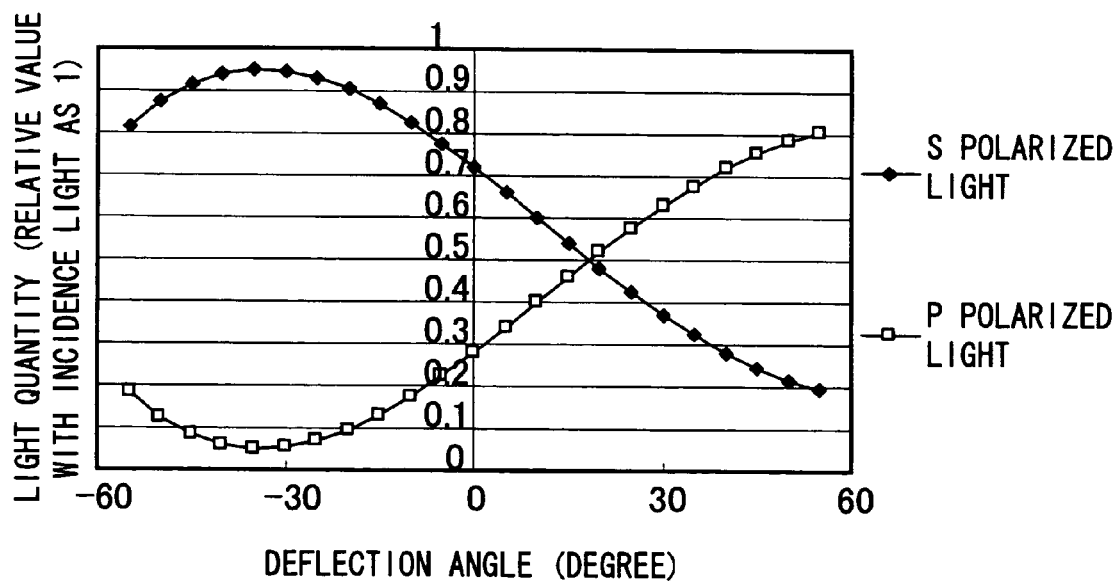
FIG. 18 is a descriptive graph showing results of light quantity calculation of the S polarized light component and the P polarized light component of incident light added with a phase shift to the plane mirror in Example 1.

FIG. 17 is a descriptive graph showing results of calculation of a ratio between a shorter diameter and a longer diameter of elliptically polarized light after reflection on the polygon mirror 4. Light with the ratio of 0 is linearly polarized light and light with the ratio of 1 is circularly polarized light. FIG. 18 shows results of light quantity calculation of the S polarized light component and the P polarized light component of incident light on the plane mirror 6, wherein a phase shift is correctly calculated.

Since at a deflection angle in the vicinity of the end of the minus side thereof, that is, at a deflection angle at which reflected light on the polygon mirror 4 is directed in the direction to the side farther from the laser light diode 1 with respect to the optical axis as a reference, an incidence angle on the polygon mirror 4 is large, the results of calculation of light quantities of the S polarized light and the P polarized light greatly differs from those of the case of FIG. 15 calculated neglecting a phase shift. As a result of that, errors of the results of reflectance on the plane mirror 6 shown in FIG. 4 and the results of reflectance shown in FIG. 16 are revealed in a region in the vicinity of the end of the minus side of a deflection angle.

A difference between light quantities of the S light polarized light on the minus and plus sides of a deflection angle are still conspicuous, for which no change occurs in fundamental way of thinking. That is, in order to cancel a difference between reflectance values on the polygon mirror 4 corresponding to both ends of an image with a difference between reflectance values on the plane mirror 6 corresponding to both ends of the image, it is only required to cause a difference between ratios of the S polarized light component and the P polarized light component of incident light to the plane mirror 6 to occur on the plus and minus sides of a deflection angle, for which the laser diode 1 has only to be rotated about the optical axis thereof. In this case, if a rotation direction is the reverse of the right direction, as shown in FIG. 8, the greatest of reflectance of light on the polygon mirror 4 corresponding to both sides of the image occurs on the same side (for example, on the plus side) of a deflection angle as on the plane mirror 6, which further increase a difference between reflectance values of light corresponding to both side of the image, which necessitates selection of the right rotation direction.

Figure 19:
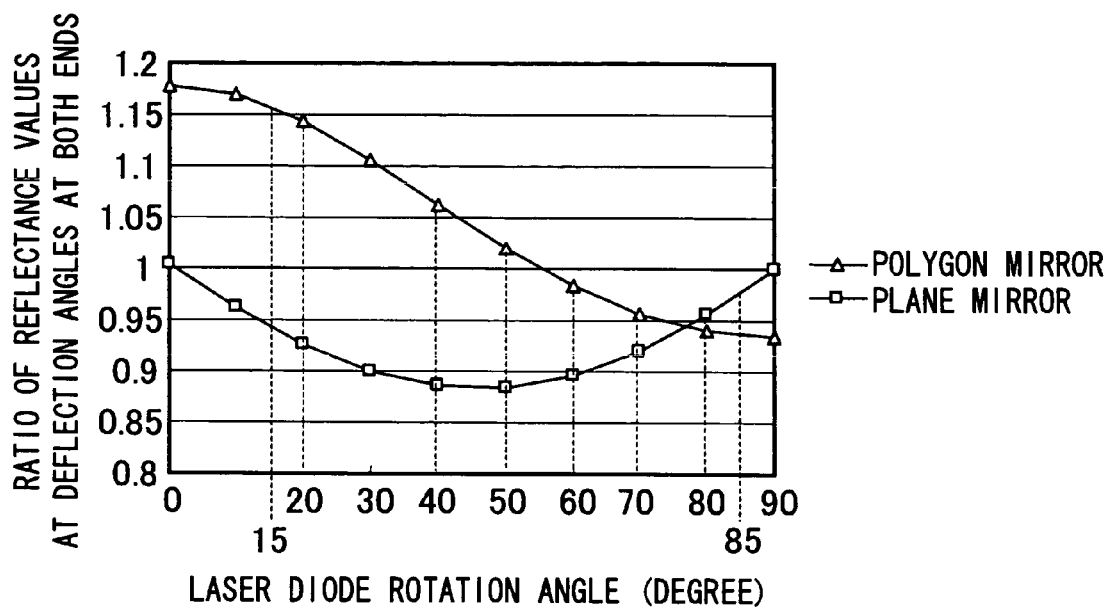
FIG. 19 is a descriptive graph showing changes in reflectance ratio accompanying a change in rotation angle about the optical axis of a laser diode in Example 1.

FIG. 19 is a descriptive graph showing changes in reflectance ratio accompanying a change in rotation angle about the optical axis of the laser diode 1. The abscissa is used for plotting values of an angle of rotation about the optical axis of the laser diode 1, that is, an angle $\gamma$ formed between the polarization direction of laser light and the X-Y plane, which is the deflection plane, and the ordinate is assigned to a numerical value obtained by dividing reflectance on the polygon mirror 4 and the plane mirror 6 at the deflection angle (+55 degrees) closest to the light source by reflectance on the polygon mirror 4 and the plane mirror 6 at the deflection angle (−55 degrees) at the end on the other side. Note that the construction other than part related to an angle of the laser diode 1 is the same as in Example 1.

In this example, it is found that a reflection ratio on the polygon mirror 4 and a reflection ratio on the plane mirror 6 in the vicinity of a value on the abscissa of 31.3 degrees are plotted on the ordinate so that both reflectance values are higher or lower than a reflection ratio of 1 by an equal difference, wherein both reflectance values are in a state of canceling each other. Note that both reflection ratio values which are not just in the relationship to cancel out each other can alleviate non-uniformity in light quantity.

Therefore, in a case where the laser diode 1 is rotated about the optical axis, as shown in FIG. 18, so that a proportion of the S polarized light contained in incident light to the plane mirror 6 at one deflection angle on the plus side of the two deflection angles corresponding to both ends of an image is smaller than that of the S polarized light contained in incident light to the plane mirror 6 at the other deflection angle on the minus side, it is said that the upper limit of the rotation angle (angle γ) is desirably 50 degrees or less, more desirably 40 degrees or less, from FIG. 19 in order to cancel (alleviate) a change in reflectance on the polygon mirror 4 with a change in reflectance on the plane mirror 6. On the other hand, it is said that the lower limit of the rotation angle is desirably 15 degrees or more, more desirably 20 degrees or more.

Therefore, a proper range of the rotation angle can be set in various ways by combinations of the upper limits and the lower limits. For example, it is said that an effect to some extent can be expected if the rotation angle is in the range of 15 degrees to 50 degrees, more desirably in the range from 20 degrees to 40 degrees. Furthermore, it is said that the rotation may also be thought to be either in the range from 15 degrees to 40 degrees or in the range from 20 degrees to 50 degrees.

On the other hand, with the rotation angle in the range of 60 degrees or more, a reflection ratio on the polygon mirror 4 and that on the plane mirror 6 are both on the side of 1 or less as a value thereof. If the rotation direction of the laser diode 1 is reversed as described above, a change in reflectance on the plane mirror 6 accompanying a change in deflection angle can be reversed in the direction of the change (see FIG. 8). In this case, in a way of a change in reflectance ratio on the plane mirror 6 accompanying a change in the rotation angle of the laser diode 1, the curve of reflectance on the plane mirror 6 shown in FIG. 19 are symmetrical with respect to the line parallel to the abscissa with the reflection ratio of 1.

Therefore, even in a case where the rotation direction of the laser diode 1 is in reverse, a change in reflectance on the polygon mirror 4 can be canceled (alleviated) with a change in reflectance on the plane mirror 6 with a rotation angle in the range where a curve of a reflectance ratio on the polygon mirror 4 and a curve of a reflectance ratio on the plane mirror 6 are symmetrical with respect to the line in parallel to the abscissa at the reflectance ratio of 1. It is said that the upper limit of the rotation angle (in the absolute value) is desirably 85 degrees or less, more desirably 80 degrees or less. On the other hand, it is said that the lower limit of the rotation angle (in the absolute value) is desirably 60 degrees or more, more desirably 70 degrees or more.

Therefore, it is said that an effect to some extent can be expected with the rotation angle (in the absolute value) in, for example, the set range from 60 degrees to 85 degrees, more desirably in the range from 70 degrees to 80 degrees. On the other hand, it is thought that the rotation angle (in the absolute value) may also be either in the range from 60 degrees to 80 degrees or in the range from 70 degrees to 85 degrees.

If the rotation direction of the laser diode 1 is in reverse, ways of changes in light quantities of the S polarized light and the P polarized light accompanying a change in deflection angle are the reverse of those shown in FIG. 18. That is, if the rotation direction of the laser diode 1 is in reverse, a proportion of the S polarized light contained in incident light on the plane mirror 6 at one defection angle on the plus side of the two deflection angles corresponding to both ends of an image becomes larger than that of the S polarized light contained in incident light on the plane mirror 6 at the other deflection angle on the minus side thereof.

Figure 20:
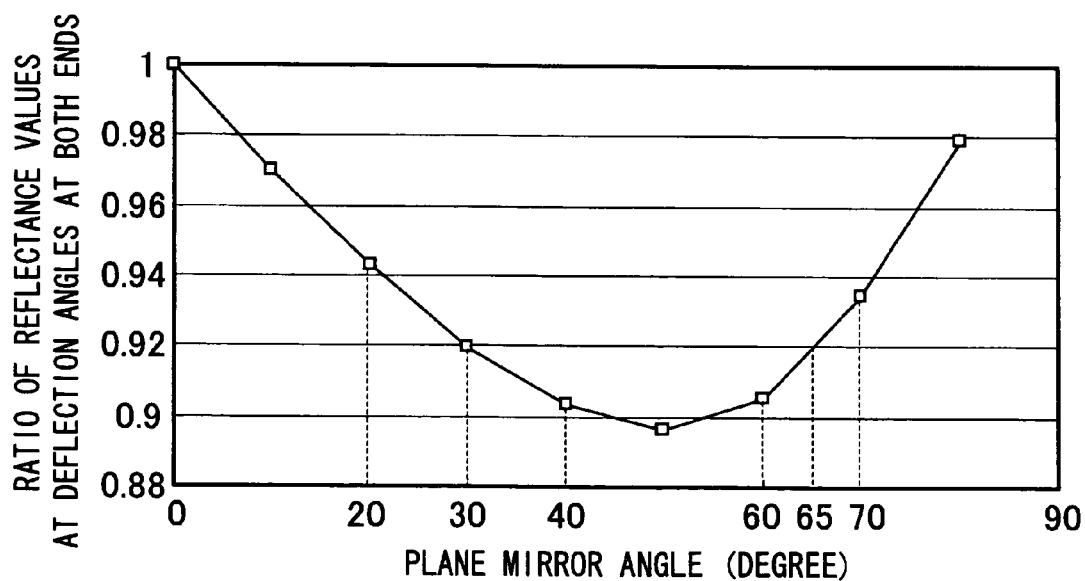
FIG. 20 is a descriptive graph showing a change in reflectance ratio accompanying a change in angle of the plane mirror in Example 1.

FIG. 20 is a descriptive graph showing a change in reflectance ratio accompanying a change in angle of the plane mirror 6. The abscissa is used for plotting an angle η between the normal line to the plane mirror 6 and the X-Y plane, while the ordinate is assigned to a numerical value obtained by dividing reflectance on the plane mirror 6 at the deflection angle (+55 degrees) closest to the light source by reflectance on the plane mirror 6 at the deflection angle (−55 degrees) at the end on the other side. Note that the construction of the optical system at stages before the plane mirror 6, such as the construction of the optical system other than angle of the plane mirror 6, is the same as in Example 1.

Since at an angle on the abscissa is 0 degree, reflected light is directed to the lens, no part of the optical system after the plane mirror 6 cannot be disposed unless the optical path is divided using another member, which negates the actual angle setting. Moreover, no difference occurs in light quantity on both sides, left and right, in the image width direction, disabling a difference in light quantity on the polygon mirror 4 to be canceled out.

On the other hand, in a case where the plane mirror 6 is, as described in this example, inclined relative to the X-Y plane, a ratio in reflectance at the deflection angles corresponding to both ends of an image, as shown in the figure, changes in company with a change in angle η. In order to cancel (alleviate) a change in reflectance on the polygon mirror 4 with a change in reflectance on the plane mirror 6, it is naturally required that reflectance of incident light on the plane mirror 6 changes between values on the plus side and the minus side of a deflection angle to some extent. In consideration of this aspect, it is said from FIG. 20 that the upper limit of an angle η of the plane mirror 6 is desirably 70 degrees or less, more desirably 65 degrees or less, furthermore preferably 60 degrees or less. On the other hand, it is said that the lower limit of an angle η of the plane mirror 6 is desirably 20 degrees or more, more desirably 30 degrees, furthermore desirably 40 degrees or more.

Therefore, a proper range of angles η on the plane mirror 6 can be set in various ways by combining the upper limits and the lower limits. For example, it is said that an angle η of the plane mirror 6 is desirably in the range from 20 degrees to 70 degrees, more desirably in the range from 30 degrees to 65 degrees, furthermore desirably in the range from 40 degrees to 60 degrees. Other choices for a range of angles η of the plane mirror 6 can also be thought as follows: the range from 20 degrees to 65 degrees, the range from 20 degrees to 60 degrees, the range from 30 degrees to 70 degrees, the range from 30 degrees to 60 degrees, the range from 40 degrees to 70 degrees, and the range from 40 degrees to 65 degrees.

Note that the laser scanning apparatus described in this example can also described in the following way. That is, the laser scanning apparatus of this example includes the laser diode 1 for emitting laser light, the polygon mirror 4 for deflecting laser light, and the plane mirror 6 for reflecting laser light deflected by the polygon mirror 4 in the direction to the photosensitive member 9, wherein incident light and refracted light on the polygon mirror 4 in a deflection plane perpendicular to the rotation axis of the polygon mirror 4, an angle formed between the normal line to the plane mirror 6 and the deflection plane is in the range from 20 degrees to 70 degrees, an angle formed between the polarization direction of laser light and the deflection plane is in the range from 15 degrees to 50 degrees, and the laser diode 1 is rotated about the optical axis so that a proportion of the S polarized light contained in light incident on the plane mirror 6 as reflected light on the polygon mirror 4 at one deflection angle on the side closer to the laser diode 1 of the two deflection angles corresponding to both ends of an image is smaller than that of the S polarized light contained in light incident on the plane mirror 6 as reflected light on the polygon mirror 4 at the other deflection angle on the side farther from the laser diode 1.

The laser scanning apparatus described in this example can also described in the following way. That is, the laser scanning apparatus of this example includes the laser diode 1 for emitting laser light, the polygon mirror 4 for deflecting laser light, and the plane mirror 6 reflecting laser light deflected by the polygon mirror 4 in the direction to the photosensitive member 9, wherein incident light and refracted light on the polygon mirror 4 in a deflection plane perpendicular to the rotation axis of the polygon mirror 4, an angle formed between the normal line to the plane mirror 6 and the deflection plane is in the range from 20 degrees to 70 degrees, an angle formed between the polarization direction of laser light and the deflection plane is in the range from 60 degrees to 85 degrees, and the laser diode 1 is rotated about the optical axis so that a proportion of the S polarized light contained in light incident on the plane mirror 6 as reflected light on the polygon mirror 4 at one deflection angle on the side closer to the laser diode 1 of the two deflection angles corresponding to both ends of an image is larger than that of the S polarized light contained in light incident on the plane mirror 6 as reflected light on the polygon mirror 4 at the other deflection angle on the side farther from the laser diode 1.

Note that while in this example, description is given of an example in which the invention is applied to a scanning optical system covering as wide a deflection angle as 110 degrees on the polygon mirror 4, the invention can be applied to a scanning optical system with a range of an deflection angle of 110 degrees or less. In this aspect, this applies to examples below described in a similar way. In a scanning optical system with a deflection angle of 100 degrees or more, however, reflection angles on the polygon mirror 4 of light corresponding to both ends of an image are greatly different from each other with the result that since a difference between reflectance values is large, non-uniformity in light quantity distribution in the image width direction becomes more conspicuous. Therefore, an effect of the invention to achieve uniformity in light quantity distribution in the image width direction can be especially great in application of the invention to a wide angle scanning optical system.

Second Embodiment

Description will be given of another embodiment of the invention below based on accompanying drawings. Note that the same constituents in the construction as in the first embodiment are attached with the same numerical symbols; therefore, descriptions thereof will not be given herein.

Figure 21:
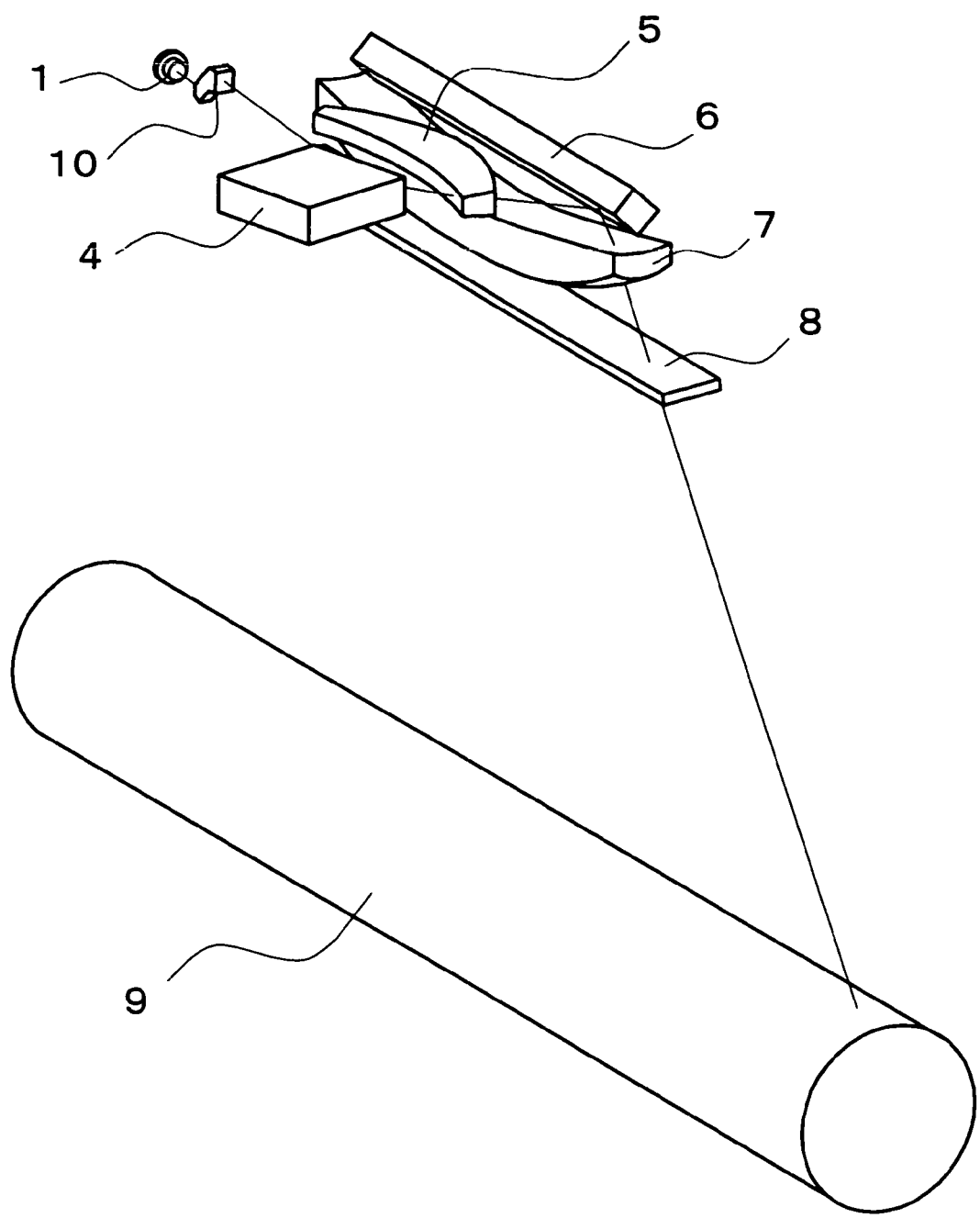
FIG. 21 is a perspective view showing a schematic construction of a laser scanning apparatus according to a second embodiment of the invention.

FIG. 21 is a perspective view showing a schematic construction of a laser scanning apparatus according to this embodiment. The laser scanning apparatus is similar to that of the first embodiment except that the collimator lens 2 and the cylindrical lens 3 in the first embodiment are replaced with an optical element 10.

The optical element 10 is a single resin element having a diffractive plane and reflecting plane. To be more specific, a light incidence surface and a light emission surface of the optical element 10 are both of a diffractive surface, which is an axially symmetrical aspherical surface, and two reflecting surfaces each having a free curved surface are provided in an optical path therebetween. A reflecting surface is designed so as to totally reflect incident light thereon.

In a case where an optical system on the side of the light source is constructed with resin as described in this embodiment, if a refractive power is given to a transmitting surface, when a change in temperature occurs, since the refractive index of the resin changes more than that of glass, great defocusing results. Therefore, in the optical element 10, by using a reflecting surface having collecting action and a wavelength dependency of the diffractive plane, defocusing when temperature changes is minimized.

In the laser scanning apparatus of this embodiment, laser light emitted by a laser diode 1 is directed to the optical element 10, light emitted from the optical element 10 is transformed into parallel light in the main scanning direction and converging light in the auxiliary direction by the action thereof to thereby collect incident light on a light reflecting surface of the polygon mirror 4 only in the auxiliary scanning direction. Then, incident light is reflected on the light reflecting surface and, also, a reflection direction thereof changes in the main scanning direction by rotation of the polygon mirror 4. Laser light thus deflected by the polygon mirror 4 is refracted by a scanning optical system first lens 5, is reflected by a plane mirror 6, is again refracted by a scanning optical system second lens 7 and, thereafter, is transmitted through a window 8 and is collected on a photosensitive member 9.

Then, description will be given of optical design in the laser scanning apparatus of the embodiment below as Example 2.

Table 8 shows the optical system of this example numerically with coordinate data of optical surfaces thereof. A way to express the coordinates is similar to that in Example 1. Note that, in Table 8, surface Nos. 1 and 4 indicate a diffractive surface on the light incidence side and a diffractive surface on the light emission side of the optical element 10, surface Nos. 2 and 3 indicate respective two reflecting surfaces disposed in an optical path between the diffractive surfaces on the light incidence side and the light emission side.

Coordinates of the polygon mirror 4 is coordinates of a light reflecting surface when the center of an image is formed. Optical elements of this example are made of glass or resin. To be mode specific, the optical element 10 is made of resin with a refractive index of 1.524. Both of the scanning optical system first lens 5 and the scanning optical system second lens 7 are made of resin with a refractive index of 1.537. The window 8 is made of glass with a refractive index of 1.511. The refractive indexes are values measured at a wavelength of 780 nm.

TABLE 8

| Surface | | Local coordinate original point | | | Local coordinate x-axis vector | | | Local coordinate y-axis vector | | |
|---|---|---|---|---|---|---|---|---|---|---|
| No. | Name | X | Y | Z | X | Y | Z | X | Y | Z |
| 1 | Optical element | 4.74 | 54.19 | −0.70 | −0.0872 | −0.9962 | 0.0000 | 0.9962 | −0.0872 | 0.0000 |
| 2 | | 4.45 | 50.91 | −4.00 | −0.0560 | −0.6403 | −0.7660 | 0.9962 | −0.0872 | 0.0000 |

TABLE 8-continued

| Surface | | Local coordinate original point | | | Local coordinate x-axis vector | | | Local coordinate y-axis vector | | |
|---|---|---|---|---|---|---|---|---|---|---|
| No. | Name | X | Y | Z | X | Y | Z | X | Y | Z |
| 3 | | 0.39 | 50.20 | 0.00 | 0.0560 | 0.6403 | 0.7660 | 0.9962 | −0.0872 | 0.0000 |
| 4 | | 4.00 | 45.72 | −4.50 | −0.0872 | −0.9962 | 0.0000 | 0.9962 | −0.0872 | 0.0000 |
| 5 | Polygon mirror | −2.48 | 1.86 | 0.00 | −0.7373 | −0.6756 | 0.0000 | 0.6756 | −0.7373 | 0.0000 |
| 6 | Scanning | 10.00 | 0.00 | 0.00 | 1.0000 | 0.0000 | 0.0000 | 0.0000 | 1.0000 | 0.0000 |
| 7 | optical system first lens | 19.00 | 0.00 | 0.00 | 1.0000 | 0.0000 | 0.0000 | 0.0000 | 1.0000 | 0.0000 |
| 8 | Plane mirror | 25.00 | 0.00 | 0.00 | 0.7071 | 0.0000 | 0.7071 | 0.0000 | 1.0000 | 0.0000 |
| 9 | Scanning | 25.00 | 0.00 | −9.00 | 0.0000 | 0.0000 | −1.0000 | 0.0000 | 1.0000 | 0.0000 |
| 10 | optical system second lens | 25.00 | 0.00 | −17.00 | 0.0000 | 0.0000 | −1.0000 | 0.0000 | 1.0000 | 0.0000 |
| 11 | Window | 25.00 | 0.00 | −20.00 | 0.0872 | 0.0000 | −0.9962 | 0.0000 | 1.0000 | 0.0000 |
| 12 | | 25.16 | 0.00 | −21.79 | 0.0872 | 0.0000 | −0.9962 | 0.0000 | 1.0000 | 0.0000 |
| 13 | Evaluation surface | 25.00 | 0.00 | −106.14 | 0.0000 | 0.0000 | −1.0000 | 0.0000 | 1.0000 | 0.0000 |

Table 9 to 16 show shapes of the optical surfaces, wherein $E-n = \times 10^{-n}$.

TABLE 9

Surface 1: Axially symmetrical aspherical surface/diffractive surface

| Order | Coefficient |
|---|---|
| | Aspherical coefficient |
| 0 | 1.89102E−01 |
| 1 | 2.12154E−02 |
| 2 | −1.70428E−02 |
| 3 | −4.69970E−03 |
| 4 | 1.07006E−03 |
| 5 | −8.05513E−05 |
| | Phase coefficient |
| 1 | 3.90000E+01 |
| 2 | −2.00000E+01 |

TABLE 10

Surface 2: Free curved surface/reflecting surface

| | | | | j | | | |
|---|---|---|---|---|---|---|---|
| i | 0 | 1 | 2 | 3 | 4 | 5 | 6 |
| 0 | 0.00000E+00 | 0.00000E+00 | 1.08622E−02 | −7.90311E−04 | 3.01037E−05 | −1.25511E−06 | 9.56282E−06 |
| 2 | 1.96109E−02 | −1.29464E−03 | 7.76082E−05 | 1.46921E−05 | −2.85730E−05 | 0.00000E+00 | 0.00000E+00 |
| 4 | 1.62449E−04 | −7.47386E−05 | −1.93141E−05 | 6.01255E−07 | 0.00000E+00 | 0.00000E+00 | 0.00000E+00 |
| 6 | −9.39850E−05 | 7.92631E−05 | −3.83092E−05 | 0.00000E+00 | 0.00000E+00 | 0.00000E+00 | 0.00000E+00 |
| 8 | 2.57201E−06 | −9.15292E−06 | 0.00000E+00 | 0.00000E+00 | 0.00000E+00 | 0.00000E+00 | 0.00000E+00 |
| 10 | 5.65263E−07 | 0.00000E+00 | 0.00000E+00 | 0.00000E+00 | 0.00000E+00 | 0.00000E+00 | 0.00000E+00 |

TABLE 11

Surface 3: Free curved surface/reflecting surface

| | | | | j | | | |
|---|---|---|---|---|---|---|---|
| i | 0 | 1 | 2 | 3 | 4 | 5 | 6 |
| 0 | 0.00000E+00 | 0.00000E+00 | −1.57065E−02 | −4.21307E−04 | −1.29275E−05 | −1.51847E−07 | −9.50866E−07 |
| 2 | −3.00472E−02 | −9.27473E−04 | −4.63713E−05 | −2.48752E−06 | 2.09459E−06 | 0.00000E+00 | 0.00000E+00 |
| 4 | −5.72938E−05 | −1.74695E−05 | 1.24458E−06 | 3.76590E−07 | 0.00000E+00 | 0.00000E+00 | 0.00000E+00 |
| 6 | 9.52813E−06 | 6.29619E−06 | 2.21755E−06 | 0.00000E+00 | 0.00000E+00 | 0.00000E+00 | 0.00000E+00 |
| 8 | −4.87264E−08 | −3.83706E−07 | 0.00000E+00 | 0.00000E+00 | 0.00000E+00 | 0.00000E+00 | 0.00000E+00 |
| 10 | −1.26463E−08 | 0.00000E+00 | 0.00000E+00 | 0.00000E+00 | 0.00000E+00 | 0.00000E+00 | 0.00000E+00 |

TABLE 12

Surface 4: Axially symmetrical aspherical surface/diffractive surface

| Order | Coefficient |
|---|---|
| Aspherical coefficient | |
| 0 | −3.93597E−02 |
| 1 | −1.88582E−02 |
| 2 | −1.13934E−02 |
| 3 | 6.18481E−03 |
| 4 | −6.20916E−04 |
| 5 | 2.49078E−05 |
| Phase coefficient | |
| 1 | 5.95000E+01 |
| 2 | −1.25000E+01 |

TABLE 13

Surface 6: Spherical surface

| Curvature |
|---|
| −1.23077E−02 |

TABLE 14

Surface 7: Free curved surface

| i\j | 0 | 2 | 4 |
|---|---|---|---|
| 0 | 0.00000E+00 | 6.31819E−04 | 2.51094E−04 |
| 1 | −3.34588E−02 | 1.68819E−04 | 6.81500E−06 |
| 2 | −1.67254E−02 | −3.35059E−06 | −1.01527E−07 |
| 3 | 8.24165E−06 | −3.09783E−07 | 1.62467E−08 |
| 4 | 5.32318E−06 | −4.49762E−08 | 4.46727E−09 |
| 5 | −4.76591E−09 | 5.61768E−10 | −5.31836E−11 |
| 6 | 6.74834E−11 | 1.96155E−10 | −8.94684E−12 |
| 7 | −1.34126E−10 | 1.08472E−12 | 0.00000E+00 |
| 8 | −1.89160E−11 | −1.63600E−13 | 0.00000E+00 |
| 9 | 1.34549E−13 | −2.76478E−15 | 0.00000E+00 |
| 10 | 1.61096E−14 | −6.61416E−17 | 0.00000E+00 |

TABLE 15

Surface 9: Free curved surface

| i\j | 0 | 2 | 4 |
|---|---|---|---|
| 0 | 0.00000E+00 | −2.30203E−02 | −1.11385E−05 |
| 1 | 4.91824E−03 | −6.45694E−05 | 2.84010E−07 |
| 2 | −5.33286E−03 | −1.67552E−05 | −1.79537E−08 |
| 3 | 5.71972E−06 | 1.23638E−07 | −5.56901E−10 |
| 4 | 2.81596E−06 | 1.85692E−08 | 1.90288E−11 |
| 5 | −3.10832E−09 | −4.68314E−11 | 2.52811E−13 |
| 6 | −1.21849E−09 | −4.84442E−12 | −4.44330E−15 |
| 7 | −1.63506E−12 | −1.09125E−14 | 0.00000E+00 |
| 8 | 1.94633E−13 | −1.30101E−15 | 0.00000E+00 |
| 9 | 5.84150E−16 | 5.40638E−18 | 0.00000E+00 |
| 10 | −3.39189E−19 | 5.42001E−19 | 0.00000E+00 |

TABLE 16

Surface 10: Free curved surface

| i\j | 0 | 2 | 4 |
|---|---|---|---|
| 0 | 0.00000E+00 | −5.11147E−02 | −4.06281E−05 |
| 1 | 2.60564E−02 | −6.15143E−06 | −1.04385E−07 |
| 2 | −2.43669E−03 | 7.36107E−06 | 7.99384E−09 |

TABLE 16-continued

Surface 10: Free curved surface

| i\j | 0 | 2 | 4 |
|---|---|---|---|
| 3 | −8.19647E−06 | −8.53906E−09 | 2.01257E−10 |
| 4 | −1.96725E−06 | −1.30368E−08 | −1.91486E−11 |
| 5 | 9.82331E−09 | 5.39649E−11 | −6.05222E−14 |
| 6 | 9.63681E−10 | 9.41269E−12 | 5.95987E−15 |
| 7 | −4.59673E−12 | −3.29775E−14 | 0.00000E+00 |
| 8 | −3.20402E−13 | −3.32010E−15 | 0.00000E+00 |
| 9 | 5.86067E−16 | 5.08358E−18 | 0.00000E+00 |
| 10 | 3.75318E−17 | 3.76627E−19 | 0.00000E+00 |

Note that a shape of an axially symmetrical diffractive surface is expressed by the following mathematical expression 4, wherein $a_i$ is an aspherical coefficient.

(Mathematical expression 4)

$$x = \sum_{i=0}^{5} a_i \left(\sqrt{y^2 + z^2}\right)^i$$

A phase function of an axially symmetrical diffractive surface is expressed by the following mathematical expression 5, wherein $b_i$ is a phase coefficient.

(Mathematical expression 5)

$$p = \sum_{i=0}^{2} b_i \left(\sqrt{y^2 + z^2}\right)^i$$

Figure 22:
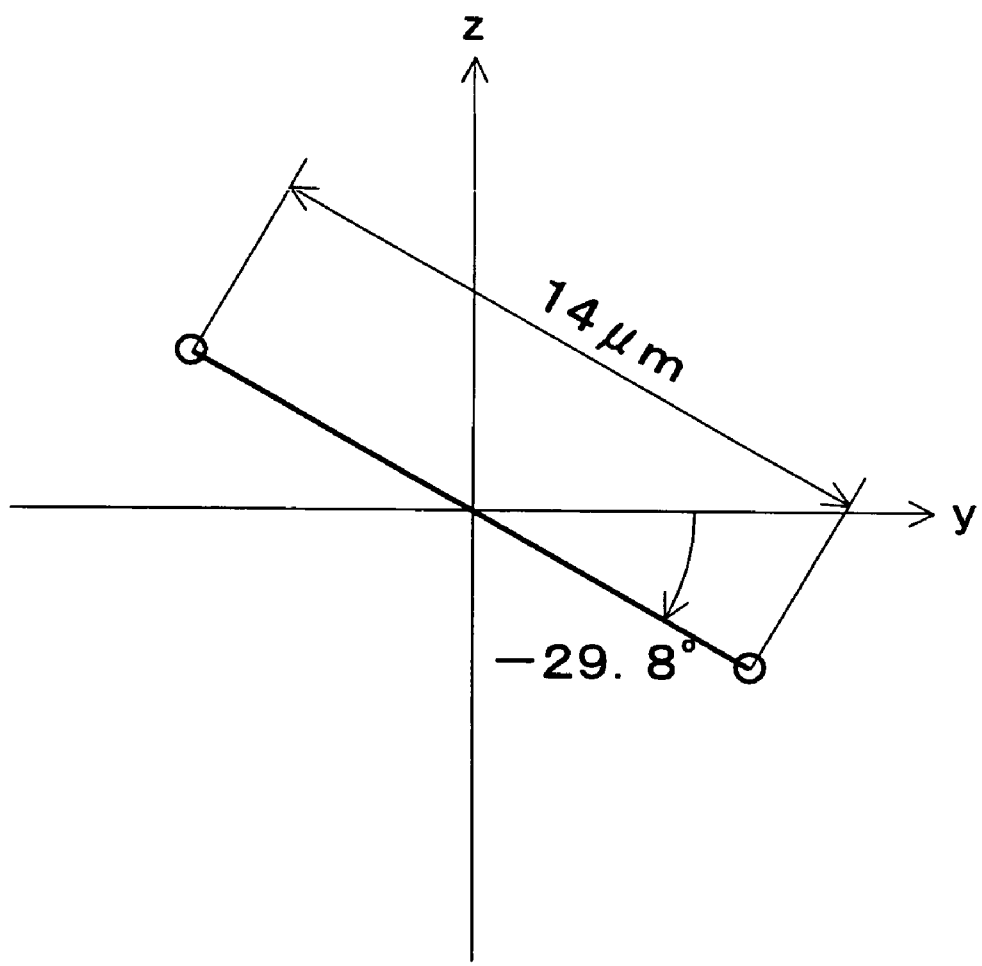
FIG. 22 is a descriptive view showing a state of light emission points of a laser diode observed from the side of an optical element in the laser scanning apparatus.

FIG. 22 is a descriptive view showing a state of light emission points of the laser diode 1 observed from the side of the optical element 10. In this example, as well, the laser diode 1 has two light emission points and a spacing therebetween is 14 μm. The polarization direction of laser light is aligned with a direction along which the two light emission points are disposed. The laser diode 1 is inclined relative to the horizontal plane (deflection plane) by −29.8 degrees about the optical axis of the optical element 10. That is, in this example, a direction of inclination from the deflection plane of the polarization of laser light is the reverse of Example 1.

Even with such a construction adopted, since laser light is emitted from the two points deviated with respect to main scanning and auxiliary scanning, collected points of incident light including two laser beams impinging on the photosensitive member 9 through an optical system are deviated from each other in the main scanning direction and the auxiliary scanning direction. In this example, the two laser beams are collected to positions deviated from each other by 85 μm in the main scanning direction and by 42 μm in the auxiliary scanning direction.

Figure 23:
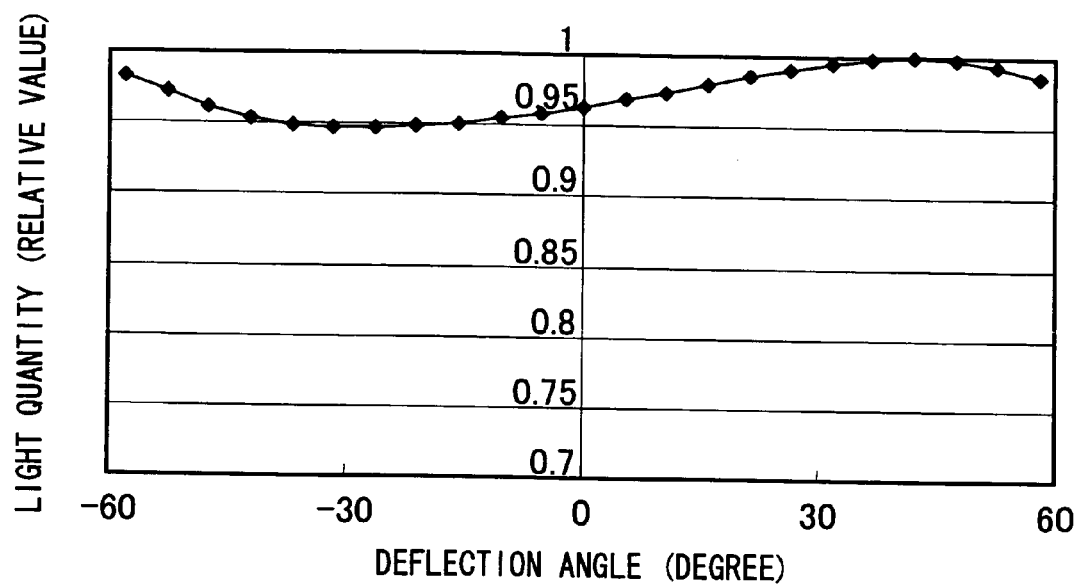
FIG. 23 is a descriptive graph showing light quantity distribution on a photosensitive member in Example 2.

FIG. 23 is a descriptive graph showing light quantity distribution on the photosensitive member 9 in this example. In FIG. 23, an illumination light quantity onto the photosensitive member 9 changing in company with a change in a deflection angle of light reflected by the polygon mirror 4 is indicated under normalization with the maximum value as 1.

Figure 24:
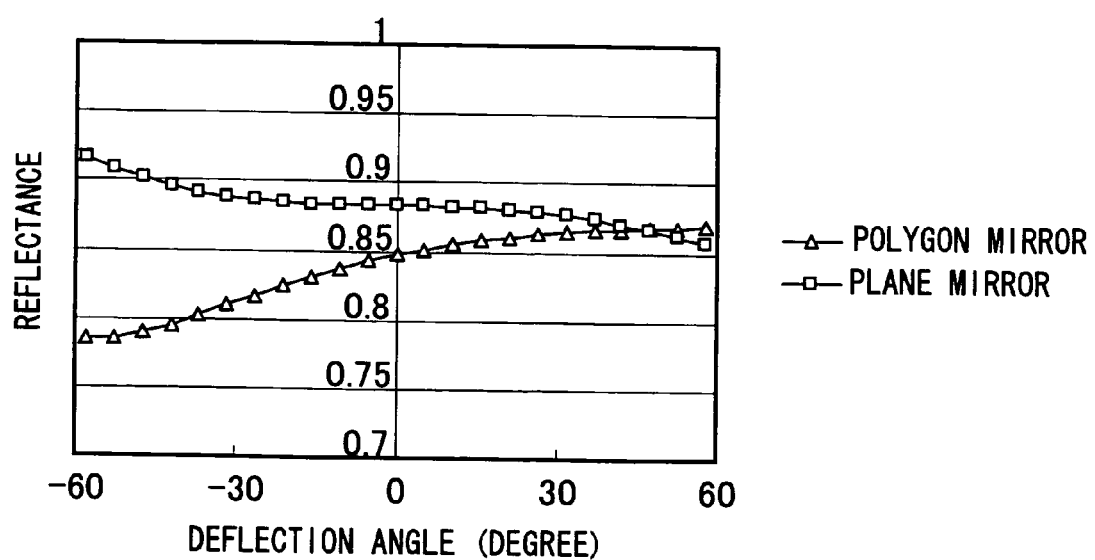
FIG. 24 is a descriptive graph showing changes in reflectance accompanying a change in deflection angle in a polygon mirror and a plane mirror in Example 2.
Figure 25:
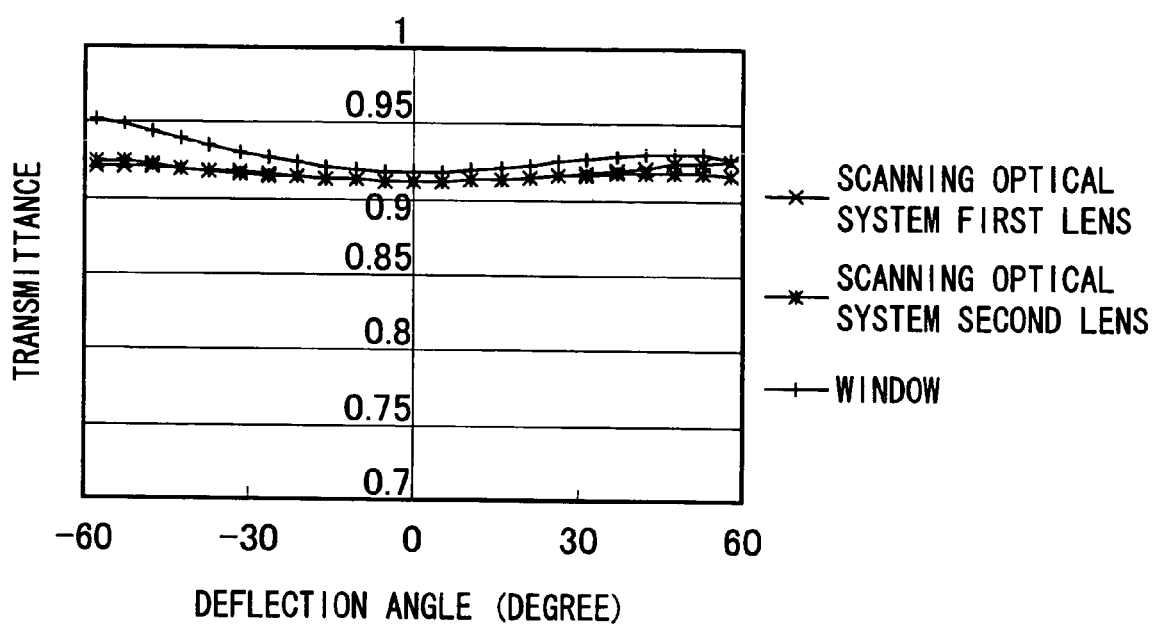
FIG. 25 is a descriptive graph showing changes in transmittance accompanying a change in deflection angle in a scanning optical system first lens, a scanning optical system second lens and a window in Example 2.

FIG. 24 is a descriptive graph showing changes in reflectance accompanying a change in deflection angle in the polygon mirror 4 and the plane mirror 6 in this example. FIG. 25 is a descriptive graph showing changes in transmittance accompanying a change in deflection angle in the scanning optical system first lens 5, the scanning optical system second lens 7 and the window 8 in this example.

In a reflecting surface that is a free curved surface of the optical element 10 of this example, laser light is totally reflected. In this situation, if the polarization direction of laser light is vertical on the incidence side, the laser light becomes almost all P polarized light on a reflecting surface. On the other hand, if the polarization direction of laser light is horizontal on the incidence side, the laser light becomes almost all S polarized light on a reflecting surface. In the cases, a state of polarization of light emitted from the optical element 10 is kept of linear polarization with the same polarization direction as prior to incidence.

In a case where the polarization direction of laser light is neither vertically nor horizontally on the incidence side but with an angle relative to the vertical or horizontal direction, reflected light has the S polarized light and the P polarized light in a mixed state on a reflecting surface. In this case, the S polarized light and the P polarized light becomes different in phase from each other after reflection, and emitted laser light becomes elliptically polarized light. In this example, a state of polarization of laser light impinging on the polygon mirror 4 is of elliptic polarization, in which aspect the example is different from Example 1.

A component becoming the S polarized light when impinging on the polygon mirror 4 is a P polarized light component when impinging on the two reflecting surfaces of the optical element 10. On the other hand, a component becoming the P polarized light when impinging on the polygon mirror 4 is S polarized light components on both of the two light reflecting surfaces when impinging thereon. Therefore, if the rotation angle about the optical axis of the laser diode 1 is the same, intensities of the S polarized light and the P polarized light are the same as in the case of Example 1.

Since, in Examples 1 and 2, deflection angles and the absolute values of the rotation angles about the optical axis of the laser diode 1 are similar to each other though not the same as each other, the polygon mirror 4 of FIG. 4 and the polygon mirror 4 of FIG. 24 are similar in a way of change in reflectance thereon to each other. The plane mirror 6 of FIG. 4 and the plane mirror 6 of FIG. 24 are not similar to each other in a way of change in reflectance thereon to each other under an influence of transforming to elliptic polarization caused by the optical element 10.

Figure 26:
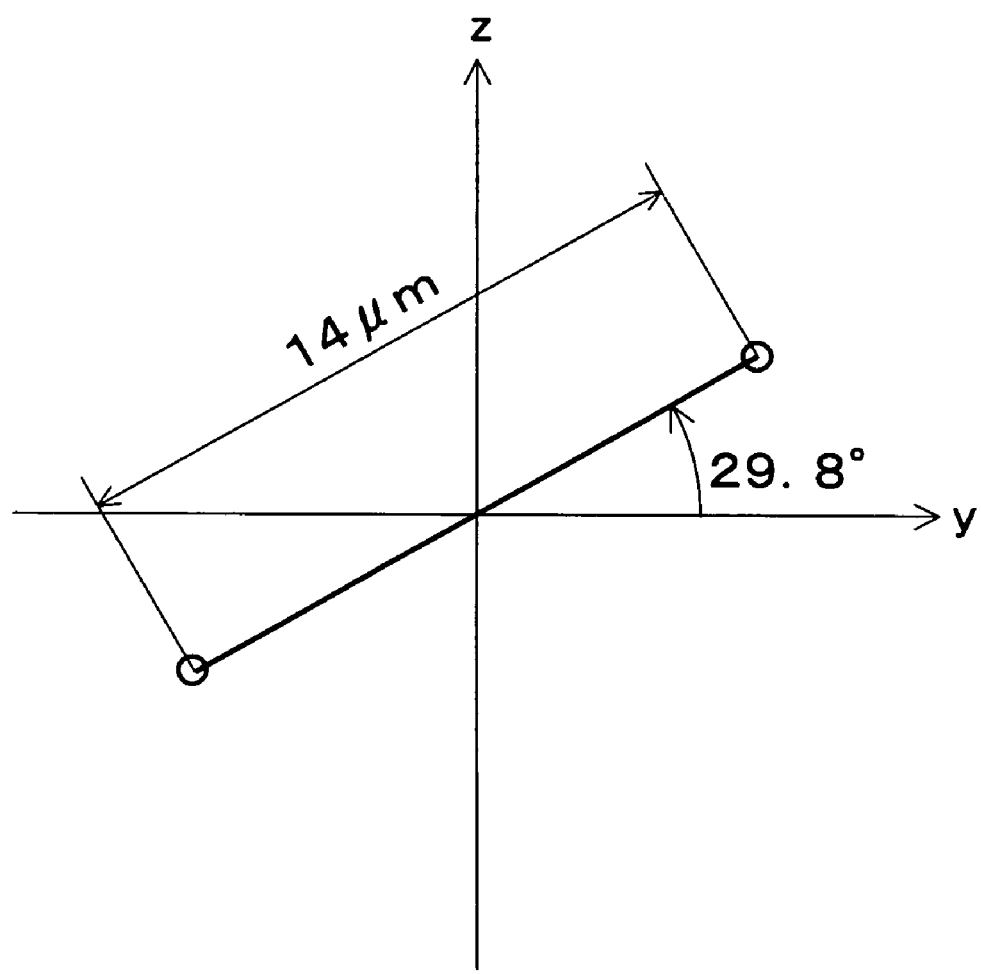
FIG. 26 is a descriptive view showing a state of light emission points of a laser diode observed from the side of an optical element in Comparative Example 2.

FIG. 26 is a descriptive view showing a state of light emission points of the laser diode 1 observed from the side of the optical element 10 in a case where an inclination of the laser diode 1 is the reverse of that in Example 2, that is, in a case where the laser diode 1 is inclined about the optical axis of the optical element 10 to an angle of 29.8 degrees relative to the horizontal plane (deflection plane) in a direction opposite that in Example 2. Note that, an optical system with the laser diode 1 arranged in this way is the optical system of Comparative Example 2.

Figure 27:
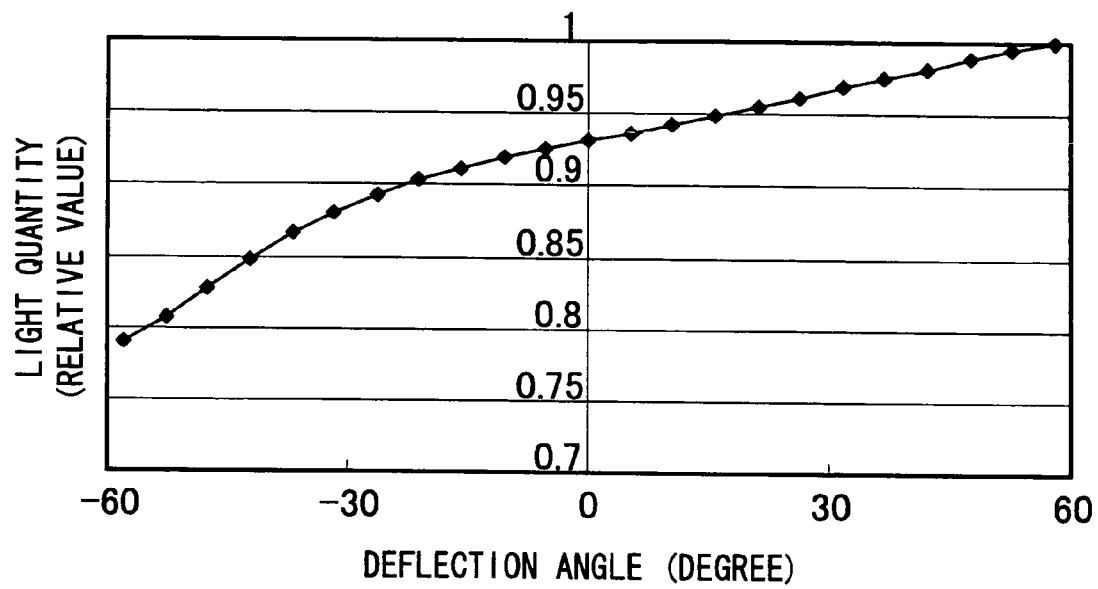
FIG. 27 is a descriptive graph showing light quantity distribution on a photosensitive member in Comparative Example 2.
Figure 28:
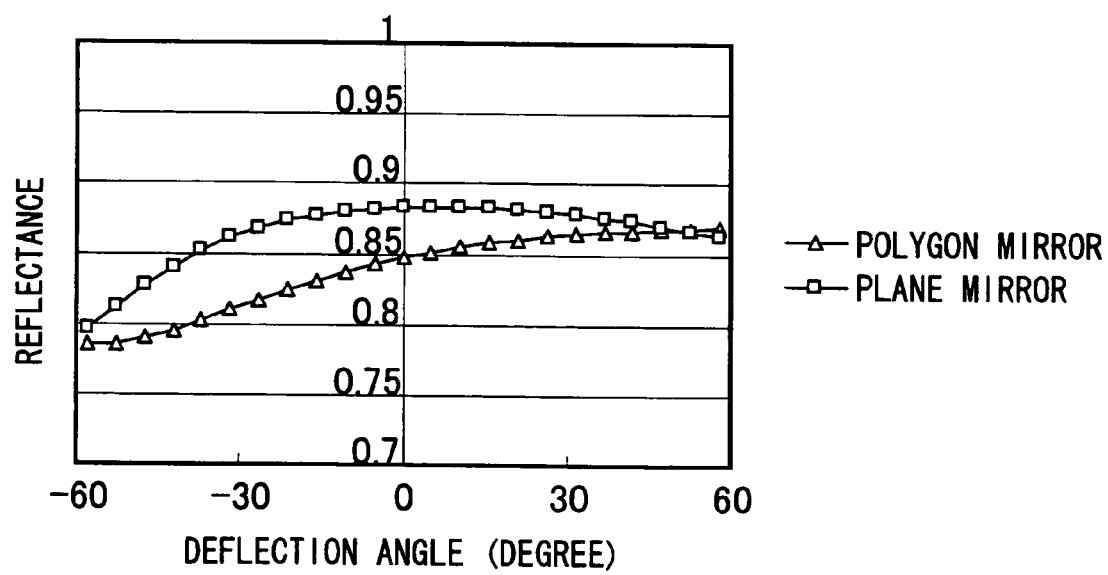
FIG. 28 is a descriptive graph showing changes in reflectance accompanying a change in deflection angle on a polygon mirror and a plane mirror in Comparative Example 2.
Figure 29:
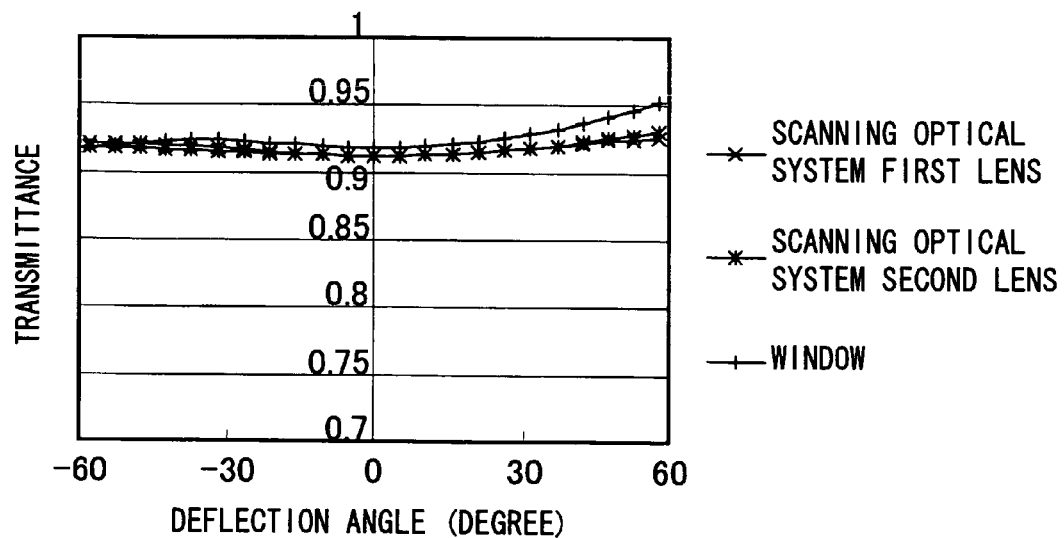
FIG. 29 is a descriptive graph showing changes in transmittance accompanying a change in deflection angle in a scanning optical system first lens, a scanning optical system second lens and a window in Comparative Example 2.

FIG. 27 is a descriptive graph showing light quantity distribution on the photosensitive member 9 in Comparative Example 2. In FIG. 27, as well, an illumination light quantity onto the photosensitive member 9 changing in company with a change in deflection angle of light reflected by the polygon mirror 4 is shown under normalization with the maximum value as 1. FIG. 28 is a descriptive graph showing changes in reflectance accompanying a change in deflection angle on the polygon mirror 4 and the plane mirror 6 in Comparative Example 2. FIG. 29 is a descriptive graph showing changes in transmittance accompanying a change in deflection angle in the scanning optical system first lens 5, the scanning optical system second lens 7 and the window 8 in Comparative Example 2.

Since, in Comparative Example 2 as well, the two laser beams are collected to positions deviated from each other by 85 $\mu$m in the main scanning direction and by 42 $\mu$m in the auxiliary scanning direction, image-formation is enabled with plural laser light beams. As shown in FIG. 27, however, it is found that there arises a difference in light quantity distribution on the photosensitive member 9 at both ends of a deflection angle in the respective both ends (±58 degrees) is larger than in Example 2. This is because if the rotation direction of the laser diode 1 about the optical axis is in reverse as described in FIG. 26, a way of a change in reflectance on the plane mirror 6 accompanying a change in deflection angle becomes the reverse of that in the case of FIG. 24 (see FIG. 28), and a change in reflectance on the polygon mirror 4 cannot be canceled with a change in reflectance on the plane mirror 6.

Description will be given of details of design of an optical system in which a change in reflectance on the polygon mirror 4 accompanying a change in deflection angle is canceled with a change in reflectance on the plane mirror 6 accompanying in the change in deflection angle.

Figure 30:
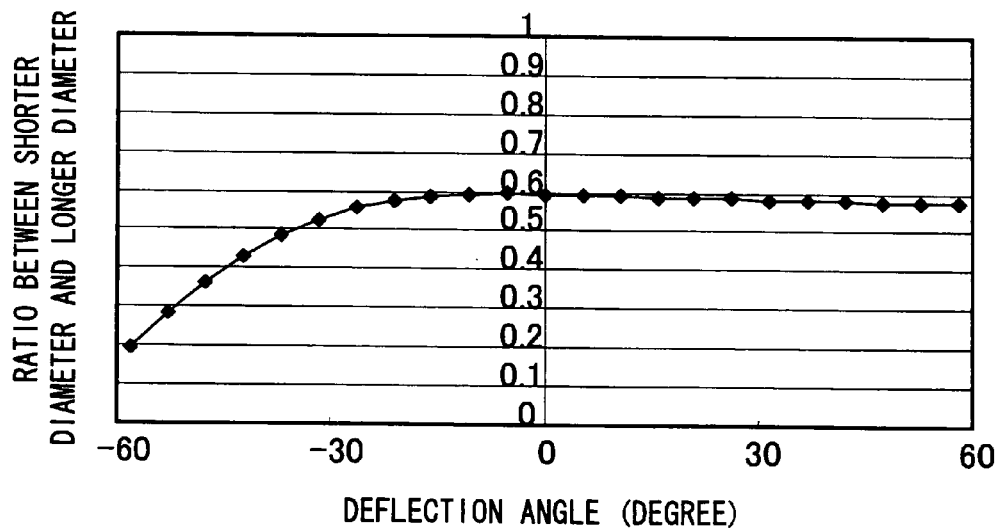
FIG. 30 is a descriptive graph showing results of calculation of a ratio between a shorter diameter and a longer diameter of elliptically polarized light after reflection on the polygon mirror in Example 2.
Figure 31:
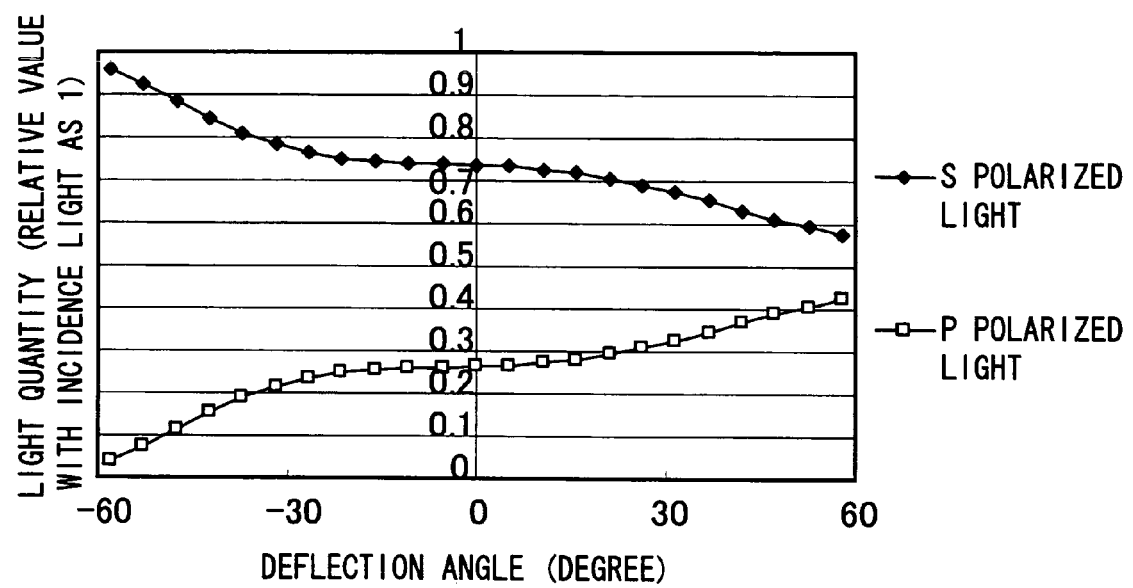
FIG. 31 is a descriptive graph showing light quantities of an S polarized light component and a P polarized light component of incident light to the plane mirror in Example 2.

FIG. 30 is results of calculation of a ratio between a shorter diameter and a longer diameter of elliptically polarized light after reflection on the polygon mirror 4. If this ratio is 0, linearly polarized light is reflected and, if the ratio is 1, circularly polarized light is reflected. FIG. 31 is a descriptive graph showing light quantities of an S polarized light component and a P polarized light component of incident light to the plane mirror 6 changing in company with a change in deflection angle in this example. While light incident on the polygon mirror 4 is elliptically polarized light, a phase shift between the S polarized light and the P polarized light becomes larger with increase in incidence angle on the polygon mirror 4; therefore, a state of polarization after reflection on the polygon mirror 4 is different according to a deflection angle which leads to a state close to linear polarization on the minus side of a deflection angle. Eventually, a ratio between the S polarized light and the P polarized light in light incident on the plane mirror 6 differs between values on the plus side of a deflection angle and the minus side thereof, resulting in a difference between reflectance values on the plane mirror 6.

Figure 32:
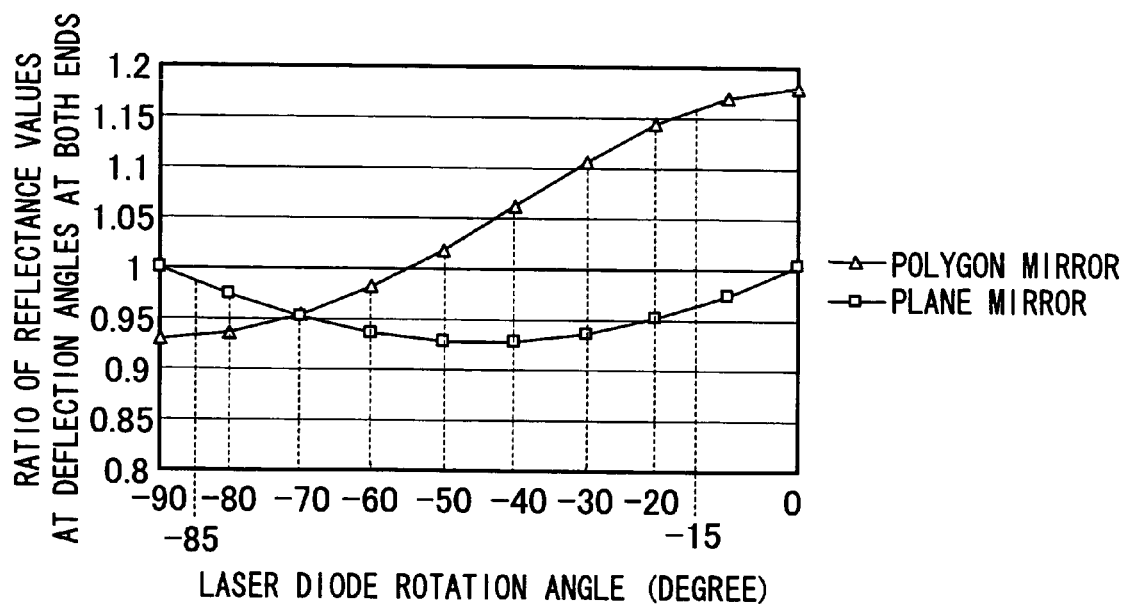
FIG. 32 is a descriptive graph showing changes in reflectance ratio accompanying a change in a rotation angle about the optical axis of a laser diode in Example 2.

FIG. 32 is a descriptive graph showing changes in reflectance ratio accompanying a change in a rotation angle about the optical axis of the laser diode 1. The abscissa is used for plotting values of a rotation angle about the optical axis of the laser diode 1, that is, an angle $\gamma$ formed between the polarization direction of light and the X-Y plane, while the ordinate is assigned to a numerical value obtained by dividing reflectance on the polygon mirror 4 and the plane mirror 6 at one deflection angle closest to the light source (+58 degrees) by reflectance on the polygon mirror 4 and the plane mirror 6 at the deflection angle at the end on the other side (−58 degrees). Note that the construction in the example is the same as in Example 1 except for an angle of the laser diode 1.

In this example, a rotation angle of the laser diode 1 is at −29.8 degrees on the abscissa and a calculation range adopted in FIG. 32 covers a range from −90 degrees to 0 degree and, if attention is paid to the absolute value of a rotation value (value of a rotation angle without a sign), a desirable condition for canceling a difference between reflectance values on the polygon mirror 4 corresponding both ends of an image with the difference between reflectance values on the plane mirror 6 is the same as in the case of Example 1. It is natural that a desirable rotation direction differs in a condition. If the laser diode 1 is rotated in reverse direction, differences between reflectance values increase each other; therefore, it is important to select properly not only the absolute value of a rotation angle, but also a rotation direction.

That is, in a case where, as shown in FIG. 31, the laser diode 1 is rotated about the optical axis so that a proportion of the S polarized light in light incident on the plane mirror 6 at one deflection angle on the plus side of the two deflection angles corresponding to both ends of an image is smaller than a proportion of the S polarized light in light incident on the plane mirror 6 at the other deflection angle on the minus side, it is said that the upper limit of the rotation angle (in the absolute value) at which a change in reflectance on the polygon mirror 4 is cancelled (alleviated) with a change in reflectance on the plane mirror 6 is desirably 50 degrees or less, more desirably 40 degrees or less. On the other hand, the lower limit of the rotation angle (in the absolute value) is desirably 15 degrees or more, more desirably 20 degrees or more.

Therefore, a proper range of the rotation angles (in the absolute value) can be set in various ways by combining the upper limits and lower limits described above and there can be thought of, for example, the range from 15 degrees to 50 degrees, the range from 20 degrees to 40 degrees, the range from 15 degrees to 40 degrees, and the range from 20 degrees to 50 degrees.

If a rotation angle of the laser diode 1 is in reverse, a change in reflectance on the plane mirror 6 accompanying a change in deflection angle can be reversed. In this case, a way of a change in reflectance ratio of the plane mirror 6 accompanying a change in rotation angle of the laser diode 1 and the curve of the plane mirror 6 shown in FIG. 32 are just symmetrical with respect to the line in parallel at the reflectance ratio of 1.

Therefore, even in a case where a rotation direction of the laser diode 1 is in reverse, a change in reflectance on the polygon mirror 4 can be cancelled (alleviated) with a change in reflectance on the plane mirror 6 if a range of the rotation angle is selected so that a way of a change in reflectance ratio of the polygon mirror 4 and a way of a change in reflectance ratio of the plane mirror 6 are almost in symmetry with respect to the line in parallel to the abscissa at a reflectance ratio of 1. The upper limit of the rotation angle (in the absolute value) is desirably 85 degrees or less, more desirably 80 degrees or less. On the other hand, the lower limit thereof is desirably 60 degrees or more, more desirably 70 degrees or more.

Therefore, as a range of the rotation angles (in the absolute values), there can be thought of, for example, the range from 60 degrees to 85 degrees, the range from 70 degrees to 80 degrees, the range from 60 degrees to 80 degrees, and the range from 70 degrees to 85 degrees.

In a case where a rotation direction of the laser diode 1 is in reverse, ways of changes in light quantities of the S polarized light and the P polarized light accompanying a change in deflection angle becomes the reverse of that shown in FIG. 31. That is, in a case where a rotation direction of the laser diode 1 is in reverse, a proportion of the S polarized light contained in light incident on the plane mirror 6 at one deflection angle on the plus side of the two deflection angles corresponding to both ends of an image becomes larger than a proportion of the S polarized light contained in light incident on the plane mirror 6 at the other deflection angle on the minus side thereof.

Figure 33:
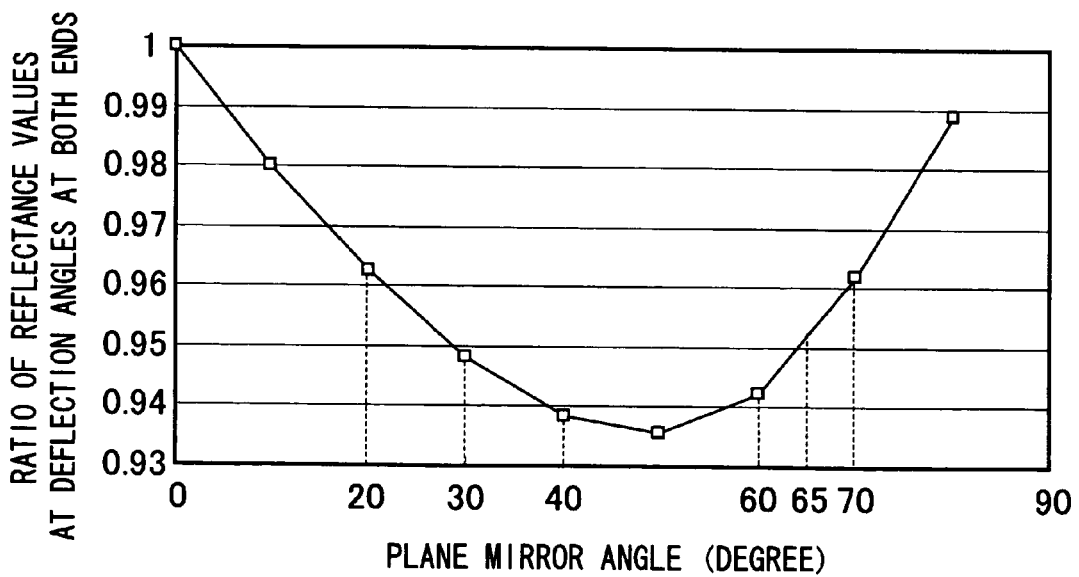
FIG. 33 is a descriptive graph showing a change in reflectance ratio accompanying a change in angle of the plane mirror in Example 2.

FIG. 33 is a descriptive graph showing a change in reflectance ratio accompanying a change in angle of the plane mirror 6. The abscissa is used for plotting values of an angle $\eta$ formed between the normal line to the plane mirror 6 and the X-Y plane (deflection plane), while the ordinate is assigned to a result obtained by dividing reflectance on the plane mirror 6 at one deflection angle closest to the light source (+58 degrees) by reflectance on the plane mirror 6 at the deflection angle at the other end on the other side (−58 degrees). Note that the construction including stages before the plane mirror 6 is the same as in Example 2 except for the angle of the plane mirror 6.

In a case of this example where the plane mirror 6 is disposed with an inclination relative to the X-Y plane, similarly to the case of Example 1, as well, it is necessary to provide a difference to some extent between reflectance values of light incident on the plane mirror 6 on the plus side and the minus side of a deflection angle in order to cancel (alleviate) a change in reflectance on the polygon mirror 4 with a change in reflectance on the plane mirror 6. In consideration of this aspect, it is said from FIG. 33 that the upper limit of an angle $\eta$ of the plane mirror 6 is desirably 70 degrees or less, more desirably 65 degrees or less, furthermore desirably 60 degrees or less. On the other hand, the lower limit of an angle $\eta$ of the plane mirror 6 is desirably 20 degrees or more, more desirably 30 degrees or more, furthermore desirably 40 degrees or more.

Therefore, a proper range of angles $\eta$ of the plane mirror 6 can be set in various ways by combining the upper limits and lower limits, and there can be thought of, for example, the range from 20 degrees to 70 degrees, the range from 30 degrees to 65 degrees, the range from 40 degrees to 60 degrees, the range from 20 degrees to 65 degrees, the range from 20 degrees to 60 degrees, the range from 30 degrees to 70 degrees, the range from 30 degrees to 60 degrees, the range from 40 degrees to 70 degrees, and the range from 40 degrees to 65 degrees.

Third Embodiment

Description will be given below of still another embodiment based on accompanying drawings. The same constituents in the construction as in the first and second embodiments are attached with the same numerical symbols; therefore, descriptions thereof will not be given herein.

Figure 34:
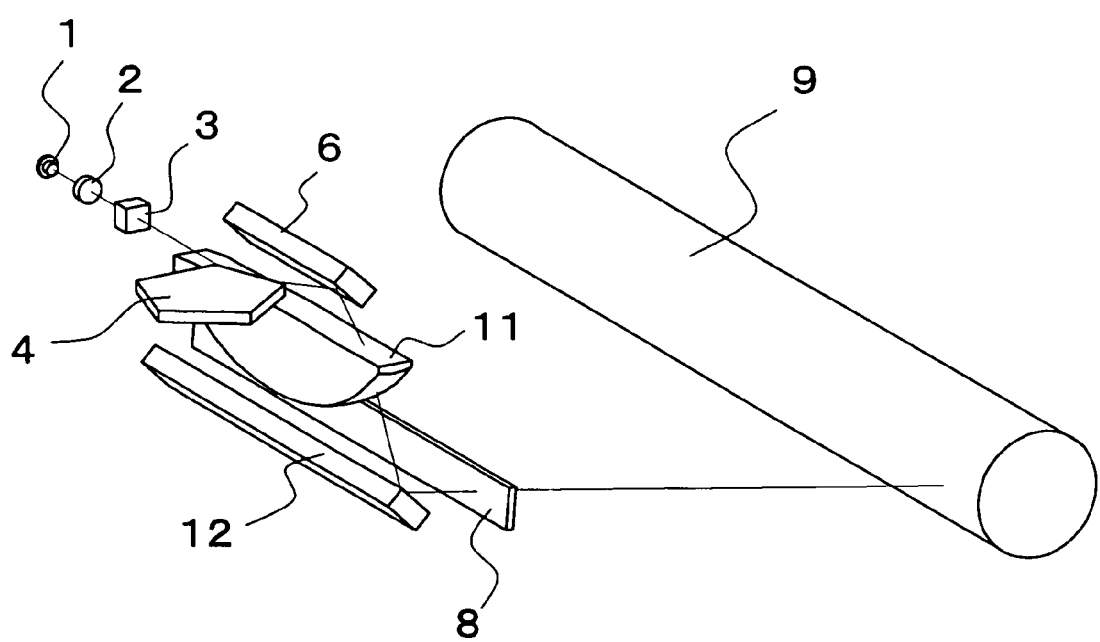
FIG. 34 is a perspective view showing a schematic construction of a laser scanning apparatus according to a third embodiment of the invention.

FIG. 34 is a perspective view showing a schematic construction of a laser scanning apparatus according to this embodiment. The laser scanning apparatus includes the laser diode 1, the collimator lens 2, the cylindrical lens 3, the polygon mirror 4 (a regular pentagon in a plan view in this embodiment), the plane mirror 6 (first plane mirror), the scanning lens 11, the plane mirror 12 (second plane mirror) and the window 8 arranged along an optical path from the laser diode 1 to the photosensitive member 9. That is, a laser scanning apparatus of this embodiment is of a similar construction to that of the first embodiment with the exception of use of the one scanning lens 11 as a scanning optical lens and the two plane mirrors 6 and 12 as a plane mirror.

The scanning lens 11 refracts incident light from the plane mirror 6 to guide refracted light to the plane mirror 12 and is provided in an optical path between the plane mirrors 6 and 12. The plane mirror 12 is a redirecting mirror for reflecting light incident thereon from the plane mirror 6 through the scanning lens 11 in a direction to the photosensitive member 9.

In the laser scanning apparatus with the construction, laser light emitted from the laser diode 1 is collimated by the collimated lens 2 and, thereafter, the parallel light is collected only in the auxiliary scanning direction on a light reflecting surface of the polygon mirror 4 by the cylindrical lens 3. Then, incident light is reflected on the light reflecting surface and, also, a reflecting direction thereof changes in the main scanning direction by rotation of the polygon mirror 4. Laser light thus deflected by the polygon mirror 4 is reflected on the plane mirror 6, is refracted by the scanning lens 11, is again reflected on the plane mirror 12 and, thereafter, is transmitted through the window 8 and is collected on the photosensitive member 9.

Description will be given of optical design of a laser scanning apparatus of this embodiment below as Example 3.

Table 17 shows coordinate data of optical surfaces of the optical system of this example numerically. A way of plotting the coordinate data is similar to that in Example 1. Note that, in Table 17, surface Nos. 1 to 12 indicate a surface of the collimator lens 2 on the light incidence side, a surface thereof on the light emission side, a surface of the cylindrical lens 3 on the light incidence side, a surface thereof on the light emission side, a light reflecting surface of the polygon mirror 4, a light reflecting surface of the plane mirror 6, a surface of the scanning lens 11 on the light incidence side, a surface thereof on the light emission side, a light reflecting surface of the plane mirror 12, a surface of the window 8 on the light incidence side, a surface thereof on the light emission side, and a surface (evaluation surface) of the photosensitive member 9, respectively.

Coordinates of the polygon mirror 4 are coordinates of a light reflecting surface when the center of an image is formed. The optical elements of this example are made of resin or glass. To be more specific, the collimator lens 2 is made of glass with a refractive index of 1.825. The cylindrical lens 3 and the window 8 are made of glass with a refractive of 1.511. The scanning lens 11 is made of resin with a refractive index of 1.519. The refractive indexes are all measured at a wavelength of 780 nm.

Tables 18 to 21 shows shapes of the optical surfaces, wherein $E{-}n = \times 10^{-n}$.

TABLE 18

Surface 2: Axially symmetrical aspherical surface

Curvature

−7.57677E−02

Aspherical coefficient

| Order | Coefficient |
|---|---|
| 4 | 3.99960E−05 |
| 6 | 1.78765E−07 |
| 8 | 6.06270E−10 |
| 10 | 2.79173E−12 |

TABLE 19

Surface 3: Cylindrical surface

Curvature 4.19078E−02

TABLE 20

Surface 7: Free curved surface

| i\j | 0 | 2 |
|---|---|---|
| 0 | 0.00000E+00 | 3.90628E−03 |
| 1 | 1.91482E−02 | −8.37982E−05 |
| 2 | 2.05901E−03 | −1.27297E−05 |
| 3 | −3.17708E−05 | 9.55591E−08 |
| 4 | −2.50024E−06 | 1.10023E−08 |
| 5 | 2.94820E−08 | −4.25573E−11 |
| 6 | 1.48682E−09 | −3.80905E−12 |
| 7 | −1.06551E−11 | 9.05975E−15 |
| 8 | −4.25622E−13 | 4.89039E−16 |
| 9 | 1.84613E−15 | 0.00000E+00 |
| 10 | 5.84651E−17 | 0.00000E+00 |

TABLE 17

| Surface | | Local coordinate original point | | | Local coordinate x-axis vector | | | Local coordinate y-axis vector | | |
|---|---|---|---|---|---|---|---|---|---|---|
| No. | Name | X | Y | Z | X | Y | Z | X | Y | Z |
| 1 | Collimator lens | 0.00 | 66.68 | 0.00 | 0.0000 | −1.0000 | 0.0000 | 1.0000 | 0.0000 | 0.0000 |
| 2 | | 0.00 | 64.18 | 0.00 | 0.0000 | −1.0000 | 0.0000 | 1.0000 | 0.0000 | 0.0000 |
| 3 | Cylindrical lens | 0.00 | 48.20 | 0.00 | 0.0000 | −1.0000 | 0.0000 | 1.0000 | 0.0000 | 0.0000 |
| 4 | | 0.00 | 43.20 | 0.00 | 0.0000 | −1.0000 | 0.0000 | 1.0000 | 0.0000 | 0.0000 |
| 5 | Polygon mirror | −2.17 | 0.21 | 0.00 | −0.7071 | −0.7071 | 0.0000 | 0.7071 | −0.7071 | 0.0000 |
| 6 | First plane mirror | 15.00 | 0.00 | 0.00 | 0.7071 | 0.0000 | 0.7071 | 0.0000 | 1.0000 | 0.0000 |
| 7 | Scanning lens | 15.00 | 0.00 | −9.75 | 0.0000 | 0.0000 | −1.0000 | 0.0000 | 1.0000 | 0.0000 |
| 8 | | 15.00 | 0.00 | −30.96 | 0.0000 | 0.0000 | −1.0000 | 0.0000 | 1.0000 | 0.0000 |
| 9 | Second plane mirror | 15.00 | 0.00 | −40.00 | −0.7071 | 0.0000 | −0.7071 | 0.0000 | 1.0000 | 0.0000 |
| 10 | Window | 30.00 | 0.00 | −40.00 | 0.9962 | 0.0000 | 0.0872 | 0.0000 | 1.0000 | 0.0000 |
| 11 | | 31.79 | 0.00 | −39.84 | 0.9962 | 0.0000 | 0.0872 | 0.0000 | 1.0000 | 0.0000 |
| 12 | Evaluation surface | 122.27 | 0.00 | −40.00 | 1.0000 | 0.0000 | 0.0000 | 0.0000 | 1.0000 | 0.0000 |

TABLE 21

Surface 8: Free curved surface

| i\j | 0 | 2 | 4 |
|---|---|---|---|
| 0 | 0.00000E+00 | −3.02940E−02 | −3.87348E−06 |
| 1 | 3.07744E−02 | 7.18786E−06 | −6.59894E−08 |
| 2 | −6.01608E−03 | 7.89721E−07 | −2.05538E−09 |
| 3 | −9.81972E−06 | −6.31243E−08 | 6.48920E−11 |
| 4 | −1.02832E−06 | −3.52033E−09 | −2.15658E−12 |
| 5 | −1.47110E−09 | 2.66330E−11 | −8.31871E−14 |
| 6 | −1.47799E−10 | −2.51084E−13 | −5.91934E−16 |
| 7 | 3.09257E−12 | 7.31028E−15 | 5.03401E−17 |
| 8 | −2.74463E−14 | 8.08089E−16 | 1.72709E−18 |
| 9 | 4.23729E−16 | 0.00000E+00 | 0.00000E+00 |
| 10 | 5.53653E−17 | 0.00000E+00 | 0.00000E+00 |

Figure 35:
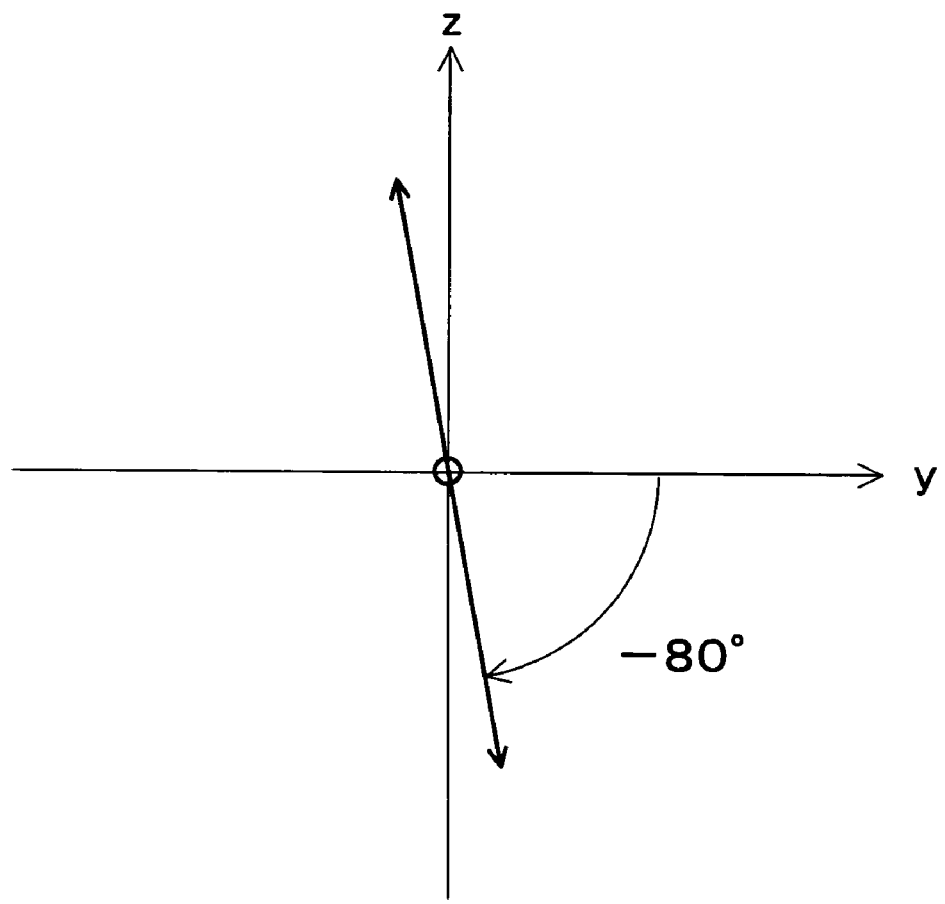
FIG. 35 is a descriptive view showing a state of light emission points of a laser diode observed from the side of a collimator lens in the laser scanning apparatus.

FIG. 35 is a descriptive view showing a state of light emission points of the laser diode 1 observed from the side of the collimator lens 2. Note that a double head arrow in the figure indicates the polarization direction of laser light. In this example, there is provided one light emission point and the polarization direction of laser light is inclined relative to the main scanning plane (deflection plane) by −80 degrees.

Figure 36:
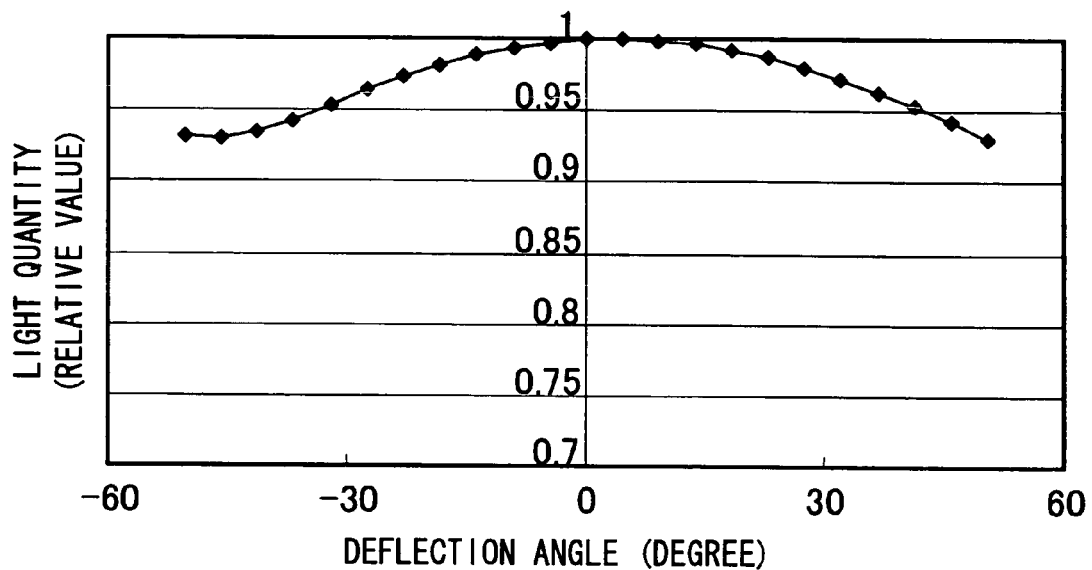
FIG. 36 is a descriptive graph showing a light quantity distribution on a photosensitive member in Example 3.

FIG. 36 is a descriptive graph showing light quantity distribution on the photosensitive member 9 in this example. In FIG. 36, an illumination light quantity directed to the photosensitive member 9 changing in company of a change in deflection angle of light reflected by the polygon mirror 4 is shown under normalization with the maximum value as 1.

Figure 37:
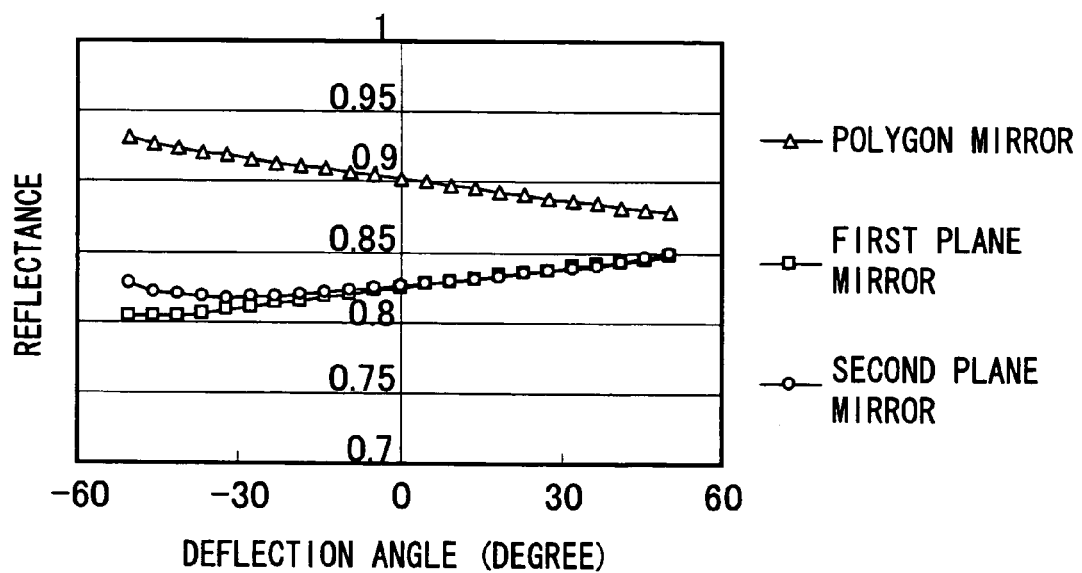
FIG. 37 is a descriptive graph showing changes in reflectance accompanying a change in deflection angle in a polygon mirror and a plane mirror in Example 3.
Figure 38:
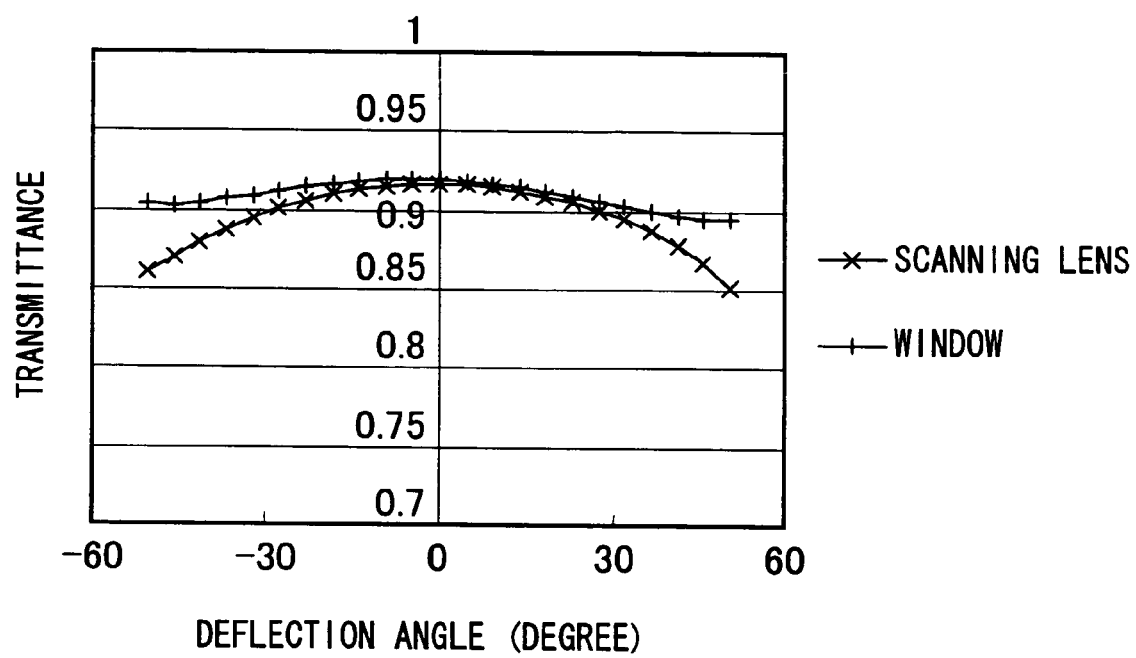
FIG. 38 is a descriptive graph showing changes in transmittance accompanying a change in deflection angle in a scanning lens and a window in Example 3.

FIG. 37 is a descriptive graph showing changes in reflectance accompanying a change in deflection angle in the polygon mirror 4 and the plane mirror 6 and 12 in this example. FIG. 38 is a descriptive graph showing changes in transmittance accompanying a change in deflection angle in the scanning lens 11 and the window 8 in this example. It is found that the elements of and after the polygon mirror 4 are different in reflectance and transmission from one another according to a deflection angle, and a change in reflectance accompanying a change in deflection is great especially on the polygon mirror 4 and the plane mirror 6.

A change in reflectance on the plane mirror 6, which is the first plane mirror, is larger than a change in reflectance on the plane mirror 12, which is the second plane mirror. This is because light is refracted by the scanning lens 11 to thereby reduce an angle in the main scanning plane of light incident on the plane mirror 12.

Figure 39:
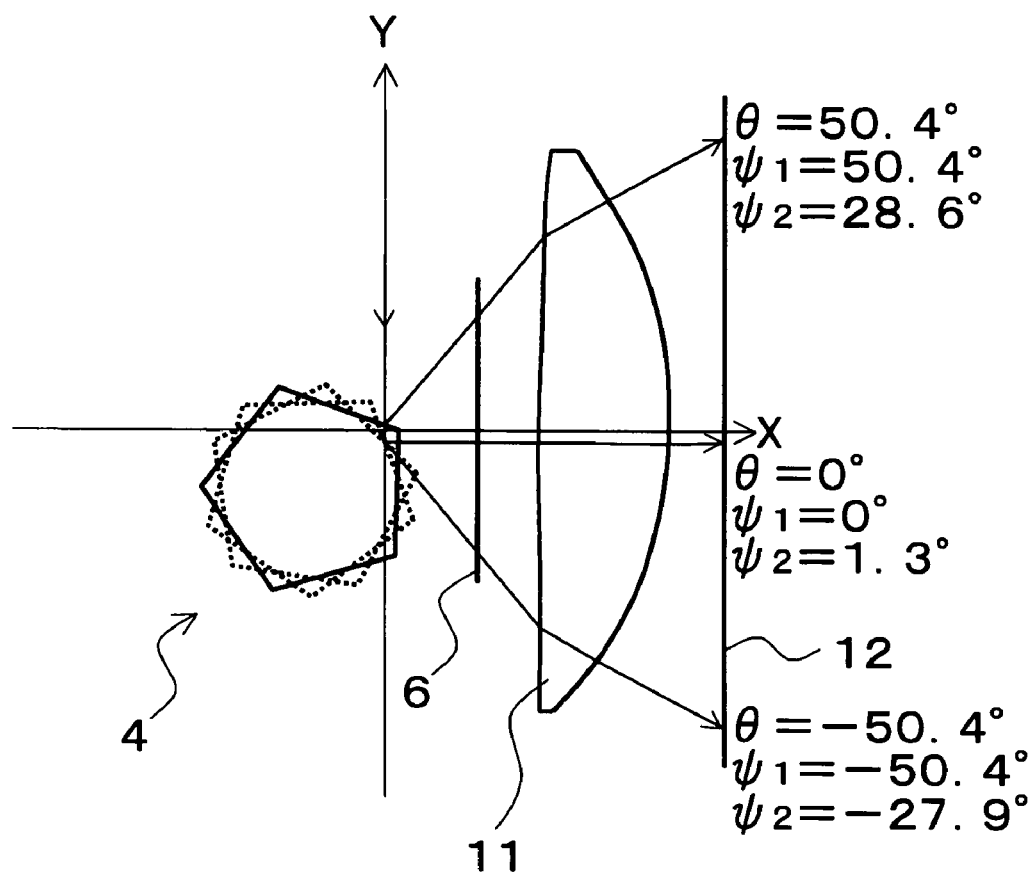
FIG. 39 is a descriptive view showing angles of light beams in the X-Y plane in Example 3.
Figure 40:
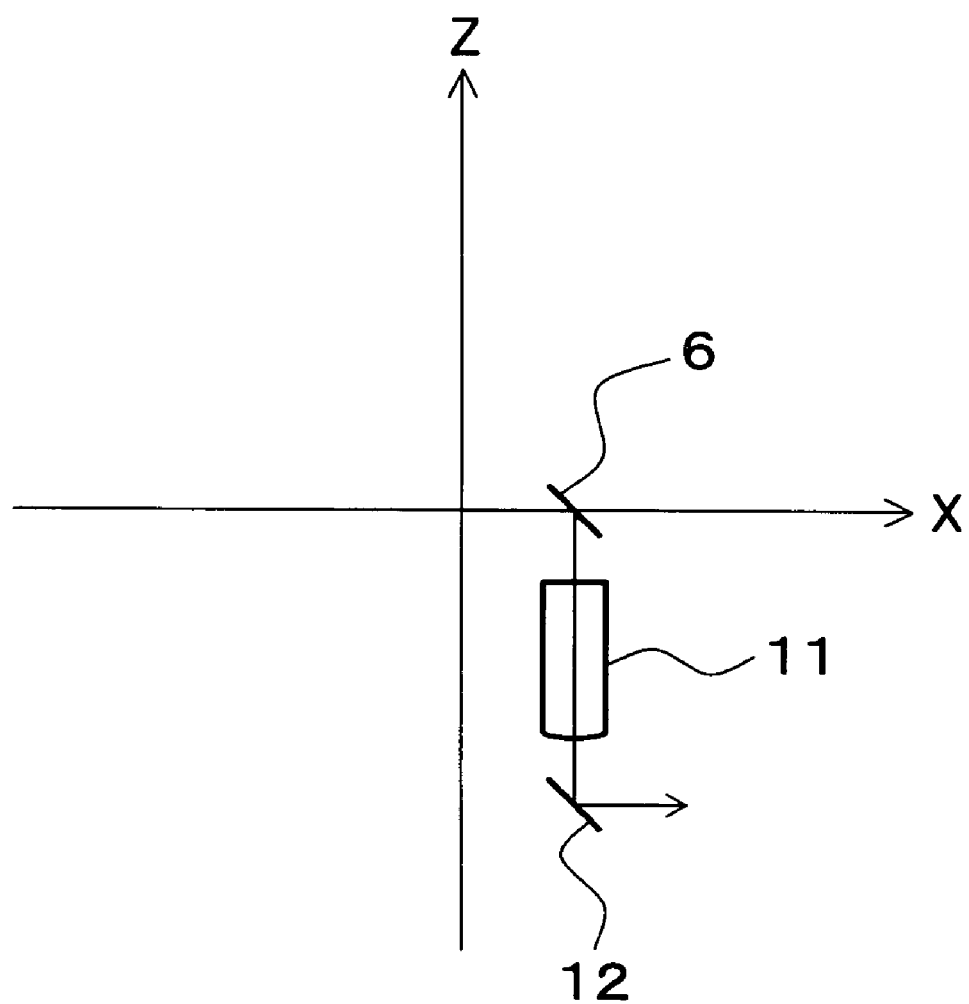
FIG. 40 is a descriptive view showing a light beam and an angle of a plane in the X-Z plane in Example 3.

FIG. 39 is a descriptive view showing angles of light beams in the X-Y plane in regard to the scanning lens 11 and plane mirrors 6 and 12, and FIG. 40 is a descriptive view showing a light beam and an angle of a plane in the X-Z plane in regard to the scanning lens 11 and plane mirrors 6 and 12. FIG. 39 is drawn neglecting reflection on the plane mirror 6 and assuming the presence of the scanning lens 11 and the plane mirror 12 in the X-axis direction. In FIG. 39, an angle (indicated with Ψ1) formed between incident light to the plane mirror 6 and the X-axis is the same as a deflection angle and an angle (indicated with Ψ2) formed between incident light to the plane mirror 12 and the X-axis is smaller than a deflection angle in the absolute value.

In a case where plural plane mirrors are present as in this example, a relationship of whether each of angles of incident light to the plane mirrors and the X-axis is larger or smaller than another can be changed by a design of a scanning optical system, whereas in a case of a wide angle scanning optical system having a range of a deflection angles in excess of 100 degrees, a design becomes difficult if a lens to extend the angle more is disposed on the upstream side. Therefore, it may be thought almost without imposing difficulty that a plane mirror disposed on the more upstream side causes an angle formed between incident light to the plane mirror and the X-axis to be larger. That is, in a case of plural plane mirrors, unless difference between reflectance values on the polygon mirror 4 corresponding to both ends of an image and a difference between reflectance values on the plane mirror located on the most upstream side in the optical path after the polygon mirror 4 corresponding to both ends of an image cancel each other, it is difficult to achieve a balance as a total.

Figure 41:
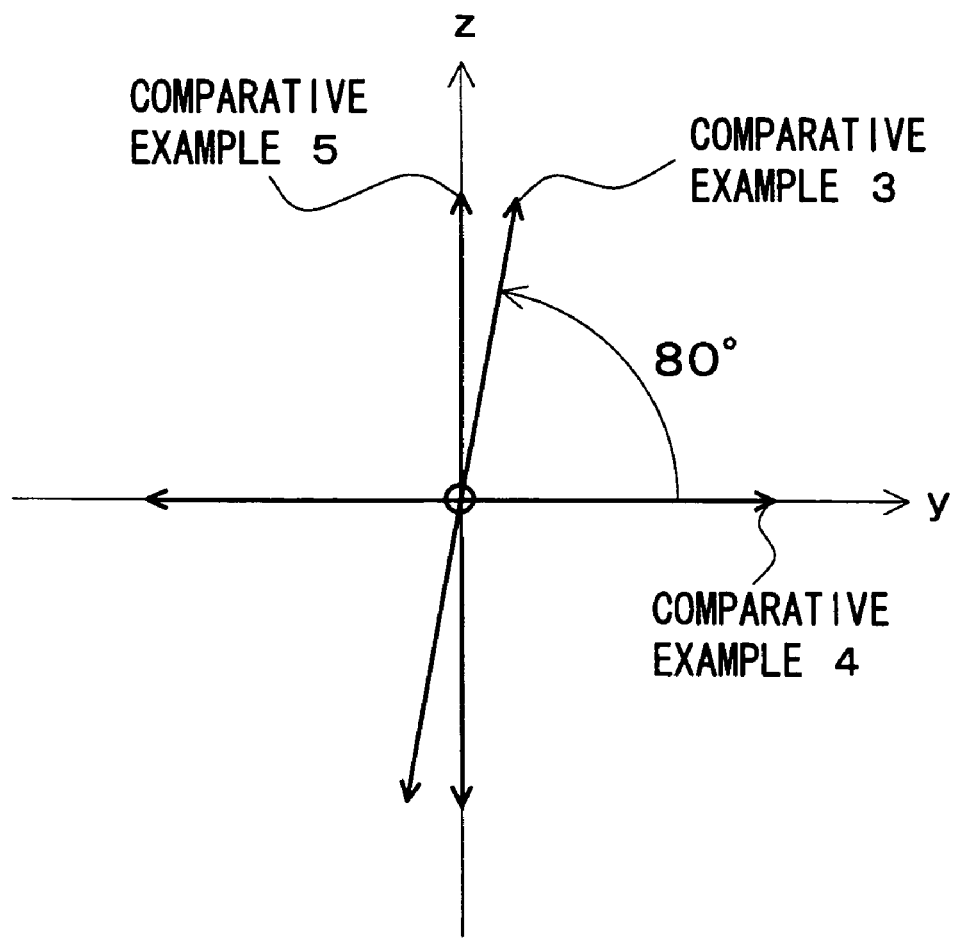
FIG. 41 is a descriptive view showing a state of light emission points of a laser diode observed from the side of a collimator lens in Comparative Examples 3 to 5.

FIG. 41 is a descriptive view showing a state of light emission points of the laser diode 1 observed from the side of the collimator lens 2 in Comparative Examples 3 to 5. An inclination of the laser diode 1 in Comparative Example 3 is in a direction opposite that in Example 3. That is, in Comparative Example 3, the laser diode 1 is inclined relative to the horizontal plane (deflection plane) by 80 degrees about the optical axis of the collimator lens 2. On the other hand, in Comparative Example 4, an inclination of the laser diode 1 is set to 0 degree and, in Comparative Example 5, an inclination of the laser diode 1 is set to 90 degrees.

Figure 42:
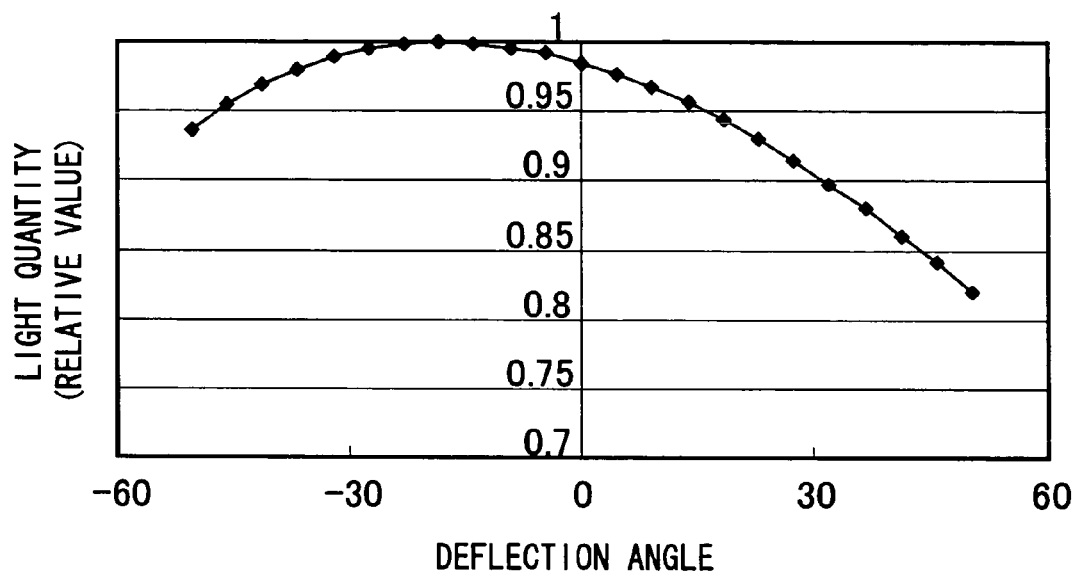
FIG. 42 is a descriptive graph showing light quantity distribution on a photosensitive member in Comparative Example 3.
Figure 43:
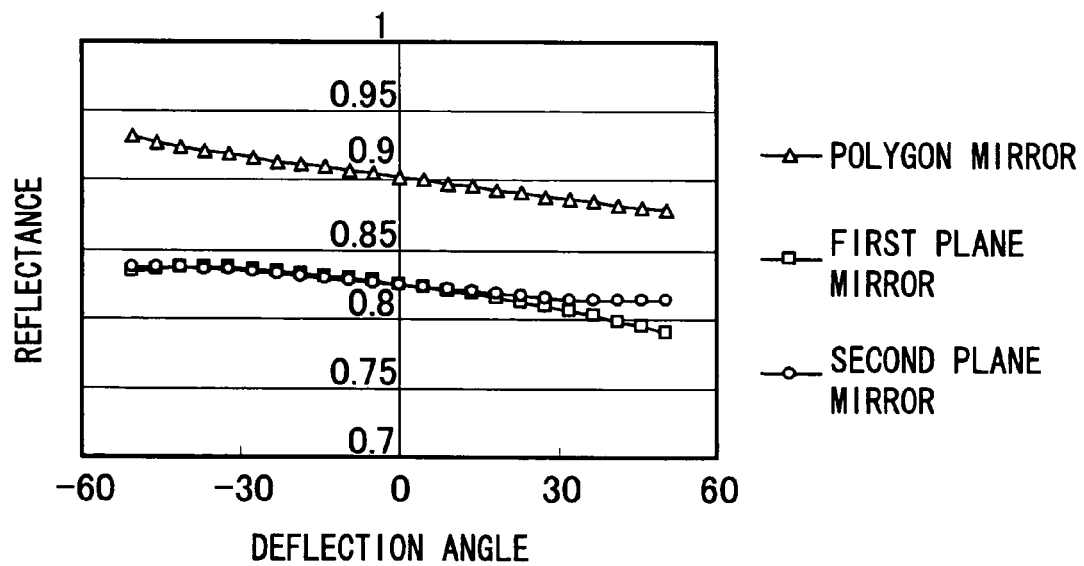
FIG. 43 is a descriptive graph showing changes in reflectance accompanying a change in deflection angle in a polygon mirror and a plane mirror in Comparative Example 3.
Figure 44:
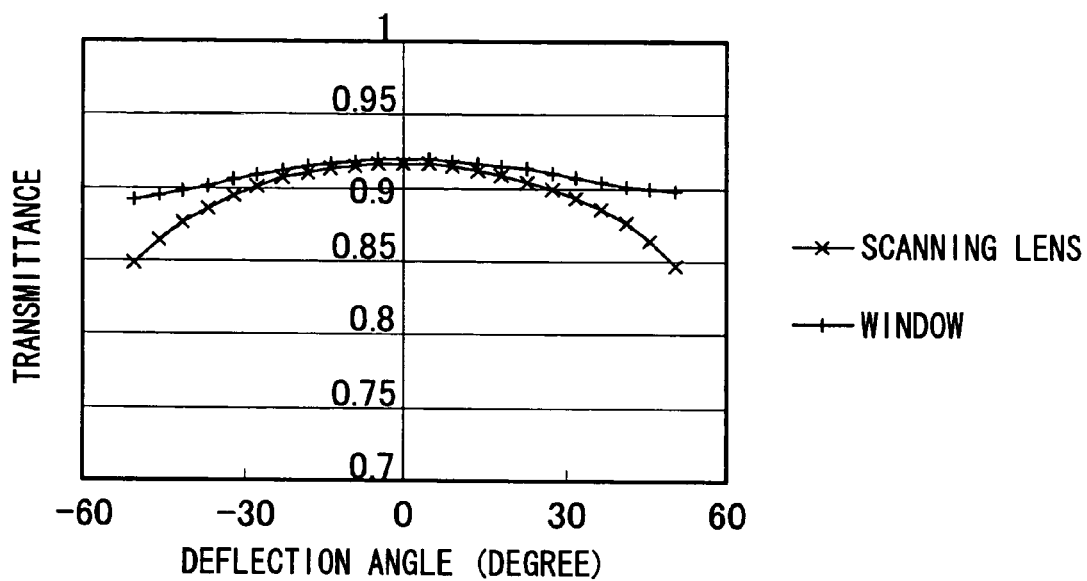
FIG. 44 is a descriptive graph showing changes in transmittance accompanying a change in deflection angle in a scanning lens and a window in Comparative Example 3.
Figure 45:
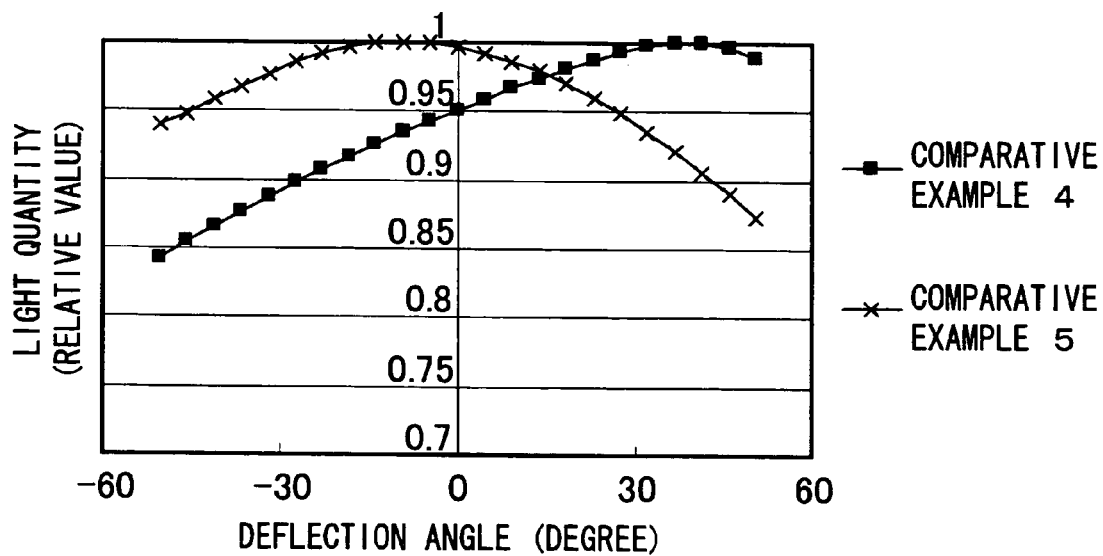
FIG. 45 is a descriptive graph showing light quantity distributions on a photosensitive member in Comparative Examples 4 and 5.

FIG. 42 is a descriptive graph showing light quantity distribution on the photosensitive member 9 in Comparative Example 3. FIG. 43 is a descriptive graph showing changes in reflectance accompanying a change in deflection angle on the polygon mirror 4 and the plane mirror 6 and 12 in Comparative Example 3. FIG. 44 is a descriptive graph showing changes in transmittance accompanying a change in deflection angle in the scanning lens 11 and the window 8 in Comparative Example 3. FIG. 45 is a descriptive graph showing light quantity distributions on the photosensitive member 9 in Comparative Examples 4 and 5. Note that, in FIGS. 42 and 45, an illumination light quantity onto the photosensitive member 9 is normalized with the maximum value as 1.

In the case of Example 3, which is different from the cases of the two beam scheme adopted in Examples 1 and 2, a rotation angle about the optical axis of the laser diode 1 is freely selected, whereas in either of the cases of Comparative Examples 3 and 5, light quantity distribution in the image width direction becomes less uniform than in Example 3. Therefore, in this example of one beam scheme as well, it is necessary to set a rotation angle about the optical axis of the laser diode 1 and a rotation direction thereof in proper ways, in order to cancel a change in reflectance on the polygon mirror 4 with a change in reflectance on the plane mirror 6.

Description will be given below of details of a design of an optical system in which, in this example, a change in reflectance on the polygon mirror 4 accompanying a change in deflection angle is canceled with a change in reflectance on the plane mirror 6 accompanying the change in deflection angle.

Figure 46:
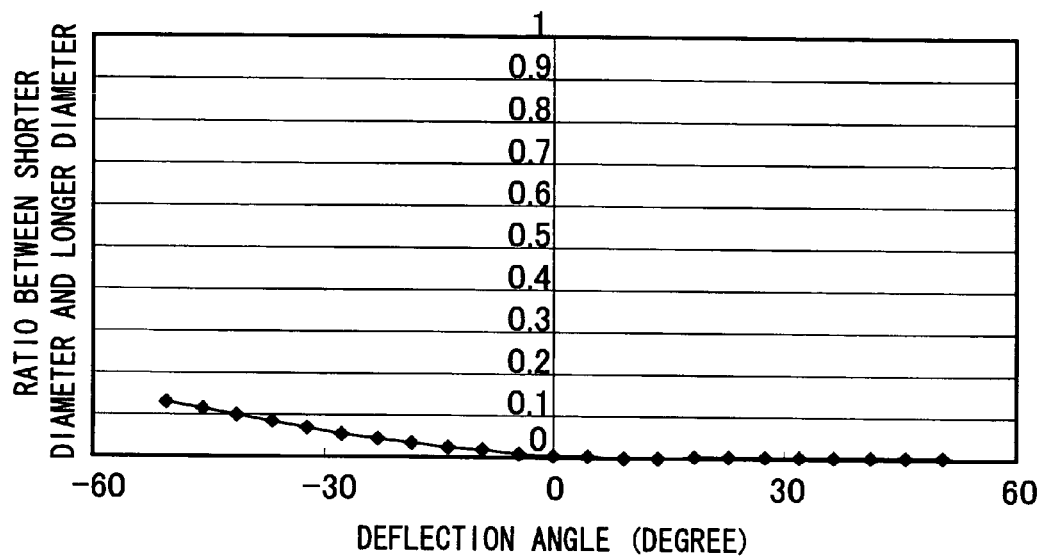
FIG. 46 is a descriptive graph showing results of calculation of a ratio between a shorter diameter and a longer diameter of elliptically polarized light after reflection on the polygon mirror in Example 3.

FIG. 46 shows results of calculation of a ratio between a shorter diameter and a longer diameter of elliptically polarized light after reflection on the polygon mirror 4 in Example 3. If the ratio is 0, laser light is linearly polarized light and, if the ratio is 1, laser light is circularly polarized light. In Example 3, since the polarization direction of laser light is at −80 degrees and close to a vertical direction and a P polarized light component of incident light to the polygon mirror 4 is smaller than an S polarized light component, reflected light is in a state close to linear polarization even with a larger incidence angle.

Figure 47:
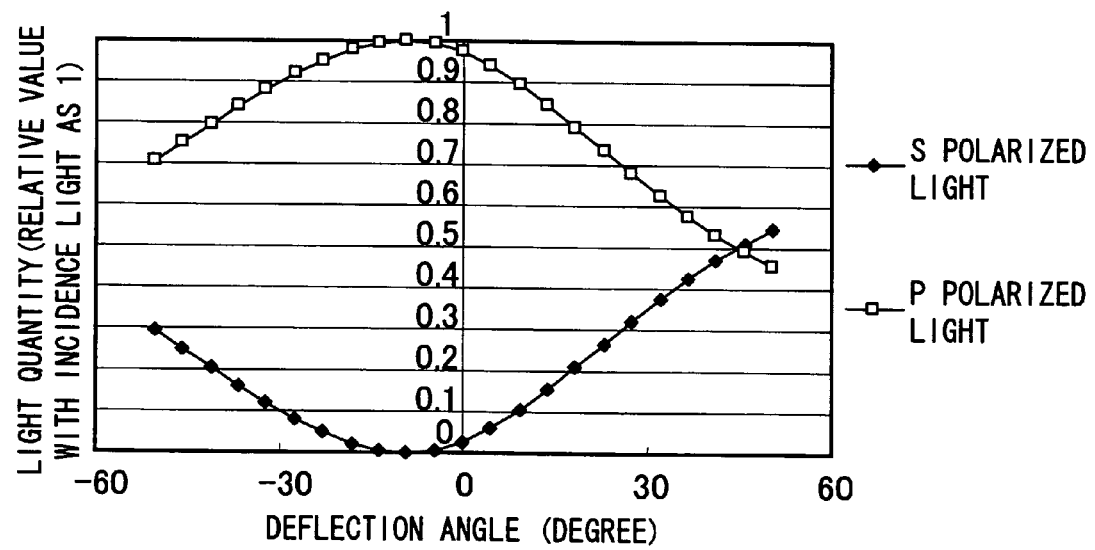
FIG. 47 is a descriptive graph showing light quantities of an S polarized light component and a P polarized light component of incident light to the plane mirror in Example 3.

FIG. 47 is a descriptive graph showing light quantities of the S polarized light component and the P polarized light component of incident light to the plane mirror 6 in Example 3. Since, in this example as well, there is a difference in light quantity between the S polarized components on the minus side and the plus side of a deflection angle, the fundamental way of thinking in Examples 1 and 2 applies in a similar manner. That is, in order to cancel a difference between reflectance values on the polygon mirror 4 corresponding to both ends of an image with a difference between reflectance values on the plane mirror 6 corresponding to both ends of an image in the same way, it is only required that a ratio between the S polarized light component and the P polarized light component of incident light to the plane mirror 6 differs between values thereof on the plus side and the minus side of a deflection angle, for which the laser diode 1 has only to be rotated about the optical axis thereof.

Figure 48:
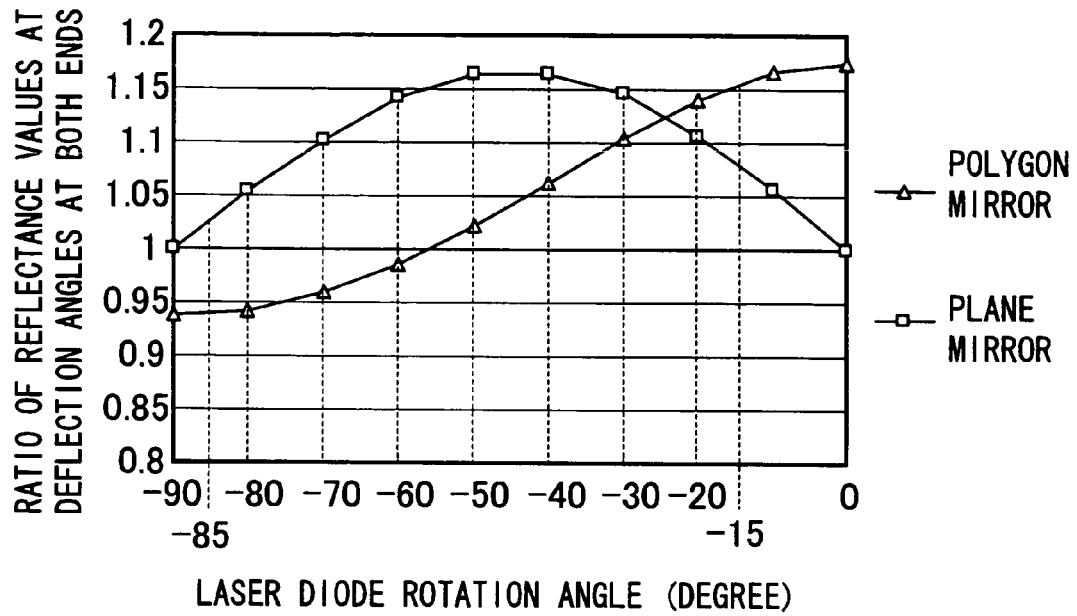
FIG. 48 is a descriptive graph showing changes in reflectance ratio accompanying a change in a rotation angle about the optical axis of a laser diode in Example 3.

FIG. 48 is a descriptive graph showing changes in reflectance ratio accompanying a change in a rotation angle about the optical axis of the laser diode 1. The abscissa is used for plotting values of an angle of the polarization direction of light relative to the X-Y plane and the ordinate is assigned to a numerical value obtained by dividing reflectance on the polygon mirror 4 and the plane mirror 6 at one deflection angle closest to the light source (+50.4 degrees) by reflectance on the polygon mirror 4 and the plane mirror 6 at the deflection angle at the other end on the other side (−50.4 degrees). The construction of the optical system is the same as in Example 3 except for the angle of the laser diode 1.

In this example, the angle of rotation is at the point of −80 degrees and a calculation range in FIG. 48 covers a range from −90 degrees to 0 degree, wherein in consideration of the absolute value of a rotation angle (value of a rotation angle without a sign), a desirable condition that a difference in reflectance of light on the polygon mirror 4 corresponding to both ends of an image is cancelled with a difference in reflectance of light on the plane mirror 6 applies to the example in the same way as in Example 1. A desirable rotation direction is naturally different in a condition and differences between reflectance values increases each other when a rotation angle is opposite the right direction; therefore, it is important that not only the absolute value but also a rotation direction are properly selected.

In this example, the angle of rotation is at the point of −80 degrees and the curve of a ratio in reflectance on the polygon mirror 4 and the curve of a ratio in reflectance on the plane mirror 6 are symmetrical with respect to the line in parallel to the abscissa at the ratio in reflectance of 1, from which it is understood that both are in a state of canceling out each other. It is also possible to alleviate non-uniformity in light quantity when the angle of rotation is not just the right value.

Therefore, it is said that, as shown in FIG. 47, in a case where the laser diode 1 is rotated about the optical axis so that a proportion of S polarized light contained in light incident on the plane mirror 6 at one deflection angle on the plus side of the two deflection angles corresponding to both ends of an image is larger than a proportion of S polarized light contained in light incident on the plane mirror 6 at the other deflection angle on the minus side, the upper limit of the rotation angle (in the absolute value) is desirably 85 degrees or less, more desirably 80 degrees or less, in order to cancel (alleviate) a change in reflectance on the polygon mirror 4 with a change in reflectance on the plane mirror 6. On the other hand, the lower limit of the rotation angle (in the absolute angle) is desirably 60 degrees or more, more desirably 70 degrees or more.

Therefore, as a range of the rotation angles (in the absolute value), there can be thought of, for example, the range from 60 degrees to 85 degrees, the range from 70 degrees to 80 degrees, the range from 60 degrees to 80 degrees, and the range from 70 degrees to 85 degrees.

If a rotation direction of the laser diode 1 is set in reverse, a change in reflectance on the plane mirror 6 accompanying a change deflection angle can be reversed. In this case, the curve of a way of a change in reflectance ratio on the plane mirror 6 accompanying a change in rotation angle of the diode layer 1 and the curve of the plane mirror 6 shown in FIG. 48 are symmetrical with respect to the line in parallel to the abscissa at a reflection ratio of 1.

Therefore, in a case where a rotation direction of the laser diode 1 is reversed, as well, a change in reflectance on the polygon mirror 4 can be cancelled (alleviated) with a change in reflectance on the plane mirror 6 if a range of rotation is selected in which a reflectance ratio on the polygon mirror 4 and a reflectance ratio on the plane mirror 6 are almost symmetrical with respect to the line in parallel to the abscissa at the reflection ratio of 1. The upper limit of the rotation angle (in the absolute value) is desirably 50 degrees or less, more desirably 40 degrees or less. On the other hand, the lower limit of the rotation angle (in the absolute value) is desirably 15 degrees or more, more desirably 20 degree or more.

Therefore, as a proper range of the rotation angles (in the absolute value), there can be thought of in various ways by combining the upper limits and the lower limits, for example, the range from 15 degrees to 50 degrees, the range from 20 degrees to 40 degrees, the range from 15 degrees to 40 degrees, and the range from 20 degrees to 50 degrees.

If a rotation direction of the laser diode 1 is reversed, a way of a change in light quantity of the S polarized light and the P polarized light accompanying a change in deflection angle is the reverse of that shown in FIG. 47. That is, if a rotation direction of the laser diode 1 is reversed, a proportion of the S polarized light contained in light incident on the plane mirror 6 at one deflection angle on the plus side of the two deflection angles corresponding to both ends of an image is smaller than a proportion of the S polarized light contained in light incident on the plane mirror 6 at the other deflection angle on the minus side of the two deflection angles.

Figure 49:
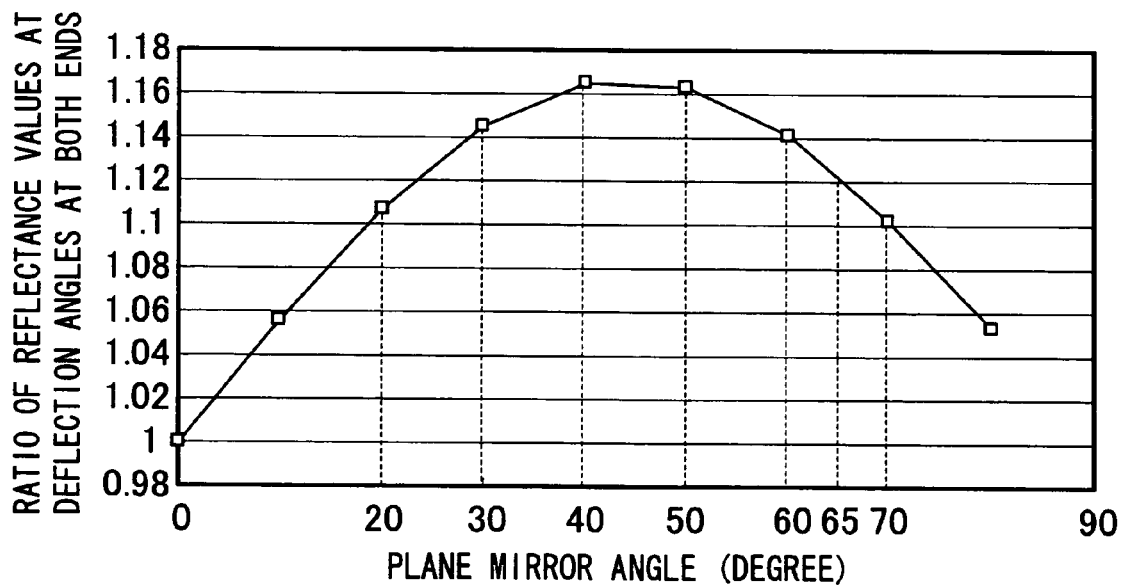
FIG. 49 is a descriptive graph showing a change in reflectance ratio accompanying a change in angle of the plane mirror in Example 3.

FIG. 49 is a descriptive graph showing a change in reflectance ratio accompanying a change in angle of the plane mirror 6. The abscissa is used for plotting values of an angle γ formed between the normal line to the light reflecting surface of the plane mirror 6 and the X-Y plane (deflection plane), while the ordinate is assigned to a numerical value obtained by dividing reflectance on the plane mirror 6 at one deflection angle closest the light source (+50.4 degrees) by reflectance on the plane mirror 6 at the deflection angle (−50.4 degrees) at the other end on the other side. The construction of the optical system before the plane mirror 6 is the same as in Example 3 except the angle of the plane mirror 6.

In this example where in a similar way to that in Example 1, the plane mirror 6 is inclined relative to the X-Y plane as well, it is naturally required to have a difference to some extent between reflectance values on the plus side and minus side of a deflection angle of incident light on the plane mirror 6 in order to cancel (alleviate) a change in the polygon mirror 4 with a change in reflectance on the plane mirror 6. In consideration of this aspect, it is said from FIG. 49 that the upper limit of an angle η of the plane mirror 6 is desirably 70 degrees or less, more desirably 65 degrees or less, furthermore desirably 60 degrees, still further desirably 50 degrees or less. On the other hand, the lower limit of an angle η of the plane mirror 6 is desirably 20 degrees or more, more desirably 30 degrees or more, furthermore desirably 40 degrees or more.

Therefore, as a proper range of the angles η of the plane mirror 6, there can be thought of in various ways by combining the upper limits and lower limits, for example, the range from 20 degrees to 70 degrees, the range from 30 degrees to 65 degrees, the range from 40 degrees to 60 degrees, the range from 20 degrees to 65 degrees, the range from 20 degrees to 60 degrees, the range from 20 degrees to 50 degrees, the range from 30 degrees to 70 degrees, the range from 30 degrees to 60 degrees, the range from 30 degrees to 50 degrees, the range from 40 degrees to 70 degrees, the range from 40 degrees to 65 degrees, and the range from 40 degrees to 50 degrees.

It is clear from the description presented above that various modification or alteration of the embodiments of the invention can be made. Accordingly, it should be understood that the invention can be implemented in the scope set forth in the appended claims without being restricted by the concrete description presented above.

What is claimed is:

1. A laser scanning apparatus comprising:
a light source for emitting laser light;
a polygon mirror for deflecting the laser light; and
at least one plane mirror for reflecting the laser light deflected by the polygon mirror in the direction to a photosensitive member, wherein
incident light to and reflected light on the polygon mirror are in a deflection plane perpendicular to the rotation axis of the polygon mirror,
an angle formed between the deflection plane and the normal line to a most upstream side plane mirror in the optical path after the polygon mirror is in the range from 20 degrees to 70 degrees,
an angle formed between the polarization direction of the laser light and the deflection plane is in the range from 15 degrees to 50 degrees, and
a proportion of S polarized light contained in light incident on the most upstream side plane mirror after being reflected on the polygon mirror at one, formed at an end there of closest to the light source, of the two deflection angles corresponding to both ends of an image is smaller than a proportion of S polarized light contained in light incident on the most upstream side plane mirror after being reflected on the polygon mirror at the other, formed at an end there of farthest from the light source, of the two deflection angles.

2. The laser scanning apparatus according to claim 1, wherein
an angle formed between the polarization direction of the laser light and the deflection plane is in the range from 20 degrees to 40 degrees.

3. The laser scanning apparatus according to claim 1, wherein
the range of deflection angles on the polygon mirror corresponding an image width is 100 degrees or more.

4. The laser scanning apparatus according to claim 1, wherein
an angle formed between the normal line to the plane mirror located on the most upstream side and the deflection plane is in the range from 30 degrees to 65 degrees.

5. The laser scanning apparatus according to claim 1, wherein
an angle formed between the normal line to the plane mirror located on the most upstream side and the deflection plane is in the range from 40 degrees to 60 degrees.

6. The laser scanning apparatus according to claim 1, wherein
the light source is an array type semiconductor laser having plural emission points.

7. A laser scanning apparatus comprising:
a light source for emitting laser light;
a polygon mirror for deflecting the laser light; and
at least one plane mirror for reflecting the laser light deflected by the polygon mirror in the direction to a photosensitive member, wherein
incident light to and reflected light on the polygon mirror are in a deflection plane perpendicular to the rotation axis of the polygon mirror,
an angle formed between the deflection plane and the normal line to a most upstream side plane mirror in the optical path after the polygon mirror is in the range from 20 degrees to 70 degrees,
an angle formed between the polarization direction of the laser light and the deflection plane is in the range from 60 degrees to 85 degrees, and
a proportion of S polarized light contained in light incident on the most upstream side plane mirror after being reflected on the polygon mirror at one, formed at an end there of closest to the light source, of the two deflection angles corresponding to both ends of an image is larger than a proportion of S polarized light contained in light incident on the most upstream side plane mirror after being reflected on the polygon mirror at the other, formed at an end there of farthest from the light source, of the two deflection angles.

8. The laser scanning apparatus according to claim 7, wherein
an angle formed between the polarization direction of the laser light and the deflection plane is in the range from 70 degrees to 80 degrees.

9. The laser scanning apparatus according to claim 7, wherein
the range of deflection angles on the polygon mirror corresponding an image width is 100 degrees or more.

10. The laser scanning apparatus according to claim 7, wherein
an angle formed between the normal line to the plane mirror located on the most upstream side and the deflection plane is in the range from 30 degrees to 65 degrees.

11. The laser scanning apparatus according to claim 7, wherein
an angle formed between the normal line to the plane mirror located on the most upstream side and the deflection plane is in the range from 40 degrees to 60 degrees.

12. The laser scanning apparatus according to claim 7, wherein
the light source is an array type semiconductor laser having plural emission points.

* * * * *